(12) United States Patent
Ciabarra, Jr. et al.

(10) Patent No.: US 11,789,805 B2
(45) Date of Patent: Oct. 17, 2023

(54) DETECTING, DIAGNOSING, AND ALERTING ANOMALIES IN NETWORK APPLICATIONS

(71) Applicant: Quantum Metric, Inc., Colorado Springs, CO (US)

(72) Inventors: Mario Luciano Ciabarra, Jr., Colorado Springs, CO (US); Adam Dille, Monument, CO (US); David Murphy, Denver, CO (US); Mishig Davaadorj, Prescott Valley, AZ (US); Clara Richter, Prescott Valley, AZ (US); Daniel Keogh, Boulder, CO (US)

(73) Assignee: Quantum Metric, Inc., Colorado Springs, CO (US)

( * ) Notice: Subject to any disclaimer, the term of this patent is extended or adjusted under 35 U.S.C. 154(b) by 0 days.

(21) Appl. No.: 17/591,482

(22) Filed: Feb. 2, 2022

(65) Prior Publication Data

US 2022/0245013 A1    Aug. 4, 2022

Related U.S. Application Data

(60) Provisional application No. 63/144,673, filed on Feb. 2, 2021.

(51) Int. Cl.
*G06F 11/07* (2006.01)

(52) U.S. Cl.
CPC ........ *G06F 11/079* (2013.01); *G06F 11/0757* (2013.01); *G06F 11/0778* (2013.01)

(58) Field of Classification Search
CPC . G06F 11/079; G06F 11/0757; G06F 11/0778
See application file for complete search history.

(56) References Cited

U.S. PATENT DOCUMENTS 10,503,804 B1 *  12/2019  Walters ................. G06N 3/126
10,592,377 B2 *   3/2020  Cook ................... G06F 11/3457
(Continued)

OTHER PUBLICATIONS

Angiulli et al., "Fast Outlier Detection in High Dimensional Spaces. In European Conference on Principles of Data Mining and Knowledge Discovery", Part of the Lecture Notes in Computer Science book series, vol. 2431, Aug. 2002, pp. 15-27.
(Continued)

*Primary Examiner* — Nadeem Iqbal
(74) *Attorney, Agent, or Firm* — Kilpatrick Townsend & Stockton LLP

(57) ABSTRACT

Techniques are described herein for evaluating user activities on a website for detecting and alerting anomalies with the website. For example, an alerting system may determine a set of time-windows for each of a set of attribute value(s) and use a set of performance metrics and/or web session events for the time-windows from historical web sessions to detect an anomaly in a current time-window. The alerting system may determine an evaluation range based on weighted performance ranges, and alert a client indicating a performance anomaly if a performance metric at the time of evaluation are out of the evaluation range. Attribute value(s) related to a website issue can be identified based on a correlated to anomalous web session events or to an anomalous time-window.

34 Claims, 19 Drawing Sheets

(56) References Cited

U.S. PATENT DOCUMENTS

| | | | |
|---|---|---|---|
| 2014/0108640 A1* | 4/2014 | Mathis | H04L 41/145 709/224 |
| 2017/0063905 A1 | 3/2017 | Muddu et al. | |
| 2018/0039530 A1 | 2/2018 | Ciabarra, Jr. et al. | |

OTHER PUBLICATIONS

International Application No. PCT/US2022/014966, "International Search Report and Written Opinion", dated May 12, 2022, 29 pages.

* cited by examiner

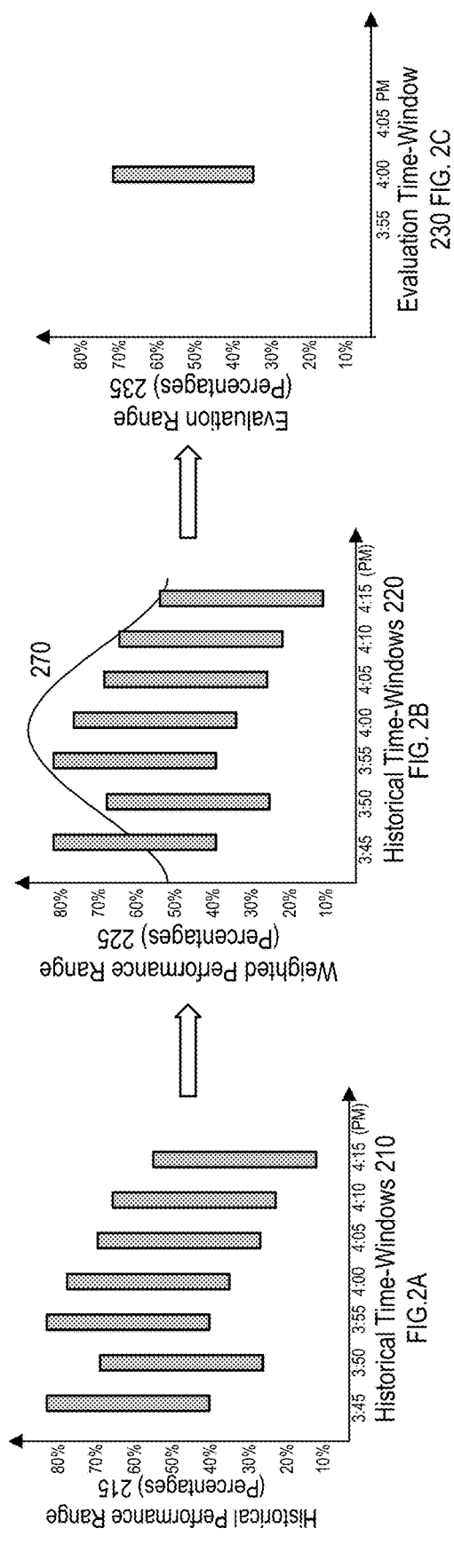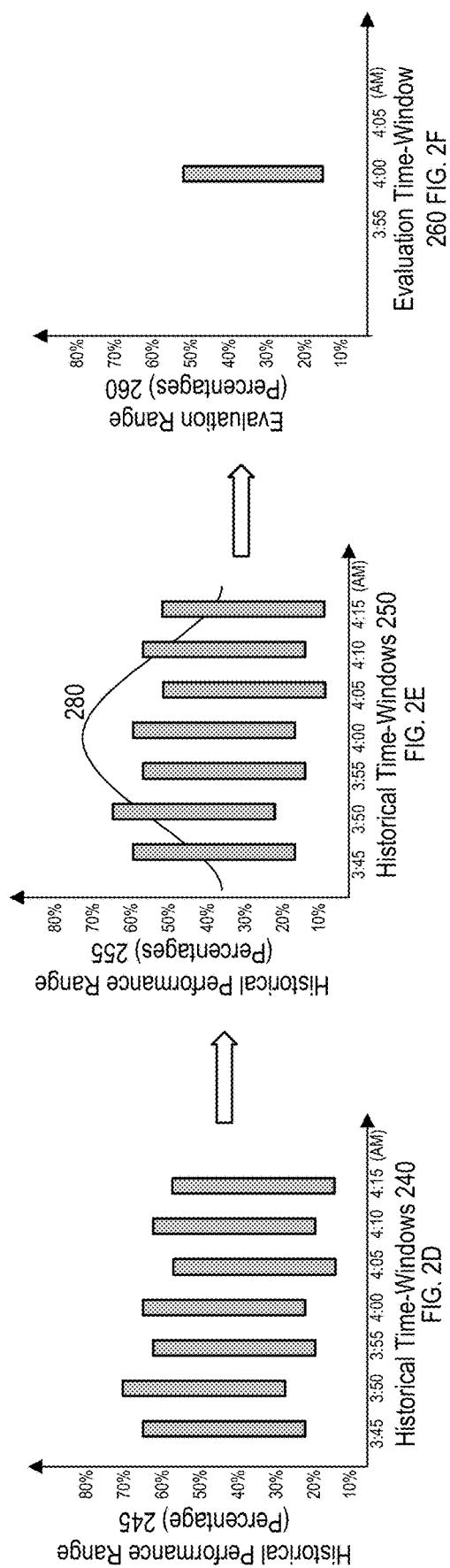

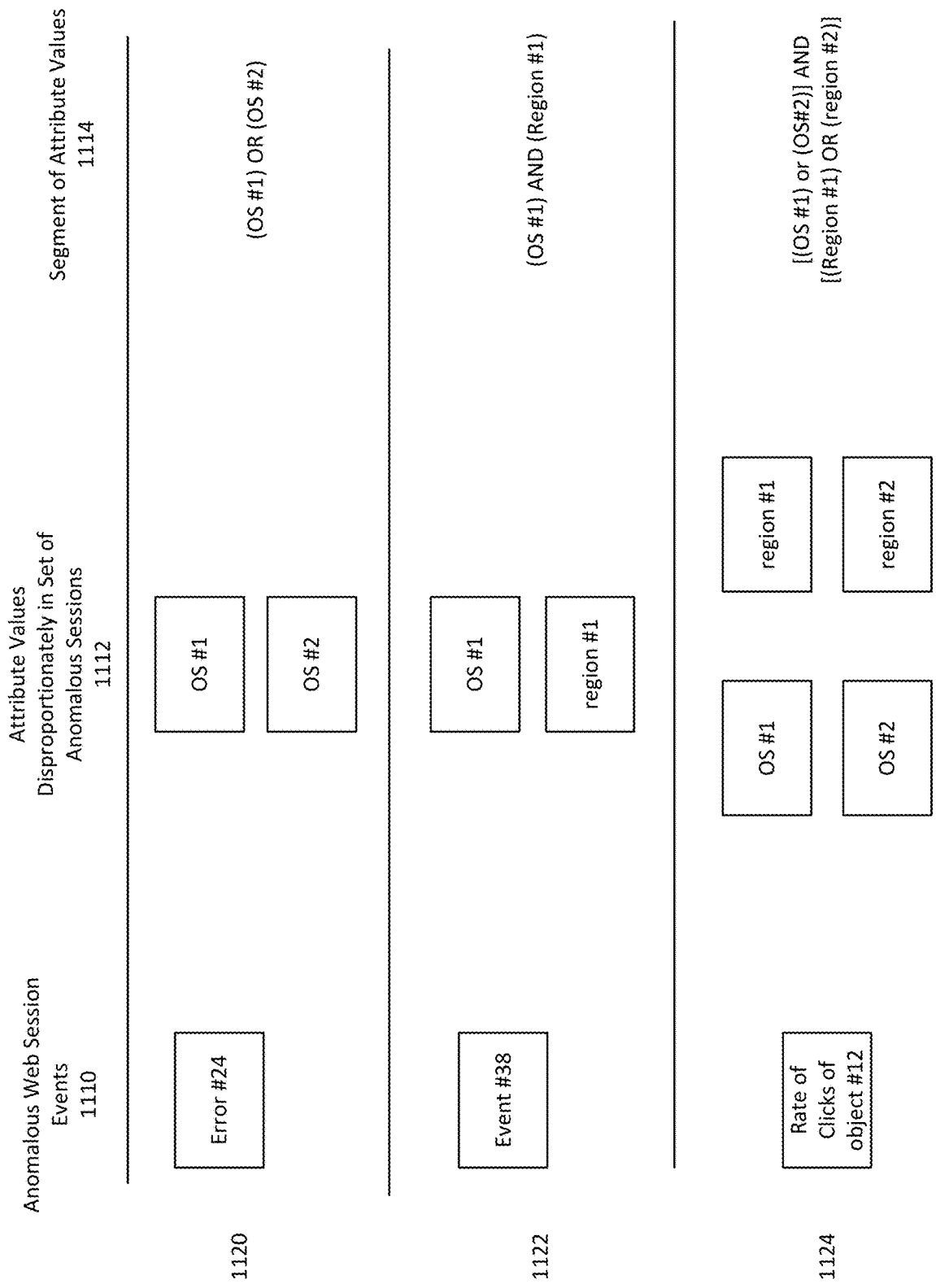

1210

Counts (proportions) for anomalous
set where anomaly condition is true input

```
{
  "device": {
    "Mobile": 102 (0.3),    ⟵ 1212
    "Tablet": 3 (0.05),
    ...
  },
  "browser": {
    "Chrome": 0 (0.0),
    ...
  },
  ...
  "page groups": {
    "/checkout": 3 (0.01),
    ...
  }
}
```

1220

Counts (proportions) for reference set
where anomaly condition is false

```
{
  "device": {
    "Mobile": 1 (0.01),    ⟵ 1222
    "Tablet": 98 (0.4),
    ...
  },
  "browser": {
    "Chrome": 1002 (0.65),
    ...
  },
  ...
  "page groups": {
    "/checkout": 55 (0.25),
    ...
  }
}
```

1230 output

```
{
  "device": {
    "Mobile": True,
    "Tablet": False,
    ...
  },
  "browser": {
    "Chrome": False,
    ...
  },
  ...
  "page groups": {
    "/": False,
    ...
  }
}
```

FIG. 12

DETECTING, DIAGNOSING, AND ALERTING ANOMALIES IN NETWORK APPLICATIONS

CROSS-REFERENCE TO RELATED APPLICATIONS

The present application is a non-provisional of, and claims the benefit and priority under 35 U.S.C. 119(e) of U.S. Provisional Application No. 63/144,673, filed Feb. 2, 2021, entitled "DETECTING, DIAGNOSING, AND ALERTING ANOMALIES IN NETWORK APPLICATIONS," the entire contents of which is herein incorporated by reference for all purposes.

BACKGROUND

The present disclosure relates generally to evaluating a website's performance and alerting about performance anomalies for detecting potential issues with the website. Typically, when a user (e.g., a website visitor) is browsing a website, certain issues such as a delay in loading a webpage of the website or a broken webpage of the website may frustrate the user and cause the user to abandon the website or stop performing specific actions on the website. Because of these issues, the user is less likely to stay on the web site and perform specific actions on the website.

As digital monitoring of user interactions on websites becomes more common, digital administrators desire tools to identify issues with websites and alerting of the issues on a website's performance more accurately and efficiently. Therefore, there is a need for improved systems and methods to detect and notify website owners about problems in a website performance.

SUMMARY

Techniques are described herein for evaluating user interactions on a website and alerting about potential anomalies with the website based on the evaluation. Besides detecting a problem, information in the alert can help in determining a cause of the problem (e.g., as a diagnostic), thereby leading to a solution. For example, an alerting system can evaluate and alert about anomalous behavior during a time-window (e.g., for the website's performance) or an anomalous amount of particular web sessions events. For various attributes (e.g., a type of device, a web browser, etc.) relating to requests for the website from user devices, the alerting system can determine attribute values (e.g., mobile phone, laptop computer, etc. for a given type of device) for evaluating the website's performance. In some embodiments, certain attribute values can be identified for a performance analysis, e.g., by correlating an attribute value to an anomalous time-window or anomalous amount of a particular type of web session event. The alerting system can determine a set of time-windows for each of the attribute values and retrieve a set of performance metrics for the time-windows from historical web sessions. The alerting system can then determine performance ranges based on the set of performance metrics for the time-windows.

In an illustrative embodiment, the alerting system can assign weights to the performance ranges. For a specific time-period, the alerting system can determine an evaluation range based on weighted performance ranges. The alerting system retrieves a performance metric for the specific time-period and compares the performance metrics with the evaluation range. The alerting system alerts a client indicating an anomaly in the website's performance if the performance metrics are out of the evaluation range. The alert to the client may further help identifying and resolving of issues with webpages on the website.

In another illustrative embodiment, for each of the types of web session events, an amount of web session events can be measured (during a time-window) of the respective type for sessions of user devices with the website. It can be determined whether the amount is statistically different than a reference amount, thereby determining one or more anomalous types of web session events. For each of the one or more anomalous types of web session events, a set of anomalous web sessions in which the anomalous type of web session event occurred during the time-window can be determined. For each of a plurality of attribute values, it can be determined whether the attribute value is disproportionately present in the set of anomalous web sessions relative to a reference set of web sessions, thereby determining a segment of one or more anomalous attribute values during the time-window. An alert including the segment of one or more anomalous attribute values can be provided to a client, e.g., for use in determining a cause (e.g., for diagnosing) of anomalous events or of a performance anomaly if one is detected.

In another illustrative embodiment, the alerting system can monitor web session events relating to web sessions of the user devices with a set of webpages of a website. For each of a plurality of time-windows, the web session events during the time-window can be used to determine whether the website exhibits anomalous behavior during the time-window. Embodiments may also include identifying a first set of web sessions during a first time-window exhibiting the anomalous behavior. A reference set of web sessions during one or more reference time-windows can be identified that do not exhibit anomalous behavior. For each of a plurality of attribute values, it can be determined whether the attribute value is disproportionately present in the first set of web sessions relative to the reference set of web sessions, thereby determining a segment of one or more anomalous attribute values during the first time-window. An alert including the segment of one or more anomalous attribute values can be provided.

Other embodiments are directed to systems and computer readable media associated with methods described herein. A better understanding of the nature and advantages of embodiments of the present invention may be gained with reference to the following detailed description and the accompanying drawings.

BRIEF DESCRIPTION OF THE DRAWINGS

FIGS. 2A-2C illustrates a first example of steps performed to determine an evaluation range for an evaluation time-window according to certain embodiments described herein.

FIGS. 2D-2F illustrates a second example of steps performed to determine an evaluation range for an evaluation time-window according to certain embodiments described herein.

FIG. 11 provides an example of determining correlated segments for three types of anomalous web events according to embodiments of the present disclosure.

FIG. 12 shows an example for using measurements of relative frequency for different attribute values to identify whether an attribute value correlates to a type of anomalous web session event according to embodiments of the present disclosure.

TERMS

Figure 1:
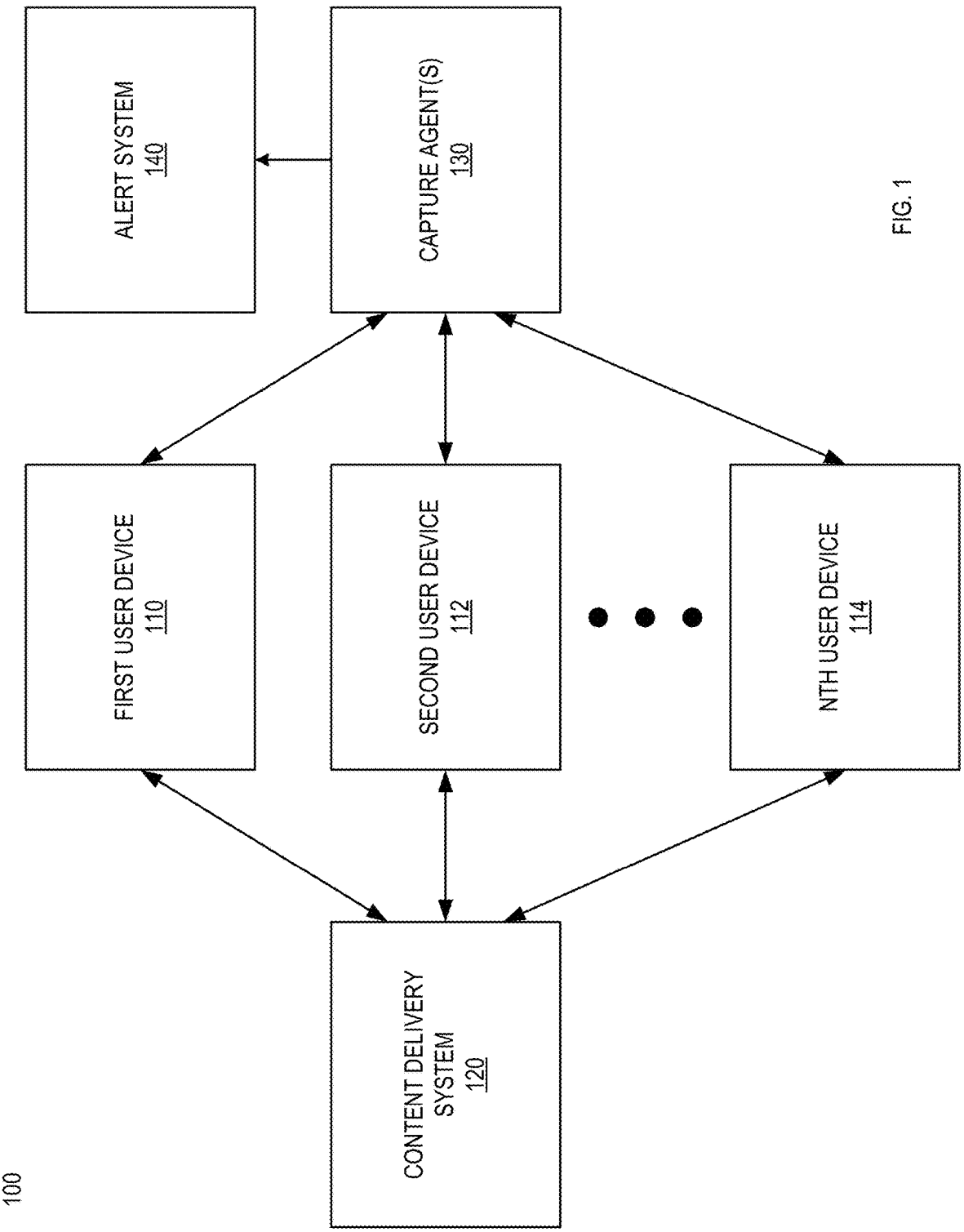
FIG. 1 illustrates an example of a distributed system for alerting about a website's performance anomalies according to certain embodiments described herein.

Prior to further describing embodiments of the disclosure, description of related terms is provided.

A "user" may include an individual that uses a website using a user device. The user may also be referred to as a "consumer" or "customer" depending on the type of the website.

A "client" may include an individual or entity that owns a website. The client may also be responsible for maintaining and presenting the website to a user. The client may employ some individuals (e.g., web developers) for the purpose of maintaining the website. The client may also be referred to as a "website owner" or "website provider."

A "user device" may comprise any suitable computing device that can be used for communication. A user device may also be referred to as a "communication device." A user device may provide remote or direct communication capabilities. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. Examples of client devices include desktop computers, mobile phones (e.g., cellular phones), PDAs, tablet computers, net books, laptop computers, etc. Further examples of user devices include wearable devices, such as smart watches, fitness bands, ankle bracelets, etc., as well as automobiles with remote or direct communication capabilities. A user device may comprise any suitable hardware and software for performing such functions, and may also include multiple devices or components (e.g., when a device has remote access to a network by tethering to another device—i.e., using the other device as a modem—both devices taken together may be considered a single communication device).

A "client device" may comprise any suitable computing device that can be used for communication. The client device may be a computing device of an administrator of a web server hosting a website.

A "server computer" may include a powerful computer or cluster of computers. For example, the server computer can be a large mainframe, a minicomputer cluster, or a group of computers functioning as a unit. In some cases, the server computer may function as a web server or a database server. The server computer may include any hardware, software, other logic, or combination of the preceding for servicing the requests from one or more other computers. The term "computer system" may generally refer to a system including one or more server computers.

A "processor" or "processor circuit" may refer to any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron, etc.; IBM and/or Motorola's PowerPC; IBM's and Sony's Cell processor; Intel's Celeron, Itanium, Pentium, Xeon, and/or Xscale, etc.; and/or the like processor(s).

A "memory" or "system memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "session" or a "web session" general refers to a set of user interactions with a website, which can include any user-accessible server, e.g., that may be accessed by a browser or native application. The session may include interactions starting with a user accessing a webpage of the website (e.g., using a web browser or other software application, e.g., a native application) and ending with the user ceasing interactions with the website (e.g., closing a webpage of the website within the web browser or software application). The time-length of the session in seconds, minutes, and/or hours can be determined based on a start time when the user first interacted with the website to an end time of the last interaction made by the user. The web server hosting the website may store an identifier of the session and other information associated with the session (e.g., elements or items of the website selected by the user, or information input by the user).

A "session event" or "web session event" may be measured for a session of a user device with a website. Examples of session events include errors, clicks, or user-defined events. An anomalous event may refer to an event type that occurs too much or too little during a time-window relative to an expected amount (e.g., a historical amount) for the time-window.

A "performance metric" may be a type of metric or data that represents performance of the website. As examples, a performance metric may be a timing metric (e.g., loading times of web pages), metric representing user activities on the web pages of the website, or website conversions (e.g., a user taking specific steps to buy a product). A performance metric for a website can be determined for all sessions or a portion (subset) of the sessions and may be determined for a particular time-window on a particular date (e.g., day of week or month). A performance metric can be determined from session events of the set of sessions for which the performance metric is being determined.

A "timing metric" may be a type of timing measurement performed on webpages of a website to analyze the performance of the website. For example, a timing metric may include a page load time metric. The page load time metric may be an amount of time it takes for a webpage to be visible on a user's screen. The page load timing can be monitored by a monitoring mechanism such as a capture agent. A "capture agent" may be a Javascript embedded with a webpage that monitors the page load time for the webpage on a user device. Different types of timing metrics may include measuring timings at different stages of the page load process for a webpage. A timing metric may be customized to capture timing values associated with specific aspects of a webpage loading process. For example, a customized timing metric may be used to capture time taken for loading a specific image on the webpage.

"Performance anomalies" may refer to one or more deviation or change in performance metrics. The performance anomalies can be recognized when the website's performance metrics are performing better than historical or typical website performance. Similarly, the performance anomalies can also be recognized when the website's performance metrics are performing worse than historical performance.

The term "attribute" may refer to a specific characteristic associated with a web session, e.g., associated with a request from a user device for a website within a web session. For example, a request for a website may be initiated from a user device that is a mobile phone or a laptop. Accordingly, a type of device is an attribute associated with one or more request(s) for a website. Similarly, a user may use a specific web browser (e.g., Google Chrome, Firefox, Safari, etc.) to make a request for a website. Accordingly, a web browser may be another attribute associated with one or more request(s) for a website. Other examples of attributes include a geographical region of the user device, operating system, or version of an application on the device, e.g. browser version or of other application.

The term "attribute value" may refer to one or more values associated with an attribute. For example, for an attribute of a type of device, the attribute values may refer to different types of devices such as a laptop computer, a mobile phone, a digital tablet, etc.

A "segment" may refer to one or more attribute values that correlate to sessions that are determined to be anomalous. For example, a session can be identified as being anomalous by including an anomalous event or by occurring during a time-window that has anomalous behavior.

A "network operation" generally refers to an operation performed by a client device (e.g., a web server) to load or display a webpage on a user device. The network operation may be an event that occurred during a web session. In an example implementation, a timing metric may include timing values involving network operations that occurred during a web session. For example, for a page load time metric, timing values involving certain network operations such as a requesting a webpage, processing of a webpage using a Transmission Control Protocol (TCP) protocol, and looking up a webpage on a Domain Name Server (DNS) may be combined. If looking up the webpage on the DNS takes too long then the rest of the processes involved in loading the webpage may be delayed as well. Accordingly, a specific network operation may be responsible for a slow connection experience for a user which led the user to abandon a website or terminate a web session.

The term "providing" may include sending, transmitting, displaying or rendering, making available, or any other suitable method. While not necessarily described, messages communicated between any of the computers, networks, and devices described herein may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

DETAILED DESCRIPTION

Users of websites and software applications can experience issues such as a delay in loading a webpage, software bugs, or interface design flaws that hinder them from taking certain actions (e.g., registering for a website or placing an order). In some cases, the issue may cause the user to abandon the website out of frustration or the user may not be able to access the website. Such issues may not be identified by a web server hosting the website because the issues arise out of the generating and rendering of a webpage by the user's browser on a user device over Application Programming Interface (API) calls by the user's browser.

Techniques for alerting about issues with websites may include monitoring user activities across the entire website. One could generally track user activities on the website. However, simply monitoring user actions for a website may not be helpful on its own in accurately recognizing and prioritizing problems with a website. For example, certain methods of monitoring user activities on a website may alert website providers about potential anomalies with the website even when no issue exists. For instance, user actions on a website are expected to be decreased late at night but these methods may still report an issue with the website due to a decrease in user actions at night. These methods can be too sensitive in suspecting and reporting issues with the website, and may alert clients about every irregular behavior even when a true anomaly is not present.

Certain systems monitoring user actions may not accurately identify any problem on a website when there is no change in overall rate of user actions. For example, when a certain software or a software update for a website is released and a loading issue exists while loading a website on a less popular browser, these systems may not recognize the problem if an overall rate of user actions for the website is not much affected.

Similarly, a certain decrease in user actions on a website requested from a less popular web browser may not be a result of an issue whereas a similar amount of deviation in user actions on the website requested from a popular web browser may be due to an issue with a website. Accordingly, certain methods may inaccurately report issues with websites using identical monitoring and analysis strategy for the websites during all times of the day.

Certain systems monitoring user actions on websites may only alert a client if irregularities or anomalies observed on a website reaches a certain threshold. If the website is not working on a specific browser (e.g., Chrome, IE, Safari, etc.) but the overall user activities or actions on the website are not affected due to activities on other browsers, the website provider or a client would not be alerted about the anomaly observed in the specific browser. Certain systems may only alert end-users if irregularities or anomalies observed on a website affects overall website conversions (e.g., a user taking specific steps to buy a product), checkout rates, or sales number.

The embodiments disclosed herein provide improved systems and methods to monitor user actions or performance data on webpages on the website, e.g., monitor user actions for a set of attribute values associated with one or more attributes, where the attributes are related to requests for the website from one or more user devices. Some embodiments can analyze the monitored user actions and provide alerts about anomalies with the website based on the analysis. To accurately provide alerts about anomalies with a website, a website's performances can be analyzed for a specific time-window against historical performance, including neighboring time-windows. Techniques can weight historical and neighboring performance for different time-windows to accurately identify an anomaly.

Such embodiments can allow identifying anomalies that are associated with specific attributes (e.g., a type of device) where the client can select single and/or multiple attributes or dimensions (e.g., web browsers and a type of device) within a user interface or dashboard provided to the client. In other embodiments, attribute values to be analyzed can be determined based on a correlation to anomalous web sessions events occurring in a time period. Performance of an attribute (dimension) of the website is captured for a period of time and analyzed against a historical performance data of the corresponding attributes during a similar timeframe in history to identify statistical anomalies associated with the attribute. A website provider or the client is then alerted about the anomalies associated with the attribute.

The improved systems and methods for analyzing deviations in user interactions on websites and alerting about anomalies with the website can be implemented by an alerting system. The alerting system, for various attributes (e.g., a type of device, a web browser, etc.) related to requests for a website from user devices, determines a set of attribute values (e.g., mobile phone, laptop computer, etc. are attribute values for a type of device attribute) for evaluating the website's performance. The alerting system can then determine a set of time-windows for each of the set of the attribute values and retrieves a set of performance metrics for the time-windows from historical web sessions associated with the attribute values. The alerting system can further determine performance ranges based on the set of performance metrics for the time-windows.

In the above embodiment, the alerting system can assign weights to the performance ranges. For a specific time-period, the alerting system can determine an evaluation range based on weighted performance ranges. The alerting system can retrieve a performance metrics for the specific time-period and compares the performance metrics with the evaluation range. The alerting system may alert a client indicating an anomaly in the website's performance if the performance metrics are out of the evaluation range. The alert to the client may further help identifying and resolving of issues involving the webpages on the website.

Additionally, anomalies in web session events (e.g., too many of a particular error) in web sessions with the website for a particular time period can be detected, and correlated to particular attribute values. Such correlated attribute values can help to identify a cause of a website issue. Further, performance can be analyzed for sessions with such correlated attribute value(s). Alternatively or in addition, embodiments can analyze performance in a time period, and then determine attribute value(s) correlated with a performance anomaly.

The alerts can be presented to the website owner for the owner to quickly identify issues with the website and focus on resolving the issues. The alerting also helps web developers of the website to identify at least one network operation contributing to problems with the website. Consequently, the web developers are able to efficiently pinpoint a code causing problems, and perform debugging to improve the website design and operation.

I. Capturing User Activity on a Website

FIG. 1 illustrates an example of a distributed system for alerting about a website's performance anomalies according to certain embodiments described herein. The distributed system is not intended to suggest any limitation as to scope of use or functionality of described embodiments.

The distributed system 100 may include one or more user devices, such as first user device 110, second user device 112, and nth user device 114. Each of the one or more user devices may be operated by a different user. For example, a user may be using an application for presenting content on a user device. The application may be a browser for presenting content from many different sources using uniform resource locators (URLs) to navigate to the different sources or an application associated with a defined number of one or more sources (e.g., an enterprise application for content associated with an enterprise).

The distributed system may further include content delivery system 120. Content delivery system 120 may be implemented to store content, such as electronic documents (e.g., a collection of webpages for a website). In one illustrative example, content delivery system 120 may be a web server that hosts a website by delivering the content.

The one or more user devices (e.g., first user device 110, second user device 112, and nth user device 114) may communicate with content delivery system 120 to exchange data via one or more communication networks. Examples of a communication network include, without restriction, the Internet, a wide area network (WAN), a local area network (LAN), an Ethernet network, a public or private network, a wired network, a wireless network, and the like, and combinations thereof.

In one illustrative example, first user device 110 may exchange data with content delivery system 120 to send instructions to and receive content from content delivery system 120. For example, a user device may send a request for a webpage to content delivery system 120. The request may be sent in response to a browser executing on the user device navigating to a uniform resource locator (URL) associated with content delivery system 120. In other examples, the request may be sent by an application executing on the user device.

In response to the request, content delivery system 120 may provide multiple webpages (or documents to implement the webpage, such as a Hypertext Markup Language (HTML) document) of the website to the user device. In some examples, the response may be transmitted to the user device via one or more data packets. The content delivery system 120 may deliver a web document or an original Document Object Model (DOM) associated with the webpage in response to the request. The content delivery system 120 may also capture and store certain timing information (e.g., time at receiving a request for a web document, an upload time for the requested web document, receiving acknowledgement after uploading the web document, etc.) for the requested webpage.

While the above description relates primarily to providing webpages, it should be recognized that communications between user devices and content delivery system 120 may include any type of content, including data processed, stored, used, or communicated by an application or a service. For example, content may include business data (e.g., business objects) such as JSON (JavaScript Object Notation) formatted data from enterprise applications, structured data (e.g., key value pairs), unstructured data (e.g., internal data processed or used by an application, data in JSON format, social posts, conversation streams, activity feeds, etc.), binary large objects (BLOBs), documents, system folders (e.g., application related folders in a sandbox environment), data using representational state transfer (REST) techniques (referred to herein as "RESTful data"), system data, configuration data, synchronization data, or combinations thereof. A BLOB may include a collection of binary data stored as a single entity in a database management system, such as an image, multimedia object, or executable code, or as otherwise known in the art. For another example, content may include an extended markup language (XML) file, a JavaScript file, a configuration file, a visual asset, a media asset, a content item, etc., or a combination thereof.

The distributed system 100 may further include a capture agent(s) 130 that monitors, captures, and stores timing values and certain events that occur on user devices. For example, a user device may display a webpage. In such an example, capture agent(s) 130 may capture one or more interactions with the webpage that occur on the user device, such as movement of a mouse cursor, clicking on a certain button, or the like. The capture agent(s) 130 may also capture timing values for different timing metrics for webpages of a website. The capture agent(s) 130 may also capture user activities on specific attributes such as a specific browser or user device. As illustrated in FIG. 1, the capture agent(s) 130 may be communicatively coupled (e.g., via one or more networks) to each of one or more user devices. For example, an instance of the capture agent(s) 130 may be communicatively coupled to first user device 110.

In some examples, instead of being separate from the user devices, an instance of capture agent(s) 130 may be executed on each of the user devices. For example, the capture agent can be retrieved from a third party server (e.g., from alert system 140) according to a link provided in the website provided from content delivery system 120. In such examples, an additional portion of capture agent(s) 130 may be separate from each of the user devices, where the additional portion communicates with each instance.

In addition or in the alternative, capture agent(s) 130 may be communicatively coupled to content delivery system 120 via a communication connection. In some scenarios, the capture agent(s) 130 may receive (e.g., via push or retrieval) certain data about user activities from the content delivery system 120, as well as content associated with the website (e.g., a DOM of a web page). In some implementations, a first instance of the capture agent(s) 130 may be loaded on a first web session on a first user device 110. Similarly, a second instance of the capture agent(s) 130 may be loaded on a second web session on a second user device 112. The first and second instances of capture agent(s) 130 monitors and captures user activities or actions for the website on the first and second devices. The first and second instances then sends the data to the capture agent(s) 130 which further stores the data. In an alternate embodiment, the capture agent(s) 130 may be an API plugged into a browser (e.g., Chrome, Firefox, etc.) to monitor timing values. The browser plugins may monitor activities so it knows a user clicked a button asking of a new webpage.

As described above, capture agent(s) 130 may be implemented at least partially on a user device (e.g., client-side) where timing values and events are to be captured. In such embodiments, capture agent(s) 130 may be implemented in a variety of ways on the user device. For example, the capture agent(s) 130 may be implemented as instructions accessible in a library configured on the user device. The capture agent(s) 130 may be implemented in firmware, hardware, software, or a combination thereof. Capture agent 130 may provide a platform or an interface (e.g., an application programming interface) for an application to invoke the capture agent(s) 130 to monitor operations performed by a user device. In some embodiments, capture agent(s) 130 may be an application (e.g., an agent) residing on a user device. Capture agent 130 may be implemented using code or instructions (e.g., JavaScript) embedded in an application.

The distributed system 100 may further include an alerting system 140. In some implementations, a client or a website owner may be provided with a user interface for the alerting system, where the client may select attributes and attribute values to analyze a website's performance. In alternative implementation, the one or more attributes to analyze and alert about the website may be configured within the alerting system 140 without requiring a client to provide or choose attribute within a user interface. The configuration of which attributes to detect may involve detecting anomalies in web session events (e.g., errors, user interactions, or pre-defined events), and then identifying attributes that are correlated to those anomalous web sessions. The alerting system 140 may retrieve one or more metrics associated with user activities from a capture agent(s) 130.

In an illustrative embodiment, the alerting system 140 may analyze in user interactions based on the one or more performance metrics and alert about performance anomalies with the website based on the evaluation. For example, an alerting system may be provided to evaluate and alert about the website's performance. The alerting system, for various attributes (e.g., a type of device, a web browser, etc.) related to requests for a website from user devices, determines a set of attribute values (e.g., mobile phone, laptop computer, etc. are attribute values for a type of device attribute) for evaluating the website's performance. The alerting system can determine a set of time-windows for each of the set of the attribute values and retrieves a set of performance metrics for the time-windows from historical web sessions associated with the attribute values. The alerting system then determines performance ranges based on the set of performance metrics for the time-windows. The alerting system assigns weights to the performance ranges and determines an evaluation range based on weighted performance ranges. The alerting system compares the performance metrics for a current time of evaluation with the evaluation range and alerts a client about performance anomalies if the performance metrics are out of the evaluation range.

Each of first user device 110, second user device 112, nth user device 114, content delivery system 120, capture agent(s) 130, and/or alerting system 140 may include one or more computers and/or servers which may be general purpose computers, specialized server computers (including, by way of example, PC servers, UNIX servers, mid-range servers, mainframe computers, rack-mounted servers, etc.), server farms, server clusters, distributed servers, or any other appropriate arrangement and/or combination thereof. Each of first user device 110, second user device 112, nth user device 114, content delivery system 120, capture agent(s) 130, and/or alerting system 140 may run any of operating systems or a variety of additional server applications and/or mid-tier applications, including HTTP servers, FTP servers, CGI servers, Java servers, database servers, and the like. Exemplary database servers include without limitation those commercially available from Microsoft, and the like.

Each of first user device 110, second user device 112, nth user device 114, content delivery system 120, capture agent(s) 130, and/or alerting system 140 may be implemented using hardware, firmware, software, or combinations thereof. In various embodiments, each of first user device 110, second user device 112, nth user device 114, content delivery system 120, capture agent(s) 130, and/or alerting system 140 may be configured to run one or more services or software applications described herein. In some embodiments, content delivery system 120, capture agent(s) 130, and/or alerting system 140 may be implemented as a cloud computing system.

Each of first user device 110, second user device 112, nth user device 114, content delivery system 120, capture agent(s) 130, and/or alerting system 140 may include several subsystems and/or modules, including some, which may not be shown. Subsystems and/or modules of each of first user device 110, second user device 112, nth user device 114, content delivery system 120, capture agent(s) 130, and/or alerting system 140 may be implemented in software (e.g., program code, instructions executable by a processor), in firmware, in hardware, or combinations thereof. The subsystems and/or modules of each of first user device 110, second user device 112, nth user device 114, content delivery system 120, capture agent(s) 130, and/or alerting system 140 may be implemented to perform techniques disclosed herein.

In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.). Computer-executable instructions or firmware implementations of the processing unit(s) may include computer-executable or machine-executable instructions written in any suitable programming language to perform the various operations, functions, methods, and/or processes disclosed herein.

Each of first user device 110, second user device 112, nth user device 114, content delivery system 120, capture agent(s) 130, and/or alerting system 140 may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer-readable storage media. In some embodiments, computer-readable storage media may be configured to protect a computer from an electronic communication containing malicious code. The computer-readable storage media may include instructions stored thereon, that when executed on a processor, perform the operations disclosed herein.

Each of first user device 110, second user device 112, nth user device 114, content delivery system 120, capture agent(s) 130, and/or alerting system 140 may also include or be coupled to additional storage, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof.

Each of first user device 110, second user device 112, nth user device 114, content delivery system 120, capture agent(s) 130, and/or alerting system 140 may provide some services and/or applications that are in a virtual or non-virtual computing environment. Such services may be offered on-demand to client devices. In some embodiments, a specific instantiation of a service provided by alerting system 140 may be referred to herein as a "service." Website owners may use one or more applications to interact and utilize the services or applications provided by content delivery system 120, capture agent(s) 130, and/or alerting system 140. Services may be offered as a self-service or a subscription. Website owners or operators may acquire the application services without the need for users or visitors of websites to purchase separate licenses and support. Examples of services may include a service provided under a Software as a Service (SaaS) model, a web-based service, a cloud-based service, or some other service provided to a user device.

In some examples, a service may be an application service provided by content delivery system 120, capture agent(s) 130, and/or alerting system 140 via a SaaS platform. The SaaS platform may be configured to provide services that fall under the SaaS category. The SaaS platform may manage and control the underlying software and infrastructure for providing the SaaS services. By utilizing the services provided by the SaaS platform, customers can utilize applications. The cloud computing system may be implemented as a cloud-based infrastructure that is accessible via one or more networks. Various different SaaS services may be provided.

A user device may include or be coupled to a display. A user device may provide access to one or more applications (also referred to herein as an "application program"). An application of the one or more applications may present content using the display. It should be recognized that an application may be executing on a user device, content delivery system 120, capture agent(s) 130, alerting system 140, or a combination thereof. In some embodiments, an application may be accessed from one location and executed at a different location. For example, an application may be accessible at a client device as a service, but the application may be executing at alerting system 140. An application may include information such as computer-executable or machine-executable instructions, code, or other computer-readable information. The information may be written in any suitable programming language to perform the various operations, functions, methods, and/or processes disclosed herein. The information may be configured for operation of the application as a program. Examples of applications may include, without restriction, a document browser, a web browser, a media application, or other types of applications.

In some embodiments, an application may be device specific. For example, the application may be developed as a native application for access on a particular device that has a configuration that supports the application. The application may be configured for a particular type of platform and/or particular type of device. As such, the application may be implemented for different types of devices. Devices may be different for a variety of factors, including manufacturer, hardware, supported operating system, or the like. The application may be written in different languages, each supported by a different type of device and/or a different type of platform for the device. For example, the application may be a mobile application or mobile native application that is configured for use on a particular mobile device.

In some embodiments, an application may generate a view of information, content, and/or resources, such as documents. For example, the application may display content to view on a user device. The view may be rendered based on one or more models. For example, a document may be rendered in the application, such as a web browser using a document object model (DOM). The view may be generated as an interface, e.g., a graphical user interface (GUI), based on a model. The document may be rendered in a view according to a format, e.g., a hyper-text markup language (HTML) format. The interface for the view may be based on a structure or organization, such as a view hierarchy.

II. Monitoring Webpage Accesses and Determining Performance

A web session associated with a website may include a set of user interactions with the website. The user interactions may include a user accessing a series of webpages of the website (e.g., using a web browser or a software application) and ceasing interactions with the website (e.g., closing a webpage of the website within the web browser or software application).

A session may include one or more "stages" that a user progresses through while accessing a series of webpages until the user ends the session. The "stages" may be defined based on interactions made by the user (e.g., opening a webpage, selecting an element or item of the page, or inputting information in a particular location). For example, each stage may be associated with a particular interaction that brings the stage (e.g., opening a page, selecting an element, or submitting data) and a particular interaction that ends the stage (e.g., opening another page, selecting another element, or submitting other data). Each stage may be associated with one or more changes or updates to a webpage (e.g., a visual change or a change in the information obtained by the web server). For example, each webpage of the website presented to the user may correspond to a different stage. A specific interaction on a webpage may lead to a specific stage, where the specific stage is a different webpage.

An example of a set of stages during a session is provided below. In this example, a user opens a homepage of a website, which is associated with a first stage. During the first stage, the user browses the homepage and selects a link to open a second webpage on the website, thereby ending the first stage and beginning a second stage. The second stage can be associated with the second webpage. During the second stage, the user browses the second webpage and inputs information to the second webpage by selecting items or elements of the webpage or by inputting text into a field of the second webpage. This information is submitted to the website (which can be performed automatically by the website or performed manually by the user selecting a submit button).

The submission of such information can end the second stage and begin a third stage. The third stage can be associated with a third webpage. The third webpage may present confirmation of the information selected or input by the user. Not every session with a particular website will include the same stages nor will the stages always occur in the same order. Different sessions may include different stages and the stages may occur in different orders. In addition, while the stages are described as being associated with a particular webpage, the stages can be associated with particular in-line updates to blocks, fields, or elements of the same webpage (e.g., the same URL). In some scenarios, performance metrics for a webpage may be specific to user activities at different stages of loading a webpage.

A "target stage" may be associated with a specific event that is triggered as a result of user interactions on the website. In a list of stages, a target stage may be associated with a next stage or last stage reached by a user during a web session. In some scenarios, a target stage may be a webpage accessed by a user when a user performs a specific website interaction such as clicking on a button to place order, to register for a website, to sign up for a mailing list, to open a link or other actions. As illustrated, the staging metric may include one or more web sessions where the user(s) reached the target stage on the website.

An event where a user reaches a target stage during a web session may be referred to as a "conversion" or "conversion event." A conversion generally refers to a digital action by a user that achieves a particular result or objective. For example, a "conversion" can include a user placing an order, registering for a website, signing up for a mailing list, opening a link, or performing any other action. As such, a mere "visitor" to a website has been converted into a "user" or "consumer" of the website. The conversion process may involve one or more intermediate actions taken by the user to achieve the result of objective. For example, a conversion process for placing an order can include the intermediate steps of visiting a website, selecting one or more items, adding one or more items to an order, selecting parameters for the order, inputting order information, and submitting the order.

In another example, a conversion process for a user registering with a website can include the intermediate steps visiting the website, selecting a registration link, inputting an email address, and submitting the email address. The "performance" of a website or a particular webpage can be based on its "conversion rate." One method for determining a "conversion rate" (e.g., conversion percentage) is to compute the percentage of visitors to a website that perform a particular interaction or action on the website to reach a target stage. As illustrated, a performance metric from capture agent(s) 130 retrieved by the alerting system 140 may be the number of conversions or a conversion rate.

III. Anomaly Detection

Techniques are described herein for analyzing changes in user interactions on a website, detecting performance anomalies with the website based on the analysis, and alerting about the anomalies to website owners or developers.

In an illustrative embodiment, the alerting system 140 determines at least one attribute, a time of evaluation (e.g., a current time), and an evaluation time period for evaluating a website's performance. At least one attribute may be a type of device used to access the website or a type of web browser used to access the website. A sensitivity value may be received from a client device (or website provider's dashboard). The client or website provider may be provided with a dashboard or a user interface (UI) to select a specific sensitive value, e.g., using a sliding scale. The sensitivity value may be a statistical measure that can control the ability to accurately determine and report performance anomalies. The client may select a sensitive value between 0 and 10 on the user interface or dashboard provided by the client, where 0 may correspond to lowest sensitivity and 10 may correspond to highest sensitivity for receiving performance anomaly alerts. The client may receive alerts from the alerting system 140 in accordance with the selected sensitivity.

Similarly, a client may select one or more attributes (e.g., a type of device, a type of web browser, etc.) from a dashboard presented to the client by the alerting system. The client may also be able to select type of attributes (e.g., Chrome, IE, Safari, etc.) for a specific attribute (e.g., a browser type). Over the dashboard, a client may create an alert to monitor performance metrics or data for specific attribute and attribute value over a certain time period or time-window (e.g., 5 minutes alert).

In an alternative embodiment, a client may simply request anomalies to be reported for a specific time-period without specifying attributes or sensitivity. In above embodiment, the alerting system 140 may identify top attributes and attribute values. A list of attributes such as a type of device, a type of web browser, etc. may be configured within the alerting system 140. For the configured attributes, the alerting system 140 may identify and rank attribute values based on their prevalence relative to other values of the attribute. For example, for a web browser attribute, the alerting system may rank a first attribute value (e.g., Chrome) over a second attribute value (e.g., Safari) if a number of website users using the first attribute value are higher than the second attribute value. The client may further provide a time of evaluation and an evaluation time window for evaluating a website's performance. For example, as shown in FIG. 2A (described in more detail later), a client may create an alert for the evaluation time-window of 5 minutes where the time of evaluation may be a current time (e.g., 4:00 AM).

Once the at least one attribute and attribute values, a time of evaluation, and an evaluation time period for evaluating a website's performance are determined, the alerting system 140 may identify a set of time-windows for the attribute value based on the evaluation time period. The alerting system may identify a set of time-windows for the time of evaluation for each of attribute values. For example, as shown in FIG. 2A, for a time of evaluation of 4:00 PM and the evaluation period of 5 minutes (e.g., 3:55-4:00 PM), the alerting system may identify six five-minute time-windows before and after 3:55-4:00 PM time-window. As shown in FIG. 2A, these time-windows may be 3:40-3:45 PM, 3:45-3:50 PM, 3:50-3:55 PM, 3:55-4:00 PM, 4:00-4:15 PM, 4:15-4:20 PM, and 4:25-4:30 PM.

In the above example, a window length for time-windows may be determined based on a client's input for alert within a dashboard. For example, if a client creates a five minute alert, seven different time-windows (3:40-3:45 PM, 3:45-3:50 PM, 3:50-3:55 PM, 3:55-4:00 PM, 4:00-4:05 PM, 4:05-4:10 PM, and 4:10-4:15 PM) are created for five minute alert, as shown in FIG. 2A. Similarly, for a fifteen or thirty minute alert, five different time-windows may be generated. For an hourly alert, three different time-windows may be generated. For example, for an hourly alert at 4:00 PM (or time period of 3:00-4:00 PM), three time-windows of 2:00-3:00 PM, 3:00-4:00 PM, and 4:00-5:00 PM may be created.

In the above implementation, after the time-windows are identified for each of attribute values, the alerting system 140 may receive a set of performance metrics for each of the time-windows from historical web sessions. The performance metrics can be values for the same type of metric, but measured on different days for the same time-window, thereby providing a range of performance metric values for the time-window. As shown in FIG. 2A, for 5 minute alerts at 4:00 PM, the alerting system may retrieve performance data for above time-windows (3:40-3:45 PM, 3:45-3:50 PM, 3:50-3:55 PM, 3:55-4:00 PM, 4:00-4:15 PM, 4:15-4:20 PM, and 4:25-4:30 PM) from historical web sessions. For each of the time-windows, the alerting system can determine a performance range based on the retrieved performance data, further illustrated in FIG. 3 (described later).

The performance range for a specific time-window may show performance of the website for that time-window in historical web sessions. For example, a performance metric for an attribute value may be between 40%-80% for time period of 3:40-3:45 PM within historical web sessions, as shown in FIG. 2A. The performance metrics may be a conversion rate of a webpage or website specific to one or more selected attribute values. Other examples of a performance metric can be discrete numbers (e.g., total sessions) or continuous values (e.g., average page load time). The performance range for a specific time-window may be determined based on a mean (or other statistical value, such as a median or mode) and a standard deviation of the historical performance metrics for that time-window. The alerting system may determine an upper bound and a lower bound for a specific time-window based on the mean and the standard deviation of the performance metrics.

Accordingly, performance ranges are determined based on historical web sessions for all the identified time-windows. Different weights may be assigned to performance ranges of different time windows, as shown in FIG. 2B. The weights may be assigned to different performance ranges for time-windows based on proximity of the time-window to the time of evaluation. For example, the performance range for the time-window of 3:40-3:45 PM may be assigned with lower weight than the performance range for the time window 3:50-3:55 PM.

The alerting system 140 can determine an evaluation range based on weighted performance ranges and the sensitivity value. The evaluation range is specifically for the time-window for a selected evaluation time. As shown in FIG. 2C, the evaluation range for the selection time of evaluation, 4:00 PM, is determined to be 35-70% based on weighted performance ranges in FIG. 2B. The alerting system 140 can determine an upper bound of the evaluation range based on weighted upper bounds for the set of time-windows. Similarly, the lower bound of the evaluation range are determined based on weighted lower bounds for the time-windows.

The alerting system 140 then retrieves a performance metric for the time of evaluation (4:00 PM, as shown in FIGS. 2A-2C) from at least one capture agent. The performance metric for the time of evaluation indicates user activities (e.g., conversion rate) of the website at the time of evaluation for one or more attribute values. In the above scenario, if the alerting system 140 determines that the performance metric at the time of evaluation is outside the evaluation range then the alerting system 140 may send an alert to a client device indicating at least one anomaly in the website's performance. The alerting system may alert the client over a dashboard or a user interface configured for the client device.

FIGS. 2A-2C illustrates a first example of steps performed to determine an evaluation range for an evaluation time-window according to certain embodiments described herein. As illustrated in FIG. 2A, for each attribute value, for an evaluation period of 5 minutes and time of evaluation of 4:00 PM, the alerting system may identify six five-minute time-windows before and after 4:00 PM. These time-windows may be 3:40-3:45 PM, 3:45-3:50 PM, 3:50-3:55 PM, 3:55-4:00 PM, 4:00-4:15 PM, 4:15-4:20 PM, and 4:25-4:30 PM. The x-axis for FIG. 2A illustrates the time-windows and y-axis of FIG. 2A illustrates a performance range for time-windows. For example, a performance range for an attribute value may be 40%-80% for a time period of 3:40-3:45 PM within historical web sessions, as shown in FIG. 2A.

FIG. 2B depicts assignment of plurality of weights on the performance ranges. The weights may be assigned to different performance ranges for time-windows based on proximity of the time-window to the time of evaluation. If a time-window is close to the time of evaluation, the performance range for that time-window may be given higher weight. For example, as shown in FIG. 2B, a performance range of 3:55-4:00 PM is assigned higher weight than the performance range of 2:55-3:00 PM. Accordingly, the performance ranges may be assigned different weights, as shown by the weighting curve 270 in FIG. 2B.

As shown in FIG. 2C, evaluation range for the selection time of evaluation, 4:00 PM, is determined to be 35-70% based on weighted performance ranges in FIG. 2B.

FIGS. 2D-2F illustrates a second example of steps performed to determine an evaluation range for an evaluation time-window according to certain embodiments described herein. As illustrated in FIG. 2D, for an each attribute value, for evaluation period of 5 minutes and time of evaluation of 4:00 AM, the alerting system may identify six five-minute time-windows before and after 4:00 AM. These time-windows may be 3:40-3:45 AM, 3:45-3:50 AM, 3:50-3:55 AM, 3:55-4:00 AM, 4:00-4:15 AM, 4:15-4:20 AM, and 4:25-4:30 AM. The x-axis for FIG. 2D illustrates the time-windows and y-axis of FIG. 2D illustrates a performance range for time-windows. For example, a performance range for an attribute value may be 25%-65% for a time period of 3:40-3:45 AM within historical web sessions, as shown in FIG. 2D.

FIG. 2E depicts assignment of plurality of weights on the performance ranges. The weights may be assigned to different performance ranges for time-windows based on proximity of the time-window to the time of evaluation. If a time-window is close to the time of evaluation, the performance range for that time-window may be given higher weight. For example, as shown in FIG. 2E, a performance range of 3:55-4:00 AM is assigned higher weight than the performance range of 2:55-3:00 AM. Accordingly, the performance ranges may be assigned different weights, as shown by the weighting curve 280 in FIG. 2E. As shown in FIG. 2F, evaluation range for the selection time of evaluation, 4:00 AM, is determined to be 15-50% based on weighted performance ranges in FIG. 2E.

An As illustrated in FIGS. 2A-2C and 2D-2F, different evaluation ranges may be determined based on historical ranges for the different time-windows and the time of evaluation. For example, as shown in FIG. 2C, the evaluation range for time of evaluation of 4:00 PM is 35-70%. However, as shown in FIG. 2F, the evaluation range for time of evaluation of 4:00 AM is 15-50%. Typically, traffic on a website at 4:00 AM is lower than 4:00 PM. Accordingly, the evaluation range for 4:00 PM is different than 4:00 AM.

IV. Techniques for Alerting System

The alerting system 140 may perform one or more techniques for evaluating performance metrics and alerting about performance anomalies that occur during a time period. An example technique is depicted in FIG. 3 description.

Figure 3:
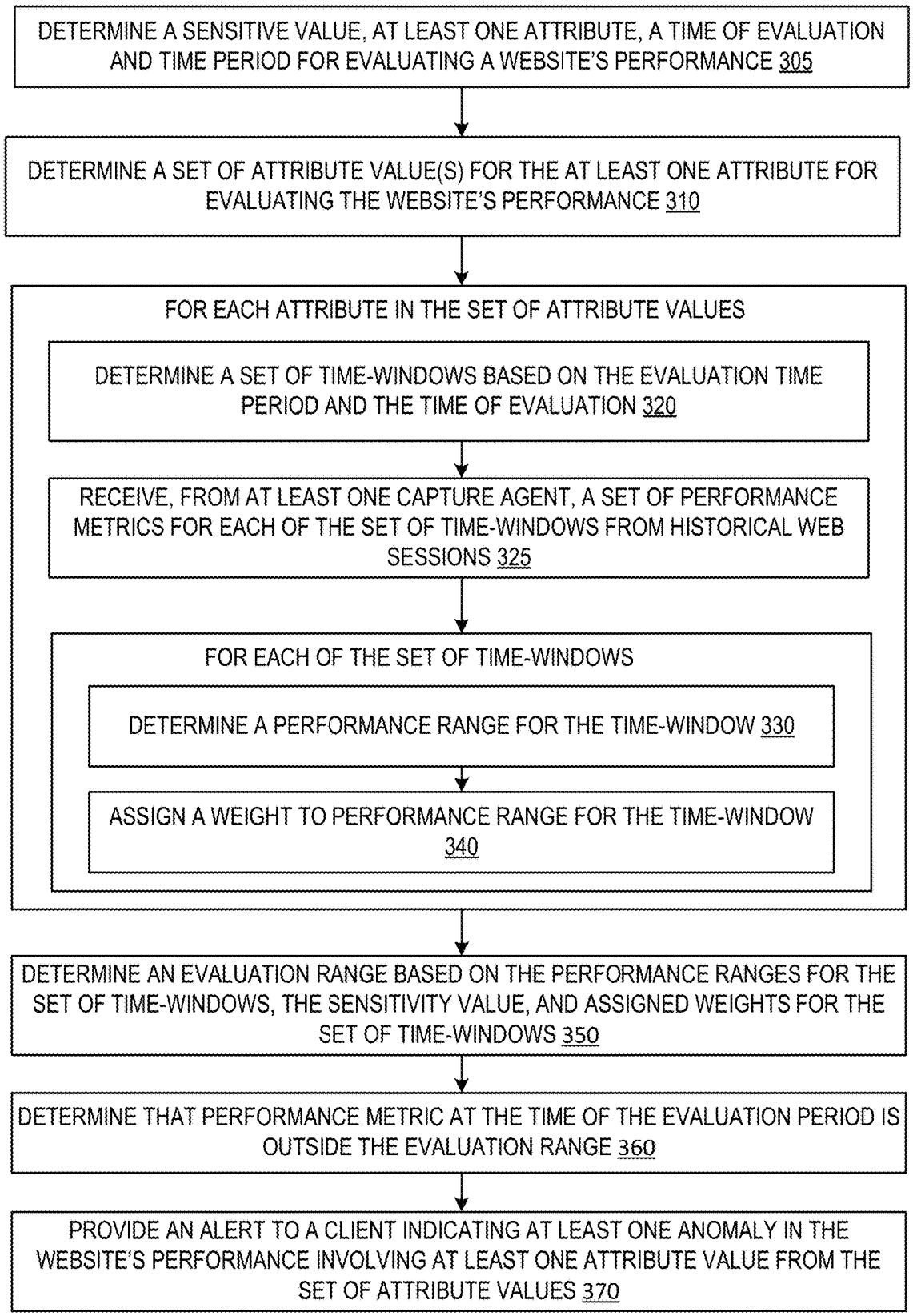
FIG. 3 is a flowchart depicting processing performed by an alerting system for a website according to certain embodiments described herein.

FIG. 3 is a flowchart depicting a method 300 performed by an alerting system for a website according to certain embodiments described herein. The processing depicted in FIG. 3 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 3 and described below is intended to be illustrative and non-limiting. Although FIG. 3 depicts the various processing steps occurring in a particular sequence or order, this is not intended to be limiting. In certain alternative embodiments, the steps may be performed in some different order or some steps may also be performed in parallel. In an example embodiment, evaluation performed by the alerting system 140 may be performed for an individual webpage or for an entire website. Method 300 may be performed continuously over time (e.g., for each new 30-minute time period) or be performed on-demand for a particular time period, as can other methods described herein.

At block 305, as depicted in FIG. 2, the processing may be triggered when an alerting system (e.g., alerting system 140 in FIG. 1) determines at least one of a sensitivity value, an attribute, a time of evaluation, and a time period for evaluating a website's performance. The time of evaluation can identify a particular time-window for the evaluation, e.g., a particular 30-minute time period. The determination may be from default values stored in the system. For example, the system can store default value for a time-window and a sensitivity value. In some embodiments, a client can provide just the type of performance metric and the system can do the rest. The at least one attribute can correspond to a characteristic of sessions of user devices with the website.

With respect to sensitivity value, a client may provide a sensitivity value between a certain range such as between 0 and 5, where 0 is less sensitive compared to 5. The alerting system may change the sensitivity value based on historical performance to avoid inaccurate alerts to the client. In some embodiments, the user may not provide sensitivity but it is determined by the alerting system based on the industry standard or historical website performance. To create an alert, the client may also provide a time-period for an alert. For example, a client may create a five minute alert to monitor performance data (e.g., conversions, checkout rates, or sales number).

At block 310, the alerting system further determines a set of one or more attribute values for the attribute for evaluating the website's performance. In certain implementations, a client may provide a set of attribute values (e.g., Chrome, IE, Safari, etc.) for the attribute for evaluating the website's performance. In alternative implementations, the alerting system may identify top attributes and attribute values to track metrics for those attribute values. The alerting system may rank the top attribute values based on their prevalence relative to other values of the attribute. As a further example, method 900 of FIG. 9 can be used to determine one or more attribute values to analyze.

At block 320, the alerting system determines a set of time-windows for the attribute value based on the evaluation time and evaluation time-period. The same set of time-windows can be used for each attribute value or different time-windows can be used. As illustrated in FIG. 2A, for an evaluation period of 5 minutes and time of evaluation of 4:00 PM, the alerting system may identify six five-minute time-windows before and after 4:00 PM which may be 3:40-3:45 PM, 3:45-3:50 PM, 3:50-3:55 PM, 3:55-4:00 PM, 4:00-4:15 PM, 4:15-4:20 PM, and 4:25-4:30 PM.

At block 325, the alerting system 140 receives historical web session events including a set of historical performance metrics for each of the set of time-windows from historical web sessions from one or more capture agent(s) associated with user device(s). The historical performance metrics can be determined from the historical web session events, e.g., by determining a statistical value for a set of sessions, such as for load time or number of sessions reaching a target page. The set of sessions can be ones that include the attribute value. In an example embodiment, the plurality of historical performance metrics may be received from a capture agent(s) 130, e.g., at a time when they are current performance metrics. Thus, the historical performance metrics may be referred to generally as performance metrics.

The plurality of performance metrics may be associated with users' activities on the website during the plurality of web sessions. In an example embodiment, a metric may be a combination of multiple performance data (e.g., conversions, checkout rates, or sales number). Alternatively, each of the types of performance data can be different types of performance metrics. In block 325, the alerting system may receive historical performance metrics for the same time-frame or time-window on the same day of the week (as the time of evaluation) and neighboring time-windows (as shown in FIG. 2A) for evaluation.

In certain implementations, a performance metric may be a load time metric or a rate of certain user activities on a webpage or entire website, each of which are different types of performance metrics. The load time metric may be a combination of multiple metrics associated with one or more network operations involved in loading the webpage. For example, load time metric may include a combination of the time it took for a client device to request a webpage and the time it took for a server to respond to the request. Accordingly, a timing metric may be an aggregation of plurality of time points in time which can be measured.

In the above embodiment, the network operations may be network operations such as requesting a webpage, processing of a webpage using a Transmission Control Protocol (TCP) protocol or looking up a webpage on a Domain Name Server (DNS), receiving a response from a server, and other operations. In some scenarios, the network operations may be associated with different phases of a page load life cycle. In an example implementation, different phases of page load life cycles may be phases of standard performance phases for a browser. The phases may include a redirect time, an application cache time, a Domain Name System (DNS) time, a request time, a response time, processing time, loading time, and TCP time.

In some implementations, performance metrics may be customized by a client (e.g., a website owner). The customized metrics may be defined within the capture agent(s) 130. A website provider or client can define customized metrics such as a start and stop times for a specific event (e.g., loading an image on the webpage) and subsequently measure performance by aggregating these timing measurements for the customized metrics. Different website owners may be interested in tracking and analyzing different types of timing metrics to analyze their websites' performances.

In above implementation, the alerting system 140 may determine a set of webpages for the website and perform analysis for the selected performance metrics on each webpage for the website. For each webpage, the alerting system 140 may receive values for the performance metrics from a capture agent(s) 130. The capture agent(s) 130 may monitor, capture, and store performance measurements for a plurality of timing metrics from plurality of web sessions (on plurality of user devices) involving each of webpages on a regular basis. (as discussed in FIG. 1 description).

At block 330, for each time-window, the alerting system 140 determines a performance range. To determine a performance range for each time-window, the alerting system can receive historical performance data (set of performance metrics) for that time-window. For example, for time-window of 3:45-3:50 PM (as shown in FIG. 2A), the alerting system may receive performance metrics for last 15 days from the time of evaluation for the time-window of 3:45-3:50 PM. If the performance metrics from the capture agent(s) 130 are not in metrics format, the alerting system may generate metrics from the performance data gathered by the capture agent(s) 130.

After gathering historical metrics for the specific time-window, the alerting system calculates mean and standard deviation for the historical performance metrics. The alerting system may also determine a new sensitivity value or change sensitivity value based on the mean and standard deviation for the historical performance data. For example, when traffic is typically low on a website during certain hours at night, the sensitivity value may need to be adjusted accordingly. Otherwise, the alerting system may become overly sensitive in reporting slow activities when traffic is expected to be low during that time-window. Additionally, based on the standard deviation, the alerting system identifies upper and lower bounds and variance for the time-window.

At block 340, for each time-window, the alerting system 140 assigns a weight to the performance range. The weights may be the same for each time-window or may be different. As an example, an exponential functions may be used to determine weights for different time windows. In some implementations, these exponential weights may be assigned to the performance ranges (e.g., both upper bound and lower bond) for the performance ranges. As shown in FIG. 2A, the performance range from the neighboring time-windows (e.g., 3:45-3:50 PM) may be assigned lower weight than the range for the same time window (e.g., 3:55-4:00 PM).

At block 350, the alerting system 140 determines an evaluation range based on the performance ranges for the set of time-windows, the sensitivity value, and assigned weights for the set of time-windows. The alerting system 140 can receive performance metric for the evaluation period At block 360, the alerting system 140 determines whether the performance metric for the evaluation period is outside the evaluation range in block 360. The performance metric can be determined using web session events received for the current time of evaluation, e.g., as described herein. The alerting system 140 can compare the performance metric with upper bound and lower bound of the evaluation range. If the performance metric is higher than the upper bound and lower than the lower bound, then the performance metric is out of the evaluation range.

At block 370, the alerting system 140 alerts a client indicating at least one performance anomaly in the website's performance involving at least one attribute value from the set of attribute values. For example, if the alerting system 140, determines that the performance metric for evaluation period is outside the evaluation range in block 360, the alerting system 140 may provide an alert to the client (e.g., an alert or notification sent to the client's device) indicating a performance anomaly. The alert may be provided in various ways, e.g., by transmitting the alert to a client device or by displaying the alert to a client.

V. System for Alerting Performance Anomalies

Figure 4:
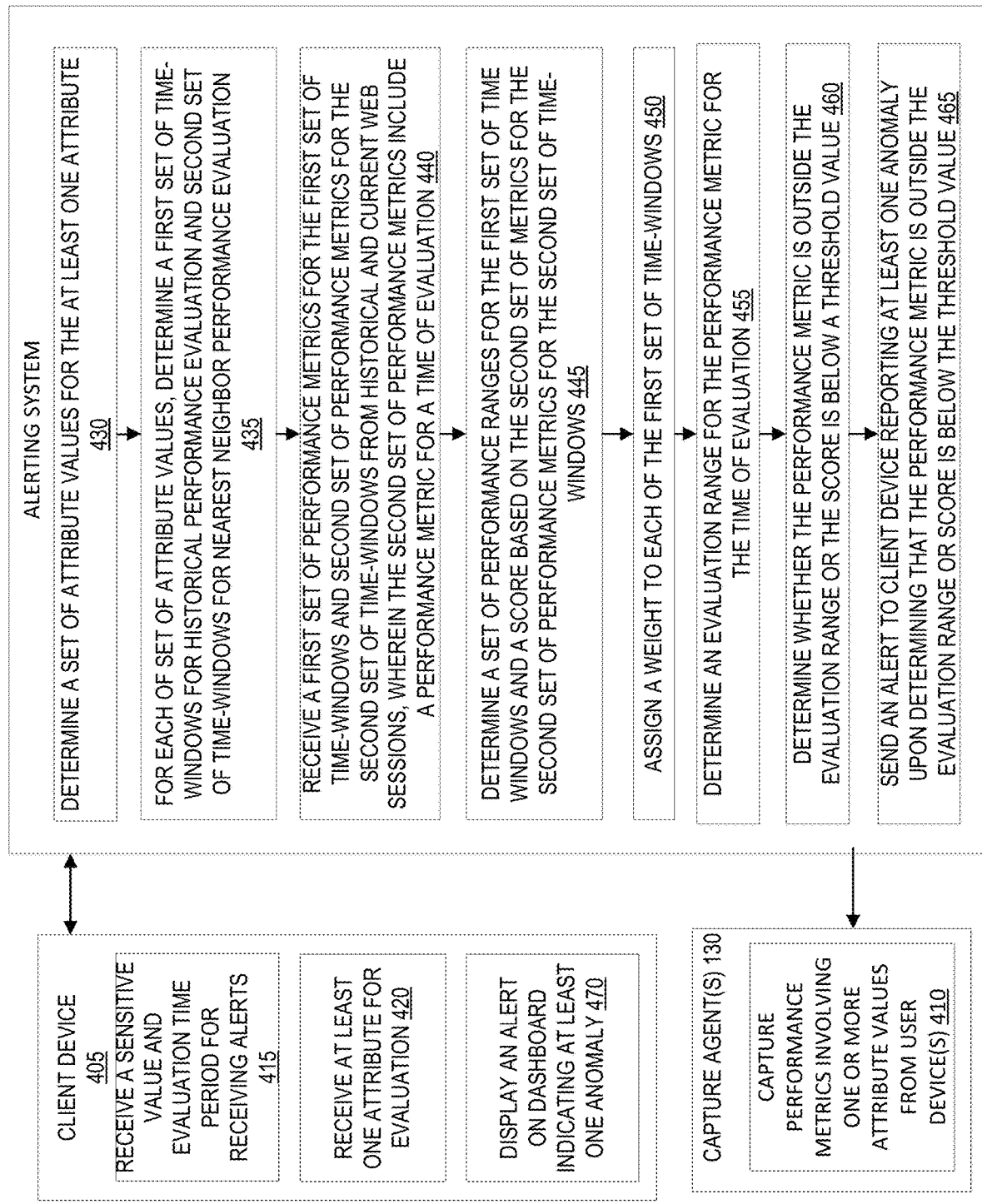
FIG. 4 is a flowchart depicting processing performed for alerting about website performance anomalies according to certain embodiments described herein.

As illustrated in FIG. 1 description, the alerting system 140 may interact with subsystems such as one or more capture agent(s) 130 to receive performance metrics. In addition, the alerting system 140 may also interact with one or more client devices, as further illustrated in FIG. 4. FIG. 4 is a flowchart depicting processing performed for alerting about website performance anomalies according to certain embodiments described herein. FIG. 4 shows the interaction between a client device 405, alerting system 140, and capture agent(s) 130 for retrieving performance metrics from capture agent(s) 130, retrieving inputs from a client device 405, performing a performance analysis by the alerting system 140, and reporting anomalies to client device 405.

In block 410, the capture agent(s) 130 capture performance data involving one or more attributes and attribute values from user device(s) accessing the website. The capture agent(s) 130 may constantly monitor and capture user activities on web sessions to capture performance data, as explained in FIG. 1 description. The capture agent(s) 130 may further determine performance metrics (e.g., conversions) based on the captured performance data.

In block 415, the client device 405 receives from a client a sensitive value and evaluation time period for receiving alerts. For example, a client may provide a sensitive value between 0-10 and set the time-period for alerts to be 5 minutes. The client may select the sensitive value and set the time-period over a user interface provided by the alerting system on a client device.

In block 420, the client device 405 may also receive from a client at least one attribute for evaluation from a client. For example, a client may select at least one attribute such as a type of device, a type of browser, etc. from a drop down menu within the user interface on the client device 405.

In block 430, the alerting system 140 determines a set of attribute values for the at least one attribute. As illustrated in FIG. 3 description, the alerting system 140 may identify the set of attribute values for at least one attribute and order the set based on popularity or usage of the attribute value for accessing the website. Alternatively, a client may select one or more attribute values within a dashboard presented to the client on the client device 405.

Figure 5:
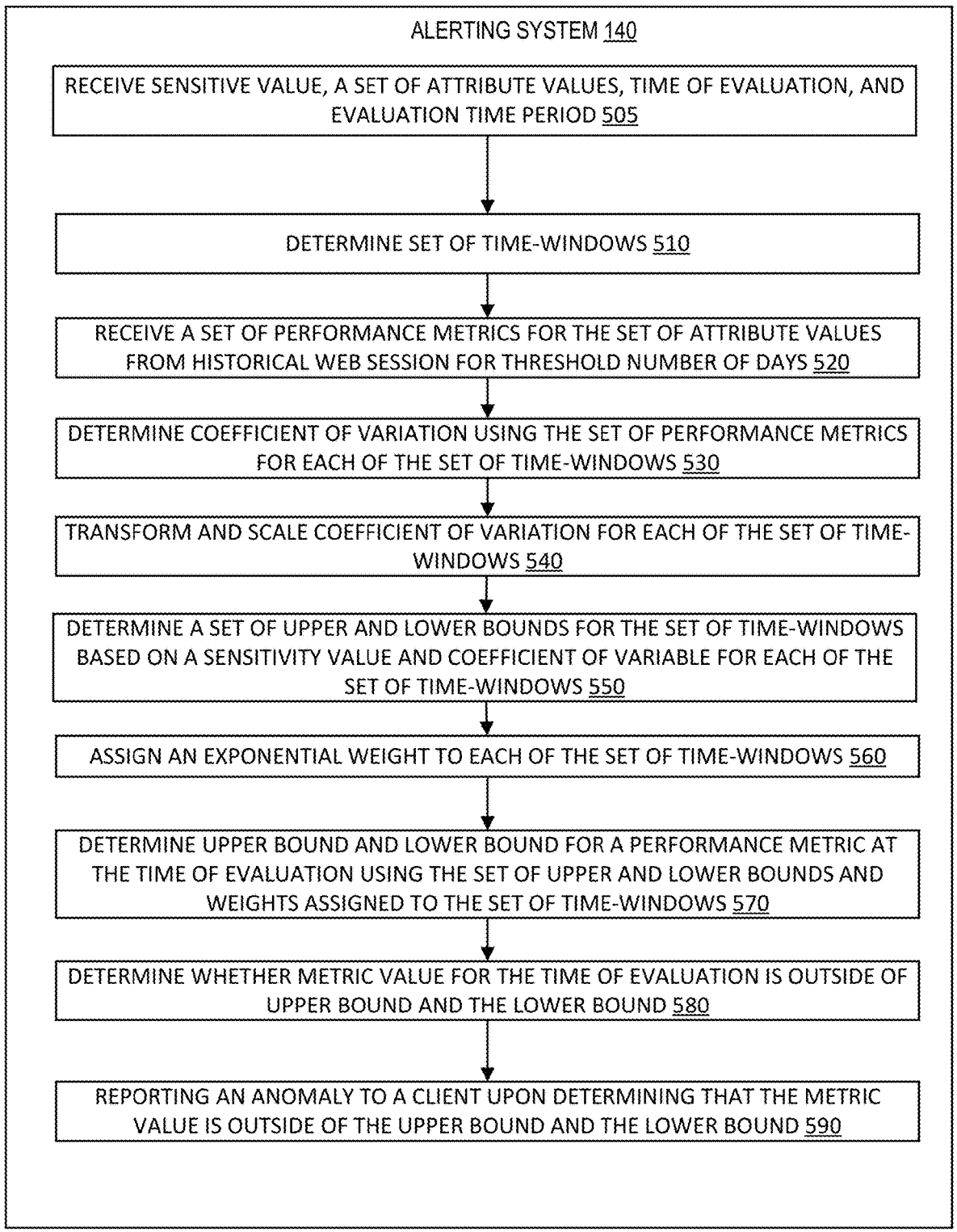
FIG. 5 is a flowchart depicting processing performed for alerting about performance anomalies using historical performance evaluation technique according to certain embodiments described herein.

In block 435, the alerting system 140, for each of the set of attribute values, determines a first set of time-windows for historical performance evaluation (further illustrated in FIG. 5 description). Alternatively, the alerting system 140 may determine a second set of time-windows for nearest neighbor performance evaluation (further illustrated in FIG. 6 description).

In block 440, the alerting system 140 retrieves a first set of performance metrics for the first set of time-windows from the one or more capture agent(s) 130. Additionally, the alerting system 140 may also retrieve a second set of performance metrics for the second set of time-windows from the one or more capture agent(s) 130.

In block 445, the alerting system 140 determines a set of performance ranges for the first set of time-windows, as further illustrated in FIG. 5 description. Similarly, the alerting system 140 may calculate a score based on the second set of metrics for the second set of time-windows.

In block 450, the alerting system 140 may determine a weight for each of the first set of time-windows, as described in FIG. 3 description.

In block 455, the alerting system 140 may determine an evaluation range for the performance metric for the time of evaluation (further described in FIG. 5 description).

In block 460, the alerting system 140 receives performance metric for the evaluation time period and determines whether the performance metric is outside the evaluation range.

In block 465, the alerting system 140 sends an alert to a client device 405 reporting at least one anomaly upon determining that the performance metric is outside the evaluation range. Alternatively, the alerting system 140 may alert the client device if the score, calculated in block 445, is above a certain threshold.

In block 470, the alerts sent to the client device 405 in block 465 may be displayed on a dashboard of the client's device indicating one or more anomalies with the website's performance.

A. Historical Performance Evaluation—Threshold Bounds

As illustrated in FIG. 4, block 435, the alerting system 140 may alert a client about performance anomalies using historical performance evaluation technique. FIG. 5 is a flowchart depicting processing performed for alerting using historical performance evaluation technique according to certain embodiments described herein.

FIG. 5 illustrates determining one or more performance anomalies using a technique that involves analyzing historical performance metrics and comparing a current performance metric with analysis of historical performance metrics.

In block 505, as illustrated in FIGS. 3 and 4, an alerting system 140 determines a sensitivity value, a set of attributes, attribute values for each of the attributes, and evaluation time period for a specific time of evaluation. In an example embodiment, a client may create a 5 minute alert and current time of evaluation in the example is 4:00 AM on $13^{th}$ July.

In block 510, the alerting system 140 identifies a set of time-windows. In the above example, for the time of evaluation of 4:00 AM and 5 minute alert, seven time windows where three time-windows are before and three time values are after the time of evaluation which is 4:00 AM. The alerting system 140 can identify time-windows of 3:40-3:45 AM, 3:45-3:50 AM, 3:50-3:55 AM, 3:55-4:00 AM, 4:00-4:15 AM, 4:15-4:20 AM, and 4:25-4:30 AM, as illustrated in FIG. 2B.

In block 520, the alerting system 140 receives a set of performance metrics for the set of attribute values from historical web sessions for threshold number of days. In above example, the alerting system 140 may get set of performance metrics for each of time windows (e.g., 3:40-3:45 AM, 3:45-3:50 AM, 3:50-3:55 AM, 3:55-4:00 AM, 4:00-4:15 AM, 4:15-4:20 AM, and 4:25-4:30 AM) for past 15 days from July 13.

In block 530, the alerting system 140 determines a coefficient of variation using the set of performance metrics for each of the time-windows. For each of the time-windows, the alerting system 140 calculates coefficient of variations using performance metrics for time-windows before, itself and after the time-window. For example, for time-window of 3:40-3:45 AM, performance metrics for 03:30-03:35, 03:35-03:40, 03:40-03:45, 03:45-03:50, 03:50-03:55, 03:55-4:00, 04:00-04:05 on July 12 (day before date of July 13) are obtained. The alerting system 140 determines a coefficient of variation for 3:40-3:45 AM based on the performance metrics. If performance metrics for 03:30, 03:35, 03:40, 03:45, 03:50, 03:55, 04:00 on July 12 are x1, x2, x3, x4, x5, x6, and x7, then coefficient of variation CoV is calculated using function calcCoefficientOfVariation([x1, x2, x3, x4, x5, x6, x7]). Such a variation can be measured as the standard_deviation/mean of values, but other measures of variation can be used. A higher CoV corresponds to greater volatility, which can result in using a greater evaluation range when CoV is closer to the upper limit (in the example below 0.72, vs the lower limit 0.00).

In block 530, similar calculations for the time-window of 3:40-3:45 AM are performed for the past 14 days. Instead of calculating coefficient of variation only for July 12, here, the alerting system 140 calculates the coefficient of variation for June 29, June 30, July 1, . . . , July 12. Accordingly, 14 coefficients are calculated for time-window of 3:40-3:45 AM. The alerting system 140 may average them to get a final coefficient for the time-window 3:40-3:45 AM. Similarly, coefficients for other time windows are calculated using the above calculations.

In block 540, the alerting system 140 transforms and scales coefficient of variation for each of the set of time-windows. First, the alerting system 140 clips each of the coefficients and determines a range for each of the coefficients. In the above example, the coefficient of variation C for time-window 3:40-3:45 AM may be clipped, so that it cannot be higher than a first threshold and lower than a second threshold. For example, C=clip (C, 0.0, 0.72) where the coefficient of variation cannot be lower than 0.0 and higher than 0.72. Once the C is clipped, range for C is determined. In the above example, map range for C may be determined using function mapRange (C, (0.0, 0.72), (1,2)), where the map may be from range (0.0, 0.72) to range (1,2). Similarly, C for other time-windows are also clipped.

In block 550, the alerting system 140 determines a set of upper and lower bounds for each of the set of time-windows based on the sensitivity value and coefficient of variable for each of the set of time-windows. In the above example, upper and lower bounds for time-windows 03:30, 03:35, 03:40, 03:45, 03:50, 03:55, 04:00 AM. For each of the time windows, historical performance metrics are received by the alerting system 140. In certain implementations, performance metrics for time-windows can be received for time periods six weeks back from the week of July 13 instead of 14 days. The alerting system 140 calculates mean and standard deviation for each time-window from the historical performance metrics.

The alerting system 140 calculates upper bound for each of the time-window using the mean, standard deviation, sensitivity value and coefficient of variation C. The upper bound may be determined using the function (mean+stddev× sensitivity×C for the time-window). Similarly, the lower bound may be determined using the function (mean+stddev× sensitivity×C for the time-window). Accordingly, a set of upper bounds and a set of lower bounds are determined for the set of time-windows.

In block 560, the alerting system 140 assigns an exponential weight to each of the set of time-windows or performance ranges to smoothen the calculation for the time of evaluation. In the above example, for the set of time windows (e.g., 3:40-3:45 AM, 3:45-3:50 AM, 3:50-3:55 AM, 3:55-4:00 AM, 4:00-4:15 AM, 4:15-4:20 AM, and 4:25-4:30 AM), different exponential weights are assigned. For example, exponential weights of 3, 9, 27, 81, 243, 729, and 2187 are assigned to the set of time-windows where base is 3.

In block 570, the alerting system, based on the assigned weights and performance ranges for the set of time-windows, determines an upper bound and a lower bound for the time of evaluation. The alerting system 140 can calculate an upper bound and a lower bound for the time of evaluation. In the above example, an upper bound for the current time of evaluation of 4:00 AM may be calculated using three steps. In the first step, upper bounds for the set of time windows from the historical metrics determined in block 550, are sorted in descending order. In a second step, the alerting system 140 determines a weighted average based on the sorted upper bounds for the set of time-windows and weights assigned in block 560. In a third step, the alerting system 140 determines the upper bound based on the weighted average and upper bound for the specific time-window that is associated with the current evaluation period. For example, the upper bound for 3:55-4:00 AM, the upper bound is determined to be the maximum of the weighted average determined in step two and the upper bound for 3:55-4:00 AM (as determined in block 550).

Similarly, in block 570, a lower bound for the current time of evaluation of 4:00 AM may be calculated using three steps. In the first step, lower bounds for the set of time windows from the historical metrics determined in block 550, are sorted ascending order. In a second step, the alerting system determines a weighted average based on the sorted lower bounds for the set of time-windows and weights assigned in block 560. In a third step, the alerting system 140 determines the lower bound based on the weighted average and lower bound for the specific time-window that is associated with current evaluation period. For example, the lower bound for 3:55-4:00 AM, is determined to be the minimum of the weighted average determined in step two and lower bound for 3:55-4:00 AM (as determined in block 550).

In block 580, altering system 140 receives the performance data (or performance metric) for the time-window associated with the current time of evaluation, and determines whether metric value for the time of evaluation is outside of the upper and lower bounds determined in block 570. In block 590, the alerting system sends an alert to a client about a potential anomaly after determining that the metric value is outside of the upper bound and lower bound, as determined in block 580.

B. Nearest Neighbor Performance Evaluation Technique

Figure 6:
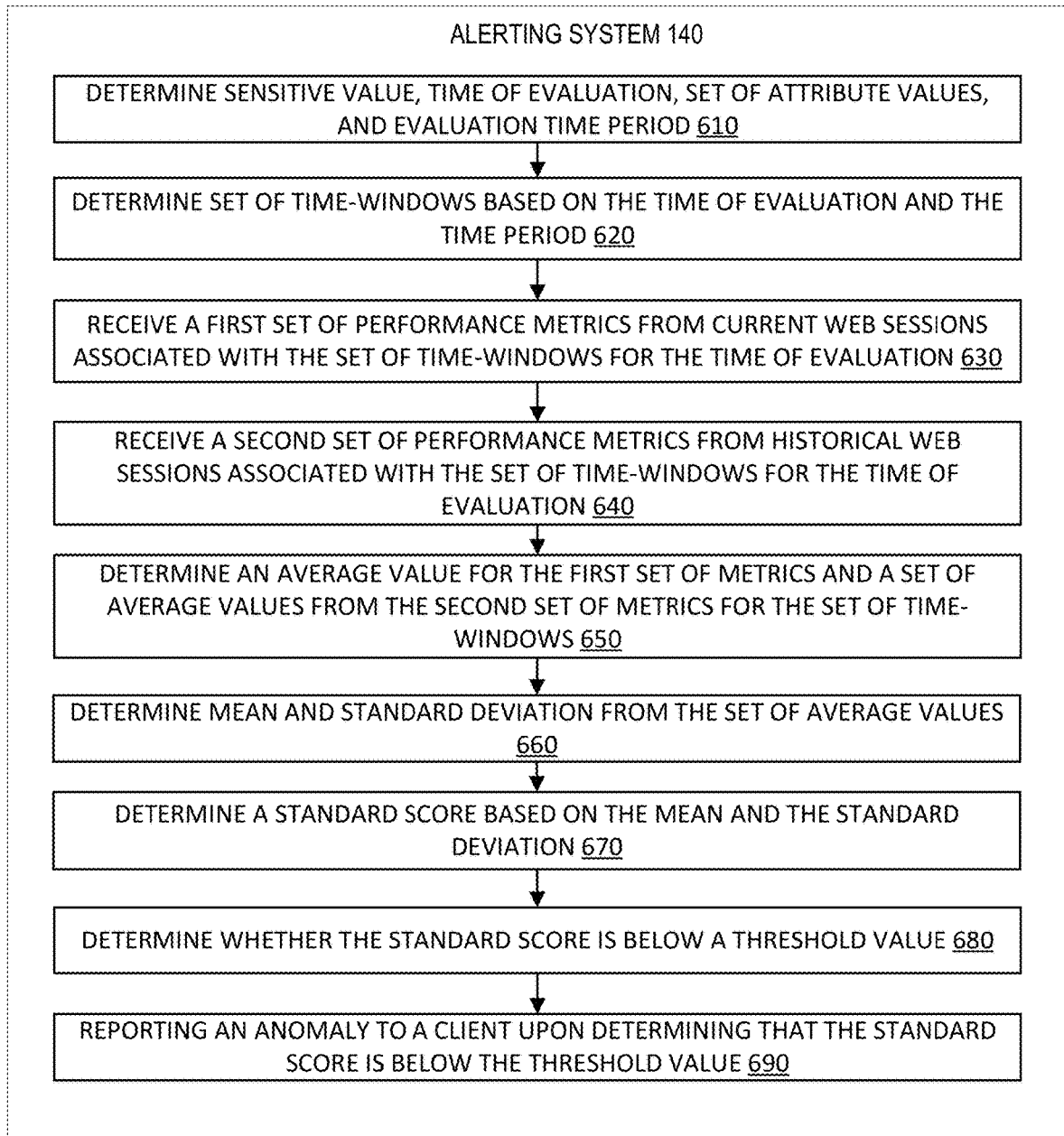
FIG. 6 is a flowchart depicting processing performed for alerting about performance anomalies using nearest neighbor performance evaluation technique according to certain embodiments described herein.

As illustrated in FIG. 4, the alerting system 140 may alert a client about performance anomalies using nearest neighbor evaluation technique. FIG. 6 is a flowchart depicting processing performed for alerting using nearest neighbor performance evaluation technique according to certain embodiments described herein.

FIG. 6 illustrates determining one or more performance anomalies using a technique that involves analyzing performance metrics for a date and time close to a time of evaluation and calculating a score based on the analysis. A benefit of using nearest neighbor(s) is that it can be used across multiple dimensions, and allows analysis to expand past point analysis. For example, knowing that the performance metric (KPI), day of week, and time of day, embodiments can easily determine outliers relative to the nearest neighbor data points. Tightly clustered data across these three dimensions are otherwise "normal".

In block 610, as illustrated in FIGS. 3 and 4, an alerting system 140 determines a sensitivity value, a set of attributes, attribute values for each of the attributes, and evaluation time period for a specific time of evaluation. In an example embodiment, a client may create a 5 minute alert and current time of evaluation in the example is 4:00 AM on 13th July.

In block 620, the alerting system 140 identifies a set of neighboring time-windows. In the above example, for the time of evaluation of 4:00 AM and 5 minute alert, seven time windows where six time-windows are before the time of evaluation which is 4:00 AM. The alerting system 140 can identify time-windows of 3:25-3:30 AM, 3:30-3:35 AM, 3:35-3:40 AM, 3:40-3:45 AM, 3:45-3:50 AM, 3:50-3:55 AM, 3:55-4:00 AM.

In block 630, the alerting system 140 receives a first set of performance metrics for the set of time-windows for the time of evaluation. In the above example, the alerting system 140 retrieves current performance metrics for timing-windows 3:25-3:30 AM, 3:30-3:35 AM, 3:35-3:40 AM, 3:40-3:45 AM, 3:45-3:50 AM, 3:50-3:55 AM, 3:55-4:00 AM for time of evaluation of 4:00 AM on $13^{th}$ July.

In block 640, the alerting system receives a second set of performance metrics from historical web sessions associated with the set of time windows for the time of evaluation. In above example, the alerting system may receive neighboring performance metrics (e.g., six-weeks) for the determined set of time-windows (e.g., 3:25-3:30 AM, 3:30-3:35 AM, 3:35-3:40 AM, 3:40-3:45 AM, 3:45-3:50 AM, 3:50-3:55 AM, 3:55-4:00 AM).

In block 650, the alerting system 140 calculates a set of average values for both the first set of metrics and the second set of metrics from blocks 630 and 640. In the above example, the alerting system may calculate the average of the first set of performance metrics for time-windows 03:30, 03:35, 03:40, 03:45, 03:50, 03:55, 04:00 on July 13. In addition, the alerting system may calculate the average of the second set of performance metrics for each of time-windows 03:30, 03:35, 03:40, 03:45, 03:50, 03:55, 04:00 for past six-weeks. Accordingly, in block 650, the alerting system may determine one average value for the first set of performance metrics and seven average values for each time-window from the second set of performance metrics.

In block 660, the alerting system determines a mean and standard deviation from the set of average values for the second set of performance metrics, as determined in block 650. In block 670, the alerting system determines a score for the average value determined in block 650 based on the mean and standard deviation calculated in block 660.

In block 680, the alerting system checks whether the calculated standard score from block 670 is below a certain threshold value. In the above example, the alerting system may determine whether the standard score is below the value of negative one (−1).

In block 690, upon determining that the standard score is below a certain threshold in block 680, the alerting system reports to the client device (e.g., 405) an alert indicating potential anomaly with the website. If the standard score is not below a certain threshold, then no alert is being reported.

In an alternative embodiment, the blocks in FIG. 6 are performed if a performance metric for the time of evaluation (e.g., 4:00 AM on $13^{th}$ July) is zero. If the performance metric value for 3:55-4:00 AM on $13^{th}$ July is not zero, then the blocks 610-680 are not performed. This can be done in order to identify flatlining behavior that may not be a flatline to zero.

VI. Detection of Errors

In some embodiments, additional context can be provided for anomalies. Along with information what a user reaching a particular stage of a website, a capture agent may capture error logs, etc. for the website. The alerting system can match a performance anomaly with errors to provide context to a client, e.g., identifying the specific errors associated with the poor performance that can be fixed to increase performance.

For example, upon detecting performance anomalies using blocks described in FIGS. 3, 4, and 5, the alerting system 140 may identify one or more errors from a set of error logs associated with the web session to correlate anomalies with the one or more errors. The errors may be with the website. For instance, the alerting system 140 may compare the one or more errors with errors for the time-window associated with previous web sessions. If similar errors in previous sessions were classified to be anomalies, the alerting system may classify the one or more errors to be at least one anomaly with the website. The alerting system may also display the one or more errors to the client on a client dashboard or user interface.

Figure 7:
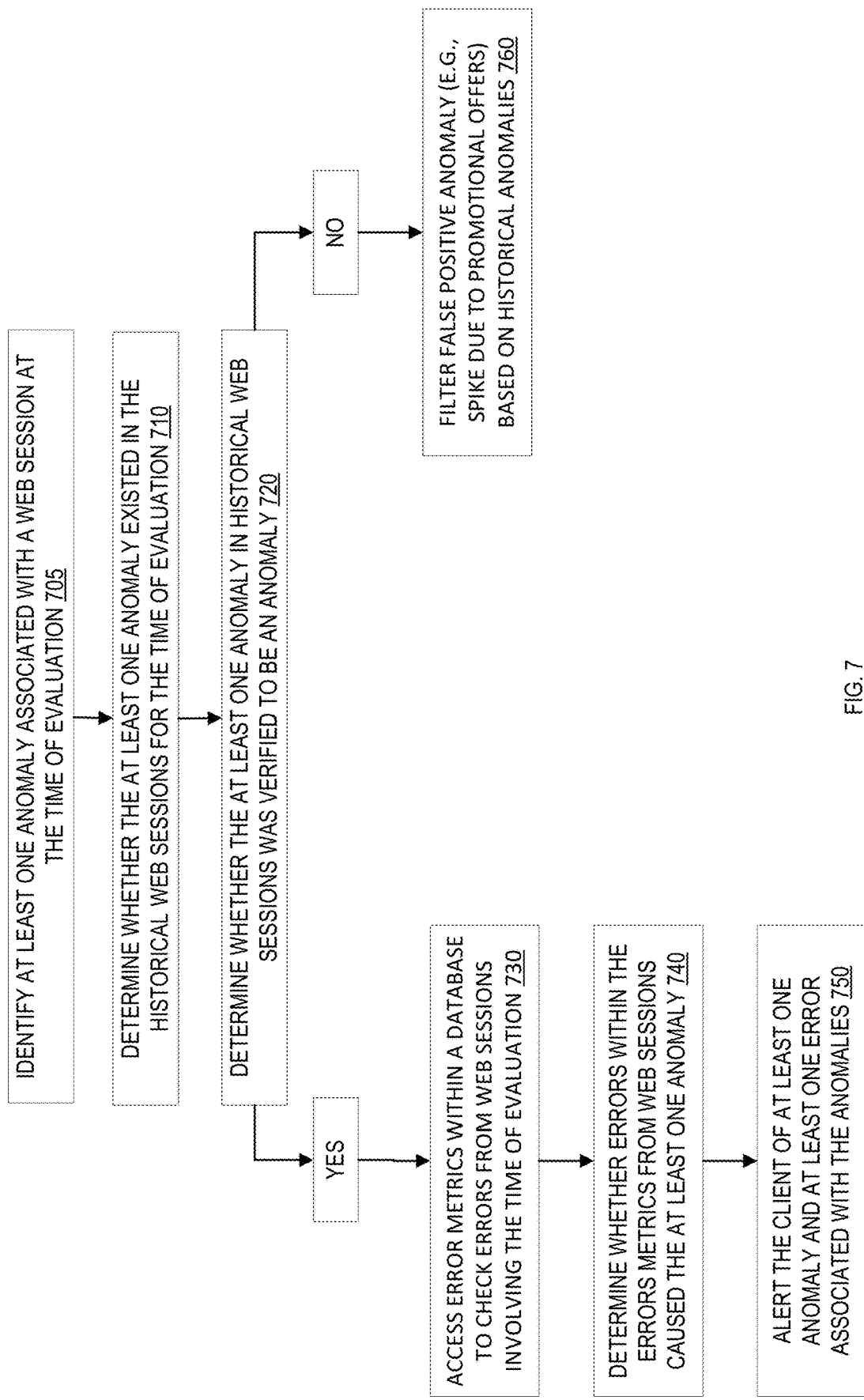
FIG. 7 illustrates additional techniques for alerting about performance anomalies according to certain embodiments described herein.

FIG. 7 illustrates a method 700 for alerting about performance anomalies according to certain embodiments described herein. In block 705, at least one anomaly associated with a web session is identified at the time of evaluation. This may be done as illustrated in blocks 305-370 in FIG. 3, which determine whether one or more performance anomalies are present during an evaluation time period.

In block 710, the alerting system 140 determines whether presence of the one or more anomaly existed in the historical web sessions involving the time of evaluation for the same time-period. The anomalies in the historical web sessions can be stored in various ways, e.g., in arrays, tables, or other data structures that include time data for the anomalies. The time of evaluation can used in the search query to identify the presence of the one or more historical anomalies.

In block 720, the alerting system 140 determines whether the one or more anomalies in historical web sessions were verified to be actual anomalies. The verification may be performed by a client or a user. For example, the user can mark an anomaly as a false positive and that would be stored to train the model going forward.

The verification of an anomaly can be stored as a state variable in the data structure for the historical web sessions. The verification itself for the historical web sessions can initially be done manually, e.g., to provide verification labels. Then, metadata (including time) of the previous anomalies can be analyzed to determine whether there is a sufficient match to consider a new anomaly as a true anomaly. Such a determination can use a machine learning model, where the initial labels of the historical anomalies are used as training data for the model.

If the historical anomaly was verified, then method 700 can proceed to block 730. In this manner, additional checks are only performed if the currently detected anomaly is likely to be an error. If the historical anomaly was not verified, then method 700 can proceed to block 760.

In block 730, the alerting system 140 accesses error logs within a database to identify errors from previous web sessions involving the time of evaluation. These error logs can be stored in various ways, e.g., in arrays, tables, or other data structures that include time data for the error logs. The time of evaluation can used in the search query to identify the presence of the one or more historical anomalies.

In block 740, the alerting system 140 identifies at least one error within the error logs that may have caused the one or more anomalies. The correlation of an error with an anomaly can be determined by associating an anomalous time-window (time period) with an error anomalies, e.g., a spike in the occurrence of a type of web session event, e.g., as described in the next section.

In block 750, the alerting system 140 may alert the client about the at least one error associated with the one or more anomalies. For instance, the alerting system 140 may send a notification to client's device with an indication of anomaly and the at least one error associated with the anomaly. The at least one error associated with the anomaly may be displayed on a dashboard or a user interface on the client device. An example of such an alert can indicate that API calls to the content delivery system (120) were failing at an increased rate during the period of the performance metric anomaly.

In some embodiments, 760, if the at least one anomaly was not verified to be an actual anomaly in block 720, the alerting system 140 can determine the anomaly as a false positive anomaly. Accordingly, the alerting system can filter false positive anomaly. In some embodiments, this is could be done via user specification, such as adding a particular error type to an ignore list, or by looking at previous similar anomalies that were marked as false positives. The flagging can be performed using fields for anomaly detected and actual result, and if the fields were different, then a false positive can be identified.

VII. Attribute Values Correlated to Anomalous Events

As described above, a client can select attributes for analyzing performance in web sessions. However, such a client may not know which attributes might cause anomalous behavior. Accordingly, some embodiments can identify attributes based on web session events, particularly anomalous behavior of web session events. In this manner, embodiments can detect anomalies across the entire data set; and when event anomalies are detected, then correlated attributes can be detected and used to detect anomalous performance for those correlated attributes.

Figure 8:
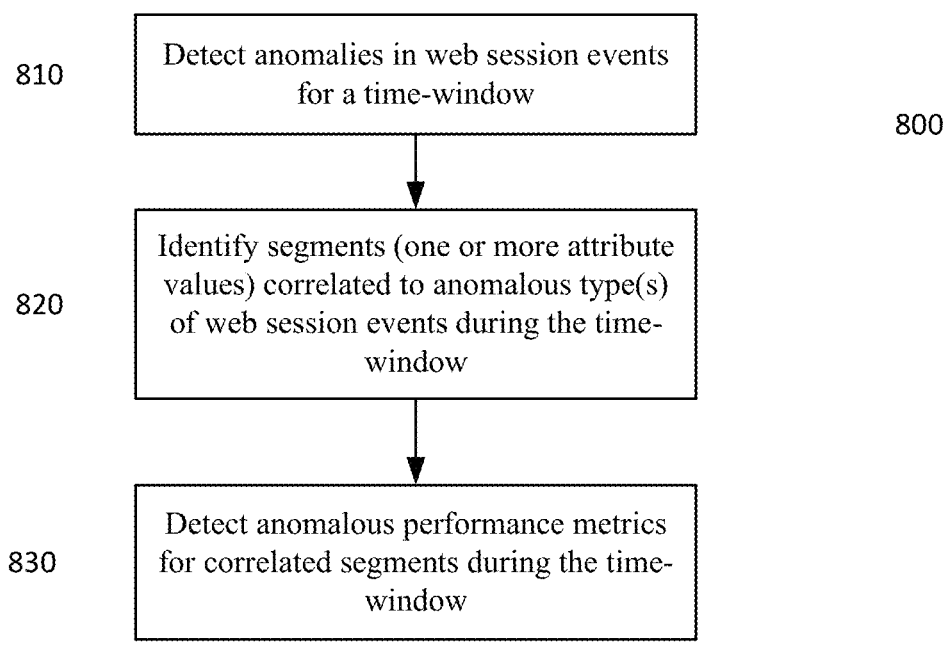
FIG. 8 is a flowchart of a method 800 for identifying attribute values that may be correlated to anomalous performance metrics according to embodiments of the present disclosure

FIG. 8 is a flowchart of a method 800 for identifying attribute values that may be correlated to anomalous performance metrics according to embodiments of the present disclosure. Certain blocks of method 800 can be used to identify the attributes used in other methods, e.g., in block 305 of method 300 in FIG. 3. Method 800 can be performed by an alerting system, e.g., as described herein.

At block 810, anomalies are detected in web session events, such as errors, clicks, and other events that are being tracked. There can be different types of web session events, e.g., a particular error, a number of clicks of a button, or a number of visits to individual web pages. An anomaly in a particular type of web session event can be detected for a particular time-window (e.g., a time period of X minutes, which may be during a particular day of week). An anomaly can be detected when an amount of events for the type exceeds a reference amount, which can be determined from occurrences of that type of event during past (historical) time-windows. The reference amount can be determined or specified in a machine learning model that is trained on anomalous occurrence of events. In another example, the reference amount can be a threshold, such that a threshold-based anomaly detection is performed.

For example, a check out error on a website might spike across web sessions during a time-window. At this point, the web sessions can be for all attributes, and thus the client does not need to specify particular attributes to analyze, thereby reducing the time and effort of the client. The client can specify the type of web session events to monitor or just have all of the web sessions events monitored, e.g., all the events that are defined within the client's system.

Accordingly, block 810 can identify one or more anomalous types of web session events. Web sessions can be identified in which the anomaly occurred. For example, an anomalous event type can be the number of times that a button is clicked. For instance, the number of web sessions, in which the user clicked the button more than 5 times, can exceed a threshold (e.g., greater than 1,000 web sessions or 10% of all the web sessions during a time-window). Then, those 1,000 web sessions, in which that event type occurred, can be identified and analyzed to determine attributes values (e.g., a particular browser) that is correlated to the anomaly, which can be used to identify an underlying error with the website.

At block 820, it is determined whether any of the attribute values are correlated to anomalous type(s) of web session events occurring during the time-window. The attribute values to be analyzed can be all attribute values of all attributes, or a subset thereof. Also, only certain attribute values of an attribute (e.g., only certain browser types or device types) can be analyzed to determine whether they are correlated. More than one attribute value may be correlated to a particular anomalous event type, where a segment can refer to the set of attribute values that are correlated. The segment can be defined using logical AND for different attributes and OR of different values of a same attribute, as will be described in more detail later.

The correlation analysis can use a relative frequency comparison. For all the sessions that had the event during the time-window, which was determined to be anomalous (e.g., a spike in such events), a feature reduction can analyze the frequency of attributes in those sessions that had the error occur. For example, certain attributes might occur in this population of sessions (i.e., the anomalous ones) at a statistically higher rate (e.g., statistically different) than occurs in normal traffic. A difference in frequency of an attribute in the anomalous population of sessions relative to another population (e.g., all sessions or those in which the anomalous event did not occur) can indicate that the attribute is correlated with the anomalous event. This may occur when users of a particular web browser encounter certain errors with the website.

As an example, such a feature selection can determine that 10% of normal traffic uses browser #1, while 90% of the sessions with the anomalous event occur with browser #1. The relative difference of the proportions in the two populations can be compared to a threshold (e.g., bases on a statistical analysis, such as a standard deviation) to identify a correlation to the anomalous event. In such a case, browser #1 can be identified as an anomalous attribute value. Such a correlation analysis can use various techniques, such as principle component analysis and decision trees, including ensemble techniques, such as gradient boosting.

At block 830, anomalous performance metrics are detected for correlated segments. A client can specify the performance metrics, which are explained in more detail herein. Example performance metrics can correspond to a conversion rate or loading times, which may be desired to stay low and consistent. The performance analysis can be performed for each segment (i.e., for each anomalous event). The performance analysis can determine the performance for the sessions that include the correlated segment (which may or may not include the anomalous event). If the performance is anomalous, then an alert can be provided, where the alert can identify the correlated segment, so that the client may better pinpoint the source of the problem (e.g., an error with a particular browser).

The anomalous performance can be determined by comparing the metric for the correlated segment during the time-window to a reference metric, e.g., historic values at nearby times and days, also called neighboring times. A significant deviation (e.g., statistically different) from normal may be determined by comparing the difference (e.g., an average difference in the metric to neighboring times) to a threshold.

In this manner, the alert system can detect problems with generation and communication of the website from a web server to a user device, including content from any third party server. A client can just specify the metrics to monitor, and the alert system can measure the network activity to detect the specific problem and pinpoint traits (attributes) of the suspect sessions, thereby facilitating a solution by the client.

In operation, the different blocks can use different sensitivity levels for detection of anomalous events, correlated segments, and anomalous performance metrics. For example, the identification of anomalous events in block 810 can use a less stringent threshold, thereby detecting more anomalous events, knowing that later blocks can filter out false positives in blocks 820 and 830.

If no attribute values are correlated, then the analysis in block 830 can be performed for all web sessions.

A. Finding Event Anomalies

Various types of web session events can be analyzed to determine when an anomalous amount of a particular type of event occurs during a time-window. Three example categories of events are errors, user-defined events (e.g., lack of a particular error), clicks, or visit counts to individual web pages. For clicks, the event can be whether a specified number of clicks occurred for a particular object (e.g., in the document object model, DOM). As an example, the clicks could be on a particular button (e.g., a checkout button). Each event type can be assigned an event identifier (ID), so that the occurrences of a particular event type can be tracked across sessions during a given time-window (also called a time period).

As an example, embodiments can query the count of occurrences for the top N (e.g., 1,000) most comment event types. The count can be determined for various time periods. Example time periods include: current period (e.g., the past 15 minutes), the previous period (e.g., the 15 minutes prior to the current period), and the previous week's period (e.g., the 15 minutes a week ago from current period). Some embodiments can determine what event types are anomalous through a comparison, e.g., by checking, for a given event type, whether the count for the current period is higher or lower than expected, given the count of the previous period and the count of previous week's period. Such a comparison can be performed using similar techniques described above, e.g., regarding an update of an evaluation range based on historical data. In another example, the current count can be compared to each of the other counts, and the difference can be compared to a threshold (e.g., determined based on a standard deviation as measured historically for that time period). If the threshold is exceeded for either of the other time periods (or both), then the event type can be flagged as being anomalous during the current period.

Figure 9:
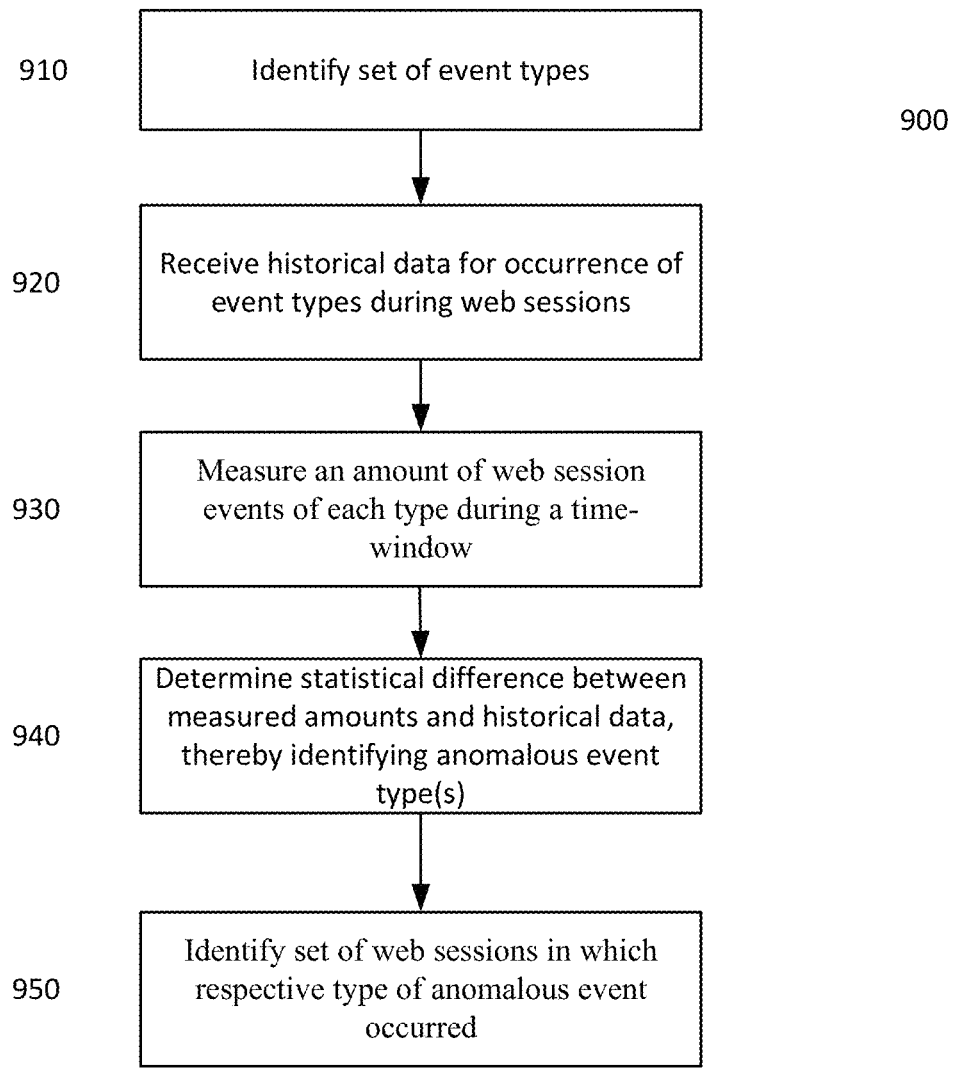
FIG. 9 is a flowchart of a method 900 for identifying anomalous event types according to embodiments of the present disclosure.

FIG. 9 is a flowchart of a method 900 for identifying anomalous event types according to embodiments of the present disclosure. Method 900 can be implemented by an alerting system, as described herein. Information from web sessions events obtained via one or more capture agent(s) associated with user devices can be used detect anomalous event type during a time-window for a website.

At block 910, a set of types of web session events is identified. Example types can include errors, clicks, and other events (e.g., user-defined event). The type of events can be defined based on the dataset of the client, e.g., which events are tracked on the website. For example, a client can define an event type to be an absence of an error or define a particular promotion code as an event. Example clicks can be defined for certain parts of a website, such as on a particular button. Certain types of events can be used across websites.

Some types of events can include a count. For example, an event can be whether or not a particular object (e.g., a button) was clicked more than a threshold number of times. If the threshold is exceeded, then the event can be determined to have occurred. Later, it can be determined whether the event has occurred an anomalous amount during a time-window.

Other example event types could be a number of sessions for a particular type of user, e.g., a particular customer status out of a set of possible customer statuses (e.g., beginner, intermediate, advanced, premiere, etc.). A particular customer status value can be an attribute value for the attribute of customer status. But whether a session has a particular attribute value can be a particular web session event. Thus, web session events can relate to attributes. Another event type is a number of API calls to a third party server, which may be to a particular server, or number of API timeouts more generally.

Another event type is whether a certain group of web pages were received by a user device during the web session. The event type could require any one of the web pages or all of the web pages of the group to be visited to count as an occurrence. The anomaly could indicate that this group of pages has been visited in the sessions more often than normal during the time period, e.g., for a given day. For example, when a checkout event is anomalous, embodiment can also analyze a page group to determine a particular combination of anomalous event types, which might occur together.

The number of event types being tracked can vary for one client to another, e.g., from 200 to 1,000 event types. A default set of event types can exist, with a client specifying additional event types. In some implementations, a client can specify events to ignore or not track.

At block 920, historical data is received for occurrence of event types during web sessions. The historical data can be measured using capture agent(s) in real-time during time-windows and then stored for later retrieval. The historical data can be raw events, counts, or other statistical data, including moving averages. For instance, an average number of occurrences for each event type can be determined for the defined time periods, e.g., 5 minutes increments over the day, which can be tracked per day of week.

The historical data can be saved in a database with event identifiers for the different types of events. Queries can be made to the database to retrieve the historical data as needed.

At block 930, an amount of web session events of each type is measured during a time-window. Such a measurement can use the capture agent(s) associated with the user devices. For instance, a frustration event (e.g., a number of clicks exceeding a threshold) can be counted to occur 94 times in a particular time period (e.g., from 4:00 PM to 4:05 PM) for all sessions with the website. As other examples, a number of page reloads can be 143, and a number of sessions having a particular promotion code can be 87. Thus, the amounts of each of the event types being tracked can be determined for a current time-window.

At block 940, it is determined whether there is a statistical difference between measured amounts and historical data. In this manner, anomalous event type(s) can be identified. For example, the measured amount for a given event type can be compared to a reference amount, which can be determined from the historical data. The reference amount can correspond to a particular time-window (e.g., the same time-window for which the current measurement is for, but for a historical average or range), correspond to a set of time-windows (e.g., for time around the current time or the same time-window but on a different day), or can one of multiple reference amounts to which the measured amount is compared. Other examples of such comparisons are provided herein, e.g., for FIG. 14, but where an amount of event types is used as opposed to a performance metric.

In some embodiments, one or more capture agents can be used to monitor historical web session events for each of the types of web session events with the website. In this manner, historical amounts of web sessions events can be thereby determined for the types of web session events, and historical proportions of historical web sessions having respective attribute values can be determined for each of the plurality of attributes. The reference amount can be determined from the historical amounts during historical time-windows, e.g., as a statistical value (e.g., a mean, median, or mode of the historical amounts, including a weighted average). The reference proportion can be determined from historical proportions of the historical web sessions having the attribute value.

A statistical difference can be measured by comparing a difference between the measured amount and the reference amount to a threshold, which can be determined using deviations in the historical data. In some embodiments, deviations from other time-windows can be used. The threshold to be used can depend on the reference amount used. For example, the increase relative to a recent time period can indicate an abrupt change, even if the overall amount is not significant compared to other historical time periods. The historical counts for other time-windows can be weighted (e.g., with an exponential function, as described herein). Such exponential smoothing can filter out noise. Accordingly, the techniques described in FIG. 2A-2F and FIG. 3 (e.g., for assignment of weights to a performance range).

At block 950, a set of web sessions in which respective type of anomalous event occurred can be identified. Thus, all of the sessions that have the anomalous behavior can be identified, e.g., a certain number of clicks above a threshold. In some implementations, the set of web sessions can be limited to sessions having more than one anomalous event, e.g., greater than a specified minimum number.

In some embodiments, more than one anomalous event can be detected for a time-window. For example, three or more event types might spike out of normal, ultimately causing an anomalous performance metric (as can be detected herein, e.g., after anomalous events are detected). Such anomalous events can include a certain set of pages being visited more than normal, which may be caused by a high number of reloads of the web page. The grouping of such anomalous event types can be considered as a single anomalous event, for which later stages can analyze together. In such a case, multiple sets of web sessions can be identified, potentially with a given session belonging to more than one set.

B. Identifying Correlated Attributes

Certain attribute values can correlate to an anomalous event type during the time-window that the anomaly is detected. Knowing these particular attribute values can help to determine a cause of the problem on the website. For example, embodiments can analyze attributes of device type (e.g., mobile, tablet, notebook/laptop, desktop, etc., or even by brand and model), browser including browser version (or other application used to access the website, e.g. a native application), operating system (OS), and geographical region. For instance, a region can be correlated to an anomalous event when a cloud provider has an edge issue.

The correlation can indicate that the anomalous events occurred disproportionately in sessions with attribute values of browser is Chrome, and/or operating system is Windows, and/or the host device was located in Colorado, and/or on pages whose prefix path is/checkout. The disproportionate amount can be relative to a reference set of sessions, e.g., for which none or low amount of problems exist. For instance, if a majority (e.g., 80%) of the web sessions with the anomalous event occur with a particular browser and typically only 30% of the web sessions occur with the particular browser, then one can pinpoint that the website problems can at least partially be identified by analyzing how that browser interacts with the website. Such knowledge can save time and effort by a computer engineer.

The correlation analysis is described in more detail below. More than one attribute value can correlate to an anomalous event type. Such a set of attribute values can be referred to as a segment. For example, a segment can include "device": "mobile", "browser": "Chrome", "OS": "Windows", and "region": "Colorado". As another example, a segment could include "device": "desktop", "browser": "Safari", "OS": "MacOS", and "region": "CO".

Figure 10:
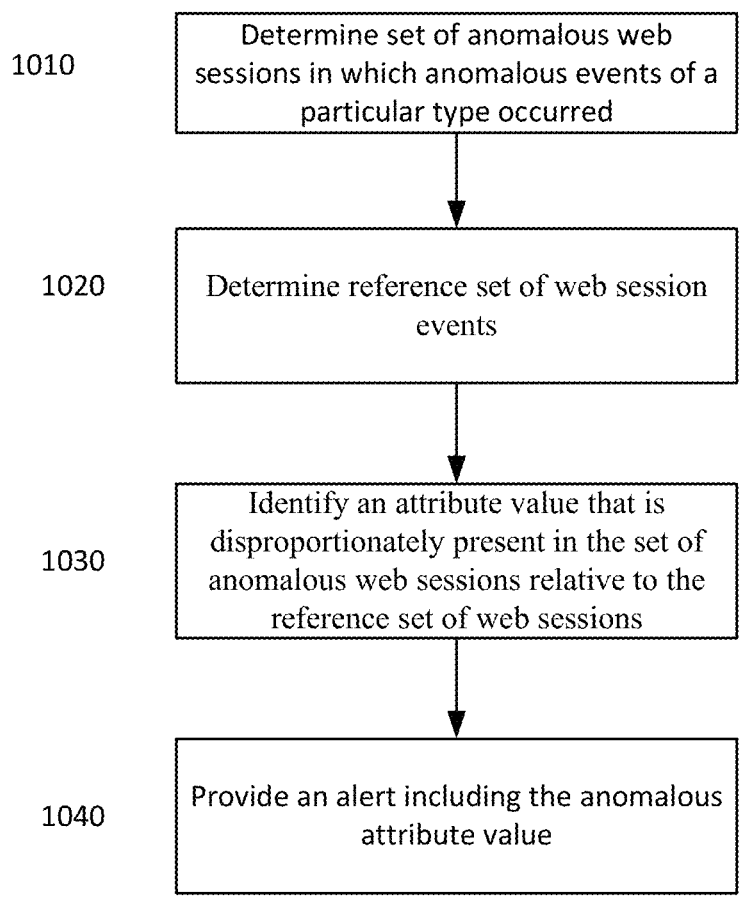
FIG. 10 a flowchart of a method 1000 for identifying attribute values correlated to anomalous event types according to embodiments of the present disclosure.

FIG. 10 is a flowchart of a method 1000 for identifying attribute values correlated to anomalous event types according to embodiments of the present disclosure. Method 1000 can be performed for each of the anomalous event types, or for a grouping of anomalous event types. Further, all or a subset of attribute values being tracked can be analyzed to identify a correlation. For each attribute, all or a portion of the corresponding attribute values can be analyzed for correlation. Method 1000, like other methods described herein, can be performed using an alerting system.

At block 1010, a set of anomalous web sessions in which anomalous events of a particular type occurred is determined. These suspect sessions can be those identified in block 950. For example, sessions in which a particular event occurred can be identified using the information obtained from the capture agent, and such sessions can be stored in a database with an event identifier corresponding to that particular event. Such a set of web sessions can then be retrieved based on the event identifier.

At block 1020, a reference set of web sessions is determined. The reference set can be determined in various ways. For example, the reference set can include web sessions in which the anomalous type of web session event did not occur during the time-window. As another example, the reference set can be historical traffic from time-windows not having anomalous behavior for the particular even type. Some of such sessions can have the event occur, but since no anomaly exists, such sessions can be used as a reference. The reference set can represent normal traffic in which a website problem is not present, or at least a problem tied to the anomalous event type does not exist.

At block 1030, an attribute value that is disproportionately present in the set of anomalous web sessions relative to a reference set of web sessions is identified. Block 1030 can be performed for different attribute values of different attributes. For example, a predetermined list of attributes can be specified, each having a corresponding set of attribute values. Accordingly, block 1030 can be performed for each of the plurality of attribute values of each of the plurality of attributes.

The disproportionate representation of the attribute value in the anomalous set indicates that a website problem is associated with the attribute value. For example, the number of page reloads may be due to a new version of a browser, which is interpreting the software from the website differently. This determination can be made since the reference set is not associated with a website problem. The disproportionate presence of the attribute value can be determined in various ways. As examples, a relative frequency analysis or a feature importance analysis can be made.

For the relative frequency analysis, a proportion of the set of anomalous web sessions having the attribute value can be determined, and it can be determined whether the proportion is statistically different than a reference proportion in the reference set of web sessions. The reference proportion can correspond to a percentage of normal traffic that has the attribute value, e.g., the percentage of web sessions that use a particular browser. In such a case, one or more capture agents can be used to monitor historical web session events as described above. The reference proportion can be determined using similar statistics as the historical amount, but determine as the historical proportion of the historical web sessions having the attribute value.

For the feature importance, a score can be determined using a machine learning model for how well the particular attribute value existing in a session predicts whether the sessions will include the anomalous event. The score can be determined based on an accuracy of the model to predict which sessions of a training set include the anomalous event, where sessions in the training set are known to include or not include the anomalous event. Accordingly, the score can be determined for including the attribute value as an input to a machine learning model that predicts whether the web session would include the anomalous type of web session event, where the machine learning model is trained using the set of anomalous web sessions and the reference set of web sessions. The feature importance score can be compared to a threshold to determine whether there is sufficient correlation. As examples, the threshold can be a ranking relative to other attribute values or an absolute score, e.g., how much the accuracy changes when the attribute is included or is not included as an input to the model.

Additional criteria can be used for identifying an attribute value. For instance, it can be required that more than one attribute value be identified for a particular event type. As described in more detail below, multiple correlated attribute values can occur for an anomalous event and be grouped together in a segment.

At block 1040, an alert including the anomalous attribute value is provided. The alert can be provided in various ways, including being sent in a message to another module (e.g., a performance engine used to check for anomalous performance metrics for one or more anomalous attribute values). Accordingly, in a later step, the attribute value (e.g. in a segment) can be used to determine whether a performance metric is anomalous in a set of web sessions having that attribute value, where such a set may or may not include the anomalous event. For instance, the performance of sessions with a particular browser and/or a locale can be evaluated relative to historical performance. In another example, the alert can be provided to a client device, e.g., for display on the client device.

1. Grouping Correlated Attribute Values into Segments

As mentioned above, different attribute values that are correlated to a same anomalous event can be grouped together into a segment. These attribute values can be identified as being likely related in some way. Which attribute values are in a segment can help narrow down a problem with the website, e.g., knowing that the problem is with a particular browser in a particular region, which can help identify that a particular edge server is problematic for a particular browser. The attribute values of a segment can be grouped via a particular set of logical operations.

FIG. 11 provides an example of determining correlated segments for three types of anomalous web events according to embodiments of the present disclosure. FIG. 11 shows three columns and three rows for a given time-window. The three columns roughly correspond to block 940 (column 1110), block 1030 (column 1112), and a step of generating a segment (column 1114).

Column 1110 shows the anomalous web session events for the time-window, e.g., as may be identified using method 900. As shown, there are three anomalous events, with a row 1120 corresponding to error #24 (with 24 being the identifier for that particular error), a row 1122 corresponding to event #38 (with 38 being the identifier for that particular event), and a row 1124 corresponding to a click rate exceeding a threshold.

Column 1112 shows the correlated attribute values for each of the anomalous events. For row 1120 (error #24), two attribute values are correlated for the operating system attribute. The two types of OS are both correlated to error #24. For row 1122 (event #38), two attribute values are correlated: one for the OS attribute and one for the region attribute. For row 1124 (clicks #12), two attribute values are correlated for the operating system attribute and two attribute values are correlated for the region attribute.

Column 1114 shows the creation of segments using logical operations. As shown, the logical AND combines different attributes to make up the segment, and a logical OR combines different values of the same attribute. For example, the system may identify Safari or IE for the browser attribute and the region being San Francisco or Los Angeles or Portland.

Once a segment is identified, sessions having attribute values that match the logic query of a segment can be used to analyze performance within that segment, e.g., as described here, such as for blocks 350 and 360 of FIG. 3 and in FIG. 14, which is described later.

2. Relative Frequency

As explained above, one way to determine correlation of an attribute value to an anomalous event is using a relative frequency. For example, a proportion of anomalous web sessions having an attribute value can be compared to reference proportion of a reference set to detect a statistical difference. Such an analysis can be performed for each of a set of attributes, and for each or a subset of the attribute values for a given attribute. The analysis is for a given time-window. The reference set of web sessions, during the time-window, can be those in which the anomalous type of web session event did not occur, and the reference proportion can be of the reference set of web sessions having the attribute value.

FIG. 12 shows an example for using measurements of relative frequency for different attribute values to identify whether an attribute value correlates to a type of anomalous web session event according to embodiments of the present disclosure. FIG. 12 shows an analysis for the attributes of device type, browser, and page groups. In particular, results are shown for attribute values 'mobile' and 'tablet' for the device type, Chrome for the browser type, and "/checkout" for the page groups. The analysis is for a particular event type that was determined to be anomalous, depicted as an anomaly condition.

A column 1210 corresponds to the anomalous set of sessions where the anomaly condition is true (e.g., a session includes an anomalous event). A column 1220 corresponds to the reference set of sessions where the anomaly condition is false (e.g., a session does not include an anomalous event). Columns 1210 and 1220 comprise the input for determining whether a particular attribute value is correlated to the anomaly condition. For each attribute value, the first value (e.g., value 1212) provides a count of the number of sessions in the respective set having that attribute value, and the second value (e.g., value 1222) provides the provides the proportion of the sessions in the respective set having that attribute value.

To determine whether a particular attribute value is disproportionately present in the anomalous set, the measured proportion having the attribute value in the anomalous set can be compared to the reference proportion in the reference set. The attribute value of Mobile comprises 30% (0.3) of anomalous sessions while only 1% of the reference sessions. Given the large difference in frequency, column 1230 shows the output that the attribute value of Mobile is indeed correlated to the anomaly condition. However, the attribute value of Tablet occurs in 5% of the anomalous sessions but 40% of the reference sessions. Since the Tablet attribute is actually less common on the anomalous sessions, the output is False that the Tablet attribute is correlated to the anomaly condition. In other embodiments, the reference set can correspond to sessions from historical time-windows, but the determination can be made in a similar manner.

Other statistical tests can be used besides a simple difference between the proportions. For example, Pearson correlation, the chi-squared test, or tree-based methods can be used to determine whether the distribution of sessions with the anomalous event correlates with the distribution of sessions with a particular attribute value.

3. Feature Importance

Feature importance can measure the ability of a particular input feature to provide a more accurate machine learning model, e.g., to classify a sample. If a particular feature is disproportionately present in training samples having one classification relative to training samples having another classification, then including that feature in the model should increase the accuracy of the model, at least for the training set. In the limit of an attribute value being present in all of the training samples (sessions) of a first classification (e.g., anomalous event exists) and not being present in the training sessions of a second classification (e.g., anomalous event does not exist), then the attribute value would rank highest since the accuracy would be 100%. Such an idealized example is for illustration.

A feature importance score can be measured in different ways, depending on the model being used. For example, for regression, a size of the coefficient for an input feature can provide a measure of importance. As another technique (e.g., for decision trees), the importance can be measured for whether or not the feature is included in the model or not.

For the feature importance, two populations (sets) of sessions can be identified. The first population includes the sessions that include the anomalous event. The first population of sessions can be labeled with a classification of 1 (meaning the anomaly exists). The second population includes the sessions that do not include the anomalous event. The second population of sessions can be labeled with a classification of zero (meaning the anomaly does not exist).

A supervised learning model can then be used as a classification model. These two populations of sessions are used as the training set to train the classification model. The purpose of this model is not to predict whether any new sessions are anomalous, but to determine whether any segments are correlated with the anomalous sessions.

As examples, the classification model can use input features of device type, browser, OS, locale, and page group visited. The input feature vector can be a binary vector for whether or not a particular attribute value exists or not for that session. These input features for each session, along with the output level (0 or 1) for that sample, forms a training sample. The model is then trained to discriminate between the two different classifications of sessions. As part of the training, different sets of input features can be used, e.g., whether or not browser #1 was used, whether or not locale #2 existed for that session, etc., can be used for one model version. Then, an accuracy can be determined for how many of the sessions are classified correctly, which equates to an accuracy of the fit to the data.

Then, another model version can drop the input feature of whether or not browser #1 was used. If the accuracy significantly decreases, then that input feature can have a high feature importance, thereby indicating that it is correlated to the anomalous performance in the time window. A feature importance score can be assigned to a particular segment based on how much the accuracy changes. A certain minimal change in accuracy can be required before identifying a segment as being correlated.

Various machine learning model can be used, e.g., logistic regression, decision trees (including various types, such as a gradient boosting machine), support vector machines, and neural networks. Further, ensemble techniques can be used to combine multiple models into one overall model.

C. Detecting Anomalous Performance

Once a segment is identified as correlated with an anomalous event, it can be determined whether a performance of the website has been impacted, e.g., out of a normal/expected range. Various performance metrics are as described herein, such as conversion rates (e.g., percentage of sessions reaching target stage, such as a check-in page for an airline or a checkout page for a transaction), revenue, or loading times. The existence of an anomalous event does not necessarily mean that a performance has been affected. The analysis for performance can be for sessions having attributes that match the segment (e.g., according to the query logic of the segment, such as in FIG. 11) during the time-window. If the performance metric is out of range, the system can conclude that the anomalous event did result in a performance decrease, and an alert can be provided.

Figure 13:
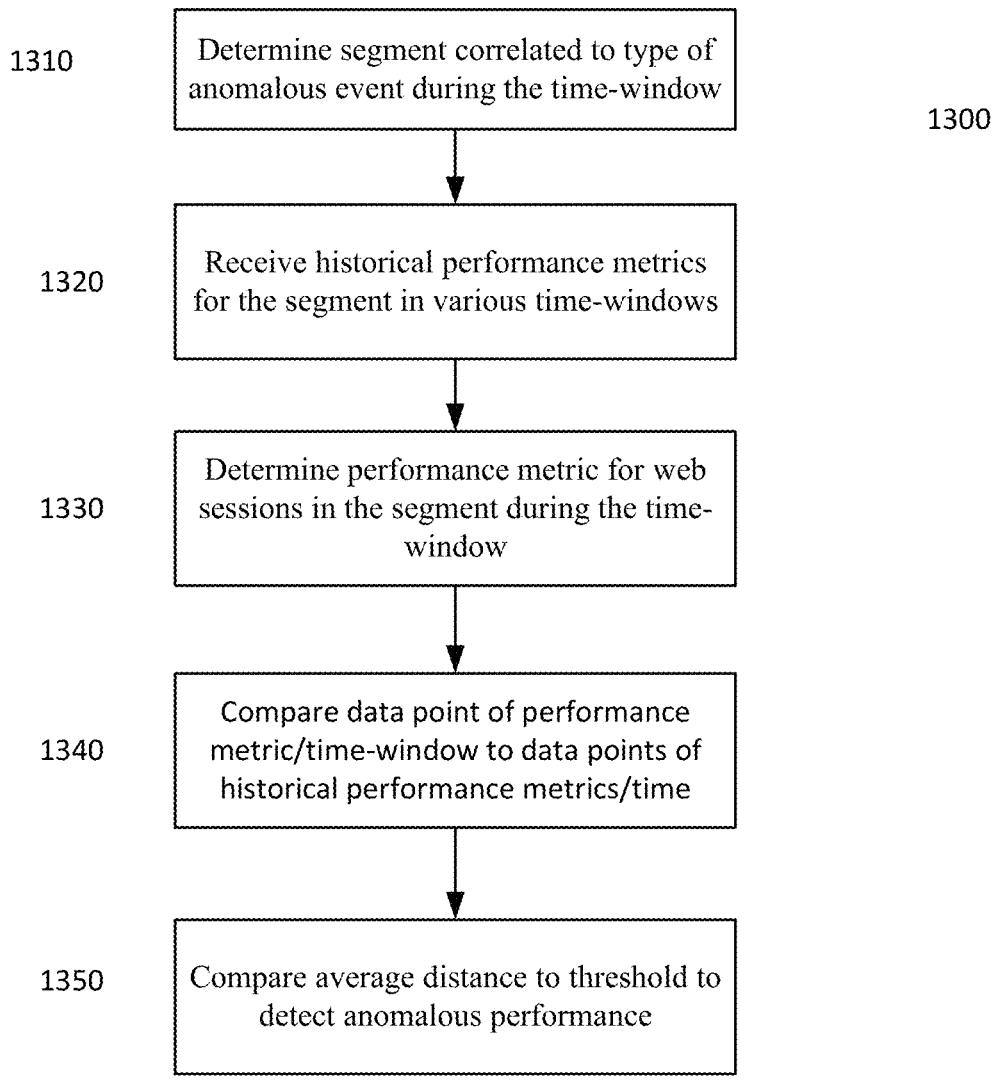
FIG. 13 is a flowchart of a method 1300 to identify anomalous performance of a website during a time-window for a segment of attribute values according to embodiments of the present disclosure.

FIG. 13 is a flowchart of a method 1300 to identify anomalous performance of website during a time-window for a segment of attribute values according to embodiments of the present disclosure. Method 1300 can determine an anomaly in performance using one or more attribute values as may be determined using methods 900 and 1000. Method 1300 can use techniques described in earlier sections, e.g., for FIGS. 3-6. Further, instead of using the one or more correlated attributes determined using methods 900 and 1000, method 1300 can use a set of one or more attributes and corresponding attribute values (or just certain attribute values) identified by the client to monitor.

At block 1310, a segment of one or more attribute values correlated to type of anomalous event during the time-window is determined. The segment may be determined as described above, e.g., in block 1030 in FIG. 10. Multiple segments may be analyzed. For embodiments where the segment was determined based on a correlation to an anomalous event, the number of segments can equal the number of anomalous events. If more than one anomaly had the same correlated segment, then the number of segments can be less than the number of anomalous events.

At block 1320, historical performance metrics for the segment in various time-windows are received. The historical performance metrics can be determined from the web sessions events obtained from the one or more capture agents associated with the user devices of users of the website. For example, the web session events can provide load times of a particular webpage or portion of a webpage, and the individual measurements for a given sessions can be aggregated to provide a statistical value for the time-window, e.g., a sum, an average etc., as appropriate for the type of performance metric. A performance range can be determined, as described above, and such performance ranges can be weighted to determine an evaluation range. Such a technique can encompass an average distance to other data points, as is described below.

Accordingly, one or more capture agents can be used to monitor historical web session events for each of the types of web session events with the website. The historical web session events can be used to determine a historical performance metric for one or more historical time-windows.

At block 1330, the performance metric is determined for web sessions in the segment during the time-window. The web sessions in the segment can be identified by querying a database of sessions for the time-window, as described herein. As examples, the performance metric to be analyzed can be specified by a client of the alerting system or from a predetermined set of performance metrics. The performance metric for the current time-window can be determined in similar ways as for the historical performance metrics.

At block 1340, the data point of performance metric/time-window is compared to data points of historical performance metrics/time. The performance metric for a given time-window can form a multidimensional data point. For example, one dimension (e.g., an axis on a plot) can be the performance metric. Another dimension (axis) can be the time of day, and another dimension (axis) can be the day of week. The current data point (i.e., performance metric for the current time-window) can be compared to the data points of historical performance metrics, which can be averages for a given time/day over previous weeks (e.g., previous 5, 6, 7, 8, 9, or 10 weeks). Thus, the historical performance metrics can be determined using measurements over multiple weeks.

Figure 14:
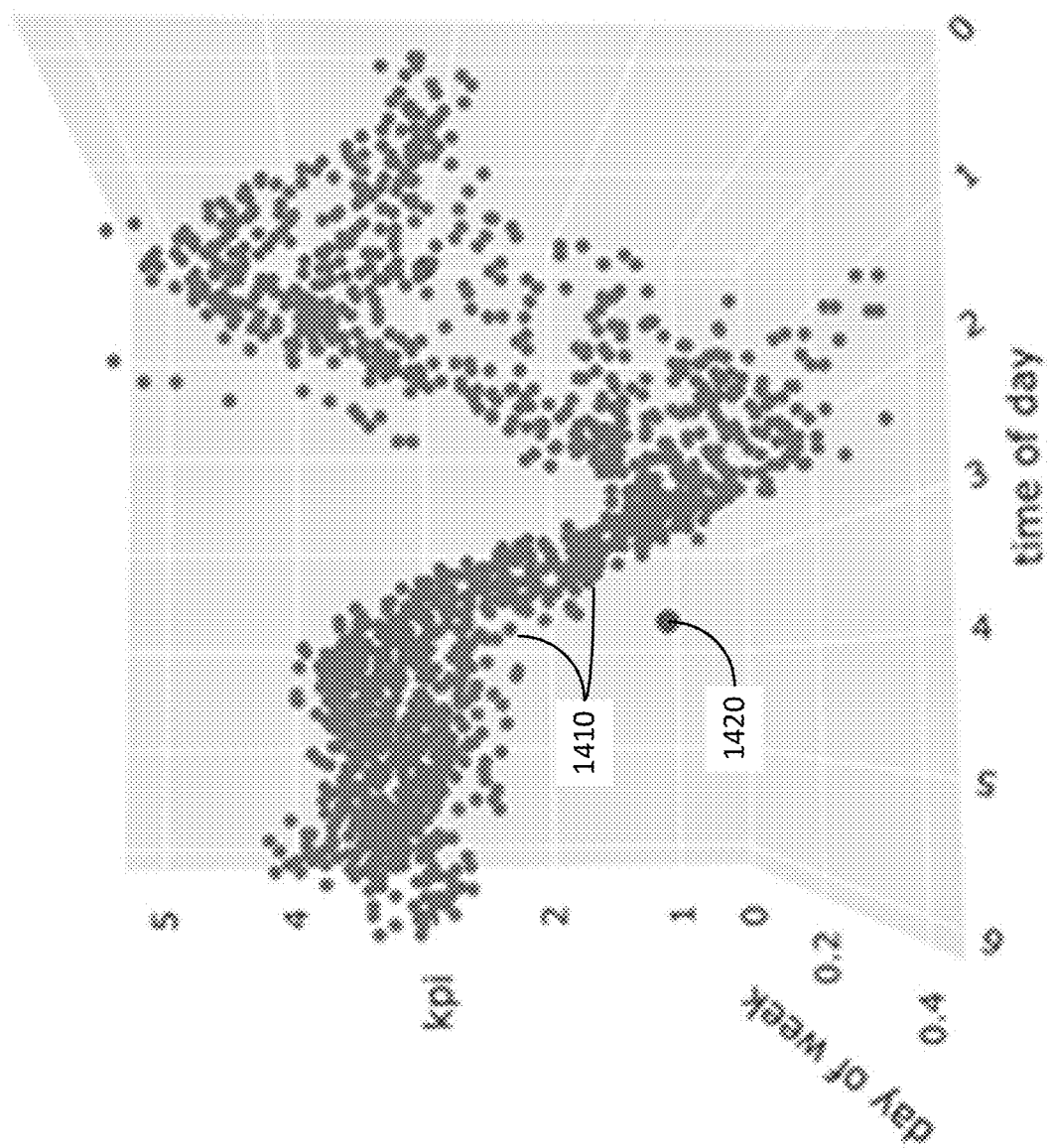
FIG. 14 shows an example plot of data points of a performance metric (kpi) at various times and days of week for historical data and a current time-window according to embodiments of the present disclosure.

FIG. 14 shows an example plot of data points of a performance metric (kpi) at various times and days of week for historical data and a current time-window according to embodiments of the present disclosure. Point 1420 corresponds to a current time-window and points 1410 corresponds to historical data points. A distance from point 1420 to one or more points 1410 can indicate whether the performance metric for point 1420 is anomalous. For example, an average distance can be measured from point 1420 to N (e.g., 3-5) closest points 1410.

At block 1350, the average distance is compared to threshold to detect anomalous performance. The threshold can be determined based on variations in the historical data, e.g., a standard deviation. Using a distance to more than one of points 1410 can allow for a stable determination, even when an outlier may exist, e.g., if the historical data is not averaged over multiple weeks. For instance, each week could have its own set of points. The sensitivity value in FIGS. 3, 5, and 6 can specify the threshold used in block 1350 as well as any other threshold described herein.

Accordingly, a multidimensional data point can comprise the performance metric, a time of day, and a day of the week. The time-window can correspond to the time of day and the day of the week. The historical performance metrics can be part of historical multidimensional data points for a set of time-windows. An average distance can be determined between the multidimensional data point and K nearest historical multidimensional data points, K being an integer equal to three or more. The average distance can be compared to a threshold. The average distance can be a weighted average using a weight for each of the K nearest historical multidimensional data points, where the weight is assigned based on proximity of the time-window to the time-windows of the K nearest historical multidimensional data points.

Such a technique can be equivalent to a change in evaluation ranges. For example, each historical data point can correspond to a different historical time-window, as described in FIGS. 2A-2F. The threshold can correspond to the performance range defining the upper and lower bounds. The average distance can be a weighted distance, where the weights can depend on an exponential function (each for dimensions of time and day of week) centered on the current time-window (i.e., day of week and time).

D. Method for Anomalous Detection

Methods of 900, 1000, and 1300 (or portions thereof) can be combined to provide a method of monitoring network traffic and user interactions to detect anomalies in performance during a time-window. Further, likely sources of the cause of the decreased performance, e.g., the anomalous event(s) and correlated attribute value(s) can be identified.

Figure 15:
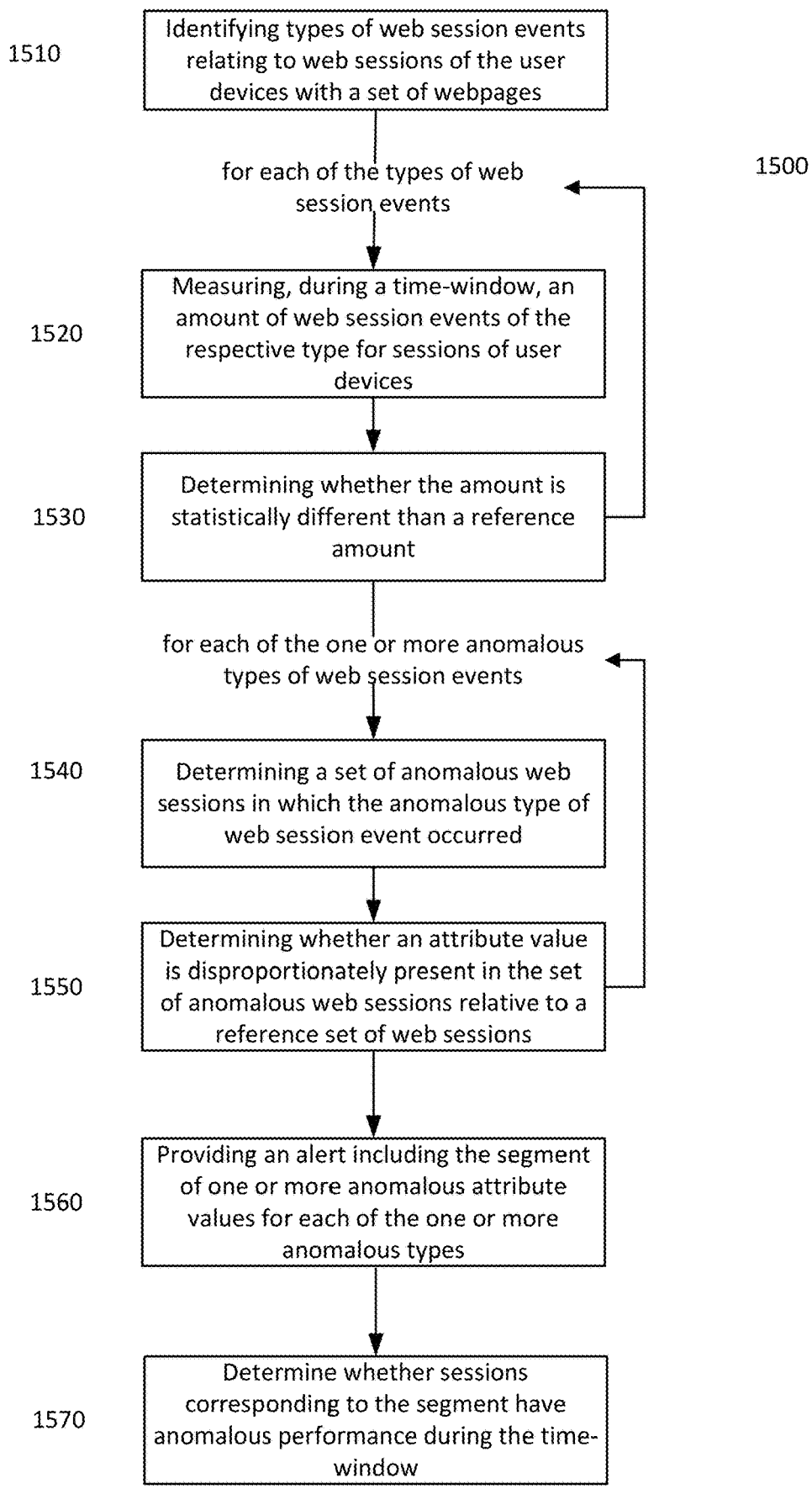
FIG. 15 is a flowchart of a method 1500 performed by an alerting system in communication with one or more capture agents associated with user devices according to embodiments of the present disclosure.

FIG. 15 is a flowchart of a method 1500 performed by an alerting system in communication with one or more capture agents associated with user devices according to embodiments of the present disclosure.

At block 1510, types of web session events relating to web sessions of the user devices with a set of webpages of a website are identified. The web sessions can include a plurality of attribute values corresponding to a plurality of attributes. Block 1510 may be implemented in a similar manner as block 910.

Blocks 1520 and 1530 can be repeated for each of the types of web session events that were identified in block 1510. In various implementations, a client can specify which event types to analyze, or just analyze all of the event types tracked, e.g., all corresponding to a database defined for the website.

At block 1520, an amount of web session events of the respective type is measured for sessions of user devices with the website. The measuring can use the one or more capture agents. Block 1520 may be implemented in a similar manner as block 930.

At block 1530, it is determined whether the amount is statistically different than a reference amount. If the amount is statistically different then the event type can be identified as anomalous. Thus, as a result, block 1530 can determine one or more anomalous types of web session events. Block 1530 may be implemented in a similar manner as block 940.

Blocks 1540 and 1550 can be repeated for each of the one or more anomalous types of web session events that were identified in block 1530.

At 1540, a set of anomalous web sessions in which the anomalous type of web session event occurred during the time-window is determined. Block 1540 may be implemented in a similar manner as block 1010.

At block 1550, it is determined whether the attribute value is disproportionately present in the set of anomalous web sessions relative to a reference set of web sessions. If the attribute value is disproportionately present then the attribute value can be identified as correlated to the anomalous event type. Thus, as a result, block 1550 can determine a segment of one or more anomalous attribute values during the time-window. Block 1550 may be implemented in a similar manner as block 1030.

As described above, the reference set of web sessions can comprise web sessions in which the anomalous type of web session event did not occur during the time-window. The disproportionate presence of the attribute value can use a feature importance score, as described herein. For example, the feature importance score can be determined based on whether or not the attribute value is used as an input to a machine learning model that predicts whether the web session would include the anomalous type of web session event. The machine learning model can be trained using the set of anomalous web sessions and the reference set of web sessions. The feature importance score can be compared to a threshold to determine if the presence of the attribute value is sufficiently disproportionate. Such a comparison can include ranking the features importance scores of multiple attribute values, and identifying the one or more anomalous attribute values having a rank greater than the threshold.

As another example, a relative frequency technique can be used, e.g., as described herein. A proportion of the set of anomalous web sessions having the attribute value can be determined. It can then be determined whether the proportion is statistically different than a reference proportion in the reference set of web sessions.

At block 1560, the alerting system can provide an alert including the segment of one or more anomalous attribute values for each of the one or more anomalous types of web session events. These anomalous attribute values can be provided to internal modules or provided externally to other devices, e.g., to a display or a client device, such as operated by an administrator of a website. An internal module (which is internal to the system but can be in a different device) can determine whether anomalous website performance exists in sessions corresponding to the attribute values of the segment, e.g., as described in method 1300.

At block 1570, it is determined whether sessions corresponding to the segment have anomalous performance during the time-window. Block 1570 can be implement using techniques described in FIGS. 3-6, 13, and 14. If a performance anomaly is detected, then an alert can be provided, e.g., as in blocks 370, 465, 590, or 690.

For example, the one or more capture agents can be used to monitor historical web session events, e.g., for each of the types of web session events from block 1510. The historical web session events can be used to determine a historical performance metric for one or more historical time-windows. More than one historical metric can be determined or combined into an evaluation range corresponding to the historical metrics. And a performance metric for the web session events of the segment during the time-window can be determined. Then, it can be determined whether the performance metric is statistically different than the historical performance metric of the one or more historical time-windows. In this manner, one or more anomalous segments can be determined, for which an alert can be provided.

The historical web sessions can be those that have the one or more anomalous attribute values of the segment, which may or may not include the anomalous event. A reason for not using only sessions that had the anomalous event is that those discrete events can occur later in a session, which can skew the performance, since those sessions that reach later web pages can naturally have higher conversion rates or whatever performance metric might be used.

As described in previous sections, the segment can include multiple anomalous attribute values for a single attribute (e.g., two browser types), where the segment comprises web sessions having any one of the multiple anomalous attribute values, e.g., according to the logic in FIG. 11. As another example, the segment can include an anomalous attribute value for multiple attributes (e.g., browser and region), where the segment comprises web sessions having the anomalous attribute value for each of the multiple attributes.

If no segment is found to correlate to an anomalous event, then the performance metric can be measured for all web traffic, i.e., all sessions during the time-window.

VIII. Attribute Values Correlated to Anomalous Performance

As described above, attribute values can be correlated to anomalous events to determine possible causes of the anomalous events. Further, performance anomalies can be detected within a particular subset of sessions, namely the sessions with the correlated attribute values. As an alternative or in addition, some embodiments can correlate attribute values with an anomaly (e.g., for performance) detected in a time-window. As part of such a procedure, such embodiments can start with detecting an anomaly in a time-window, and then identify attribute value(s) correlated with the sessions of the anomalous time-window.

For example, a performance metric can be analyzed in time-windows, e.g., 30 minute time-windows. The performance analysis can be made in consecutive time-windows, with a determination of whether an anomaly exists being determined for each time-window based on web sessions events that occur during that time-window. Thus, the performance metric can be measured using all sessions during that time-window. The performance metric can be compared to a reference value for determining anomalous behavior. Any the techniques described above for determining anomalous behavior in the performance metric can be used, e.g., in FIGS. 3-6, 13, and 14.

Once the anomalous time window is identified, all of the sessions of that anomalous time window can be given a binary classification of '1'. Then, a separate population of previous sessions (reference sessions) can be given a binary classification of '0' (i.e., no anomaly). These previous sessions can occur just before the anomalous time-window and can be of a specified time range, e.g., the previous 4.5 hours. In other embodiments, the previous sessions need not be in continuous time-windows and can be from other days, as long as the reference sessions are in time-windows that are not anomalous.

The two populations of sessions (anomalous and not anomalous) can be analyzed to determine a segment correlated with the sessions of the anomalous time window. This correlation analysis can be done in various ways, e.g., using feature importance or a relative frequency, as described herein.

Figure 16:
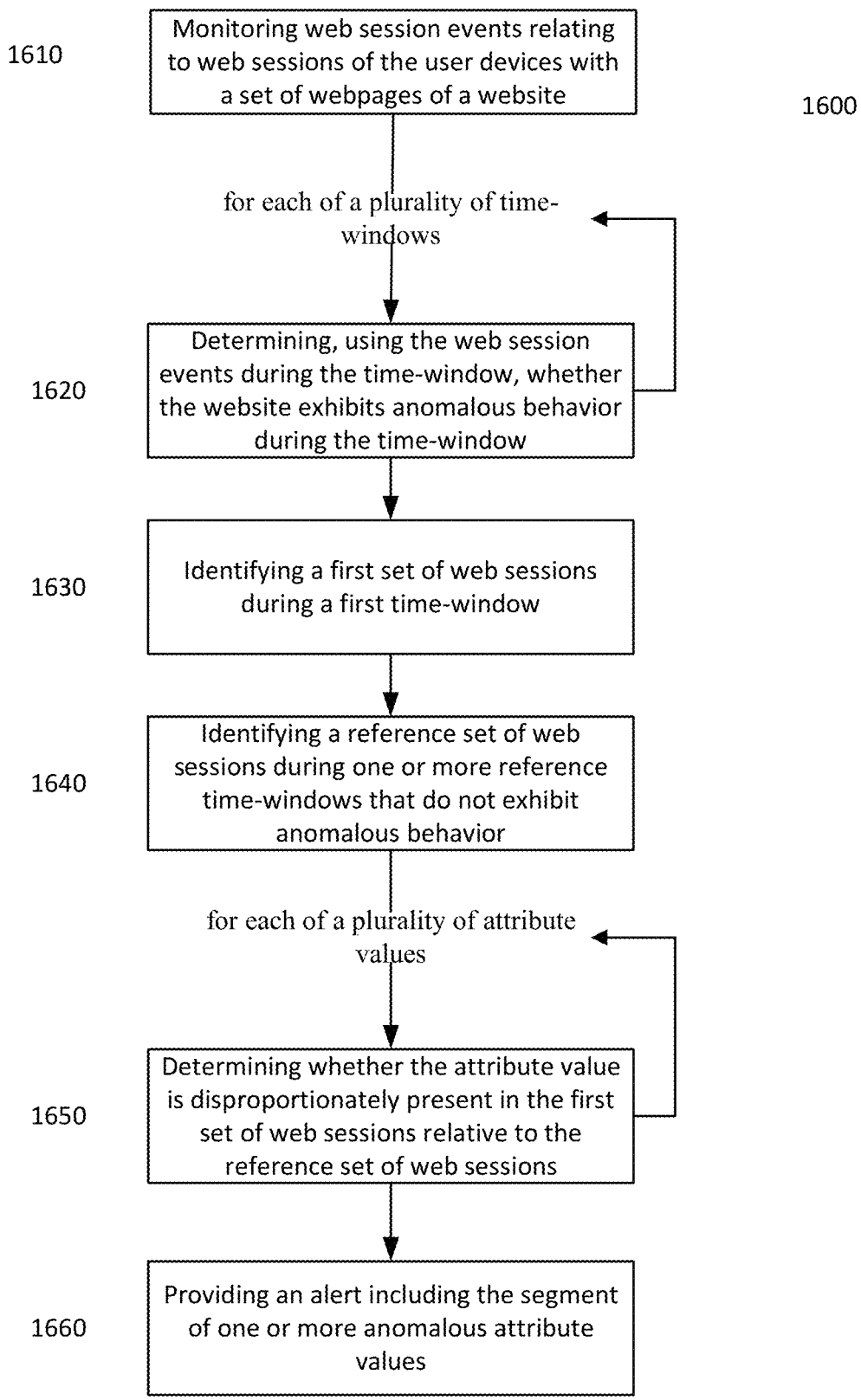
FIG. 16 is a flowchart of a method 1600 performed by an alerting system in communication with one or more capture agents associated with user devices according to embodiments of the present disclosure.

FIG. 16 is a flowchart of a method 1600 performed by an alerting system in communication with one or more capture agents associated with user devices according to embodiments of the present disclosure. Method 1600 can be used to detect problems (performance or otherwise) with a website during a time-window and to obtain information useful in tracking down a cause of the performance problem.

At block 1610, web session events relating to web sessions of the user devices can be monitored for a set of webpages of a website. The monitoring can use the one or more capture agents. The web sessions collectively can include a plurality of attribute values corresponding to a plurality of attributes, with each web session including a particular combination of attribute values, as can be the case for other methods described herein.

At block 1620, for each of a plurality of time-windows, the web session events for that time-window can be used to determine whether the website exhibits anomalous behavior during the time-window. For example, techniques described in FIGS. 3-6, 9, and 13-15 can be used. For instance, historical performance metrics can be measured for time-windows of proximate times and days of week and used as reference value(s). A performance metric for a current time window can be compared to an evaluation range determined using the historical performance metrics. As another example, an anomalous web session event can be detected (e.g., as described for FIG. 9) and the entire time-window can be identified as anomalous, where all sessions in the time-window are analyzed for correlation to an attribute value, as opposed to just the sessions having the anomalous event.

For embodiments using a performance metric, the performance metric can be determined using information of the web session events during the time-window. For example, a percentage of sessions reaching a target page or an average load time for a particular web page can be determined. The performance metric can then be compared to a reference value. In this manner, it can be determined whether the time-window has an anomalous performance metric. The reference value can be determined using historical performance metrics, as described herein. The performance metric can be of a first type, and block 1620 can be repeated for determining whether the time-window has an anomalous performance metric for one or more other types of performance metrics.

In some embodiments a machine learning model can be used to determine whether the time-window exhibits anomalous behavior. A plurality of input features can be identified using information from the web session events during the time-window. For example, performance metrics or counts of events can be used as input features. The machine learning model can be used to determine whether the website exhibits anomalous behavior during the time-window. The machine learning model can be trained using inputs features determined from time-windows whose status of anomalous behavior is known, e.g., where a problem was later identified and the website traffic was analyzed during when the problem existed.

Further blocks in method 1600 can analyze a first time-window that is identified as exhibiting the anomalous behavior. The term "first" is used to identify a particular time-window as opposed to any ordering.

At block 1630, a first set of web sessions occurring during the first time-window is identified. In various embodiments, a web session can be identified as occurring in a particular time-window by having any web session events that occur during that time-window. Thus, not all of the web sessions events necessarily have to occur in the time-window.

At block 1640, a reference set of web sessions during one or more reference time-windows that do not exhibit anomalous behavior is identified. As described above, the reference time-windows may be consecutive time-windows that just occurred previously, but may also be other historical time-windows. Thus, the one or more reference time-windows may precede the first time-window, e.g., immediately before. As the time-windows are historical, it is known whether or not they exhibited anomalous behavior.

At block 1650, it can be determined whether the attribute value may be disproportionately present in the first set of web sessions relative to the reference set of web sessions. In this manner, a segment of one or more anomalous attribute values during the first time-window can be determined. The disproportionate presence can be determined using various techniques described herein, e.g., relative frequency or feature importance.

Block 1650 can be performed for each of a plurality of attribute values. The attribute values can be all or some of the attribute values for a plurality of attributes. As examples, a client can specify which attribute values to be analyzed or specify which attributes to be analyzed, where all of the attribute values for the identified attributes can be analyzed.

At block 1660, an alert including the segment of one or more anomalous attribute values is provided. As examples, the segment can be a list of the attribute values or can also include logical operations for use in performing queries, e.g., as described in FIG. 11. The alert can be provided in similar ways as other alerts described herein. For example, the alert can be provided to internal modules or provided externally to other devices, e.g., to a display or a client device, such as operated by an administrator of a website.

In various aspects, method 1600 can be used to identify a root-cause for major website problems at an organization level (e.g., determining when known problems occur), while method 1500 can be used to capture problems that were not known to exist. Such may be the case when performance metrics are used in block 1620, whereas anomalous counts of web session events are used in FIGS. 9 and 15.

A. Relative Frequency

As described above (e.g., in section VII.B.2), a frequency (proportion) of sessions in a first set from the anomalous time-window having a particular attribute value can be compared to the corresponding frequency in the reference set. A statistically higher proportion in the first set indicates the attribute value is correlated with the anomalous behavior during the time-window.

Accordingly, a relative frequency of a particular segment of one or more anomalous attribute values between the populations (i.e., sessions from anomalous time window and sessions from other time-windows) can be used. For instance, the proportion of anomalous sessions having browser #1 can be determined (e.g., 80%). Then, the proportion of non-anomalous sessions having browser #1 can be determined (e.g., 40%). The difference (40%) in the proportions can be compared to a threshold, which can be determined from the typical variation in the proportion for non-anomalous sessions.

B. Feature Importance

For the feature importance, a supervised learning model can be used with the outcome label being a binary classification: '1' for the sessions from the anomalous time window, and '0' for the sessions not from the anomalous time window. These two sets of sessions can be used as the training set to train the classification model.

As described above (e.g., in section VII.B.3), the classification model can be to determine a feature importance of different attribute values as part of determining whether the attribute value correlates to the anomalous time-window. Thus, a purpose of this model may not be to predict whether any new sessions are anomalous (although a differently-trained model can be used to determine whether a time-window has anomalous behavior), but to determine whether any segments are correlated with the sessions from the anomalous time-window. It is the use of this particular training set, which uses the sessions from this particular time-window as ones having an anomalous label, that allows the feature importance to be determined for this particular time-window.

As examples, the classification can use input features of device type, browser, OS, locale, and page group visited, as well as whether or not a particular web session event occurred. The input feature vector can be a binary vector, with each binary value in the vector indicating whether or not a particular attribute value exists or not for that session. Thus, the binary vector can have a length that equals the number of attribute values to be analyzed.

These input features for each session, along with the output level (0 or 1) for that sample, forms a training sample. The model is then trained to discriminate between the two different classifications of sessions. As part of the training, different sets of input features can be used, e.g., whether or not browser #1 was used, whether or not locale #2 existed for that session, etc., can be used for one model version. Then, an accuracy can be determined for how many of the sessions are classified correctly, which equates to an accuracy of the fit to the training data.

Then, another model version can drop the input feature of whether or not browser #1 was used. If the accuracy significantly decreases, then that input feature can have a high feature importance, thereby indicating that it is correlated to the anomalous performance in the time window. A feature importance score can be assigned to a particular segment based on how much the accuracy changes. A certain minimal change in accuracy can be required before identifying a segment as being correlated. In some embodiments, the features can be ranked, and the top N (e.g., 3-5) features can be identified as correlated. In other embodiments, an absolute value for accuracy change can be used as a threshold.

IX. Clustered Metric Identification and Alerting

As described above, the present embodiments provide systems and methods to monitor user actions or performance data on webpages on the website. For example, various metrics can be tracked over time, with each metric tracking an aspect of aggregated user web sessions or webpage performance monitored for a website. Further, the present embodiments allow for identification of metrics that are anomalous. For instance, an average page load time for a webpage exceeding a threshold deviance from an average page load time, specifying a likely issue with the webpage for at least a portion of the users interacting with the website. Responsive to a metric being identified as anomalous (e.g., an average load time for a webpage exceeding a threshold), an alert can be generated specifying the anomaly to a client.

In many instances, multiple metrics can be correlated to one another. For example, responsive to an issue impacting the ability for users to reach a target webpage during user web sessions, a metric tracking a conversion rate and a metric that tracks revenues for the website can both decrease below a threshold level. As another example, responsive to an issue occurring with a specific webpage, a metric tracking page load times for the webpage and a metric tracking web session abandonment can increase beyond a threshold level.

In some instances, responsive to each metric being identified as anomalous, an alert can be generated for each metric. However, in such instances, the individual alerts generated for each metric identified as being anomalous may not specify any correlation(s) between multiple metrics that is present in many instances. Further, it may be undesirable to provide multiple alerts when there is one underlying cause.

In some implementations, the correlation of metrics can be determined by requiring the metrics to be anomalous in at least a threshold percentage of time windows in which an anomaly occurred. Example threshold percentages are 40%, 50%, 60%, and higher. In other implementations, a correlation matrix can be determined, with each matrix element corresponding to an amount of correlation between two metrics. The correlation between two metrics can be measured by comparing changes in the two metrics over a time period, so as to determine how much the change in one metric is correlated with the other metric. Such correlation matrix elements can be normalized to be between −1 (inversely correlated) and 1 (positively correlated).

Accordingly, in some embodiments, one or more clustering techniques can be utilized to identify clusters that group multiple metrics tracking aggregated user session and webpage performance data. For instance, a correlation matrix using historical metric data can derive correlations between metrics relating to performance of a website. The correlations derived from the correlation matrix can be used to determined clusters of metrics. For example, metrics that are highly correlated with at least K other metrics in a cluster can then be included in that cluster, where K can equal one or more. Further, an alert can be generated for the cluster of metrics to specify each correlated metric being identified as anomalous within a time duration. Providing such an alert can increase efficiency in identifying an issue with a webpage by providing greater insights into the cluster(s) of metrics that are identified as anomalous within a time duration.

In some instances, it can be determined that a set of performance metrics that are part of a first cluster of metrics that are, at the time of evaluation, outside evaluation ranges corresponding with each of the set of performance metrics. Further, the alert can be modified to identify each of the set of performance metrics that are part of the first cluster.

A. Correlation and Clustering

As described above, multiple metrics tracking aspects of aggregated user session or performance data for a website can be correlated to one another. For example, alerting system 130 can include a clustering subsystem that can identify metrics that are part of one or more clusters by processing historical metric data.

For instance, user session and performance data for a website can be processed to generate one or more sets of metric data and a corresponding correlation matrix specifying correlations between metrics. For a given metric, the metric data can include a set of metric values, each during a particular time window. A correlation matrix can be determined by analyzing the values of various metrics in various time windows to determine the extent of correlations between changes in one metric to another metric.

The correlation matrix can be generated based on any combination of historical metric data or current metric data. For example, in some instances, a correlation can be determined for only certain web sessions, such as for a certain segment of one or more attribute values. In this manner, correlations that only occur for a certain segment can be identified. Such a segment-specific correlation can be determined by filtering the web sessions to identify sessions that match a particular segment, and then using the data from those historical web sessions to determine the segment-specific correlation matrix.

In some implementations, a correlation matrix can be used in a clustering process. In one example, the correlation matrix can be used to generate one or more graphs of metrics. In the graphs, each metric can comprise a node and each edge can correspond to a correlation strength (i.e., a matrix element from the correlation matrix). A graph network of nodes can be generated based on the relationships of the metrics. For example, the collections of nodes can be defined via a modularity-based community algorithm. The collections of nodes can be processed to group metrics into clusters based on the nodes that are connected to each other with sufficient correlation strength (e.g., a threshold greater than an absolute value of 0.6).

In other implementations, an unsupervised machine learning (ML) model can implement, for example, one or more clustering techniques as described herein. An example unsupervised ML model can include a K means clustering technique to group metrics as part of one or more clusters. Other example unsupervised clustering algorithms can include hierarchical clustering techniques, Gaussian mixture models, mean shift models, and spectral clustering techniques. Further, other unsupervised ML techniques that are not clustering-specific can be implemented to assist in processing cluster metric data. Examples of such ML techniques can include deep auto encoders and Principal Component Analysis (PCA).

As an example, responsive to an issue impacting the performance of a website, multiple metrics can simultaneously become anomalous. For instance, a clustering algorithm can group together a metric tracking a conversion rate, a metric tracking revenue for the website, and a metric tracking a page load time for a website as corresponding with one another. In this example, correlation matrices can be used as an input to group the metrics. Further, for instance, each of the metrics that are correlated can exceed a threshold deviation from average values within a same time window. The ML model can implement clustering technique(s) to identify the correlation of such metrics and group the metrics in a cluster.

In some instances, historical metric data can be utilized to identify clusters of metrics. The historical metric data can include values for each metric that are tracked over time to derive trends of each metric. For example, a metric specifying a conversion rate can comprise a value within an average range, which is substantially linear over time. As another example, a metric tracking a number of user sessions can be cyclical over time (e.g., an average value comprising a cycle each day/week). The ML model can derive time-specific trends in an average value for each metric. Further, the ML model can identify instances when each metric comprises a value that has a threshold deviance from the average value, specifying an anomaly in the metric. The ML model can identify instances in which multiple metrics simultaneously comprise anomalous values, which is indicative of the multiple metrics being correlated to one another. Such instances can be processed to identify metrics that are part of one or more clusters. The cluster data can be stored for use in identifying clustered metrics as described herein.

Current metric values can be compared with average values for each metric to determine at a time instance whether a metric (or cluster of metrics) are anomalous. For example, the alerting system 130 can periodically (e.g., every minute, every five minutes, every 10 minutes) identify all metric(s) that are anomalous at a time instance (e.g., metrics that comprise a threshold deviance from corresponding average values). Further, in this example, the alerting system 130 can identify cluster(s) of metrics that are anomalous at each time instance. In some instances, after identifying that one or more metrics are anomalous for a number of periods (e.g., after 3 consecutive periods), an alert can be generated for each metric (or cluster of metrics).

When an anomaly has occurred, a correlation matrix can be generated using a range of historical metric data (e.g., one hour, one day, one week) for all of the metrics tracked. Correlation coefficients of the correlation matrix generated from the historical metric data can be used to determine clusters via the ML or network-based clustering techniques as described herein. When one or more metrics are anomalous, the system can determine whether the metrics are correlated to other groups of metrics based on an amount of historical metric data used to generate correlation matrices.

In some embodiments, the clustering can be determined as follows. A data point can be measured for each time window that includes an anomaly. The data point can be a multidimensional data point (e.g., a vector), with each value corresponding to one metric. The distances between the data points can be used to determine clusters. Within a cluster of data points corresponding to anomalous time windows, some of the metrics may be anomalous and some may not. The metrics having anomalous values within a cluster can be identified as correlated.

B. Clustered Metric Alert Generation

As described above, an alert can be generated specifying a metric that is anomalous for a threshold time duration. For example, responsive to a metric tracking a conversion rate for a website exceeding a threshold deviation from an average value, an alert can be generated specifying the metric, the anomalous value of the metric, and a time of identifying the anomalous metric. Further, in many instances, an alert can be generated for all metrics that are part of a cluster that are anomalous. For example, in the event that three metrics part of a cluster simultaneously comprising anomalous values, a single alert can be generated specifying all three metrics as part of a cluster. The alert generated for metrics that are part of a cluster can provide insights into multiple anomalous metrics as being part of a cluster, providing a greater insight into any issue with the website.

Clusters can be identified in various ways and can be segment-specific, e.g., as described above. In some instances, after checking for whether an anomalous metric is in a cluster that applies to all segments, the system can check whether the metric is correlated with any other metrics for the particular segment in which the anomaly occurred.

The alert message can specify various details relating to each anomalous metric (or series of metrics part of a cluster). For example, the alert message can specify a time in which a value of each metric exceeded a threshold deviance from an average value or a description of the metric. In some instances, an alert can be generated for each metric (or cluster of metrics) after identifying that the one or more metrics are anomalous for a number of periods that each metric is processed (e.g., after three consecutive periods). Each generated alert can be provided to a client device (e.g., via an e-mail message). In some instances, each generated alert can be displayed on a dashboard specific to the website. Responsive to providing an alert message, one or more actions can be performed modifying various aspects of the website.

X. Example User Interface

Figure 17A:
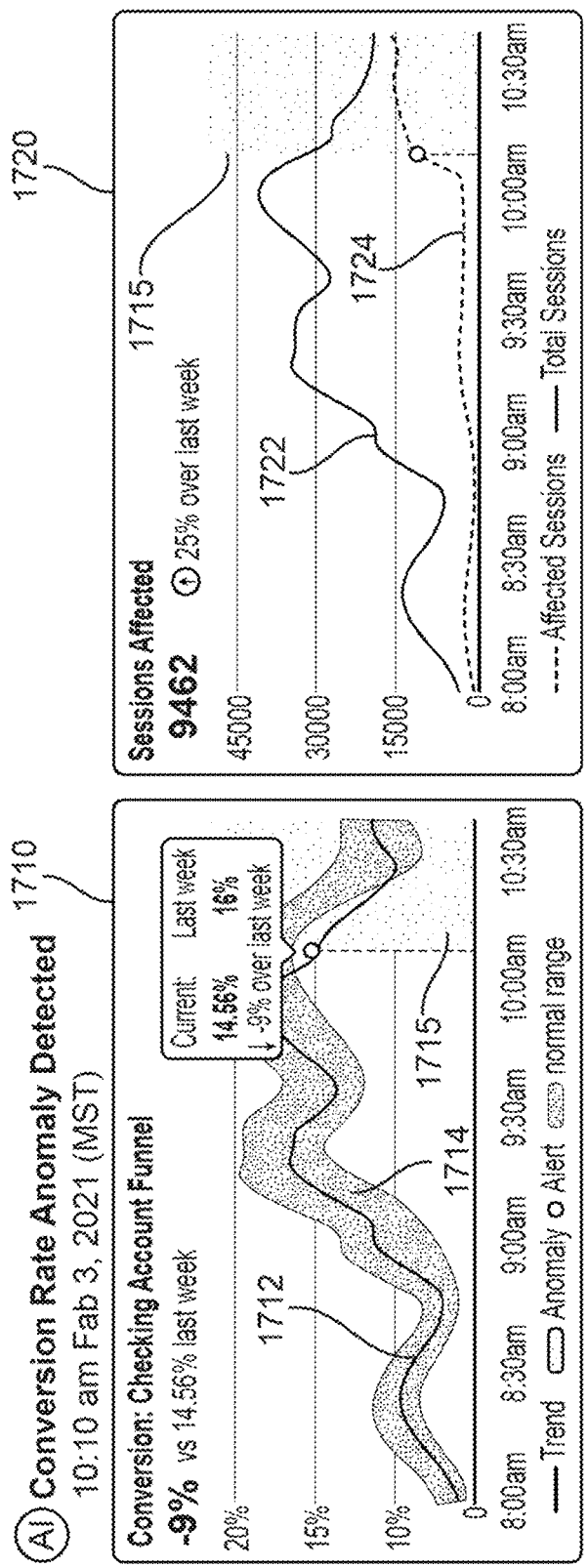
FIG. 17A is a first screenshot of a user interface for anomaly detection according to embodiments of the present disclosure.
Figure 17B:
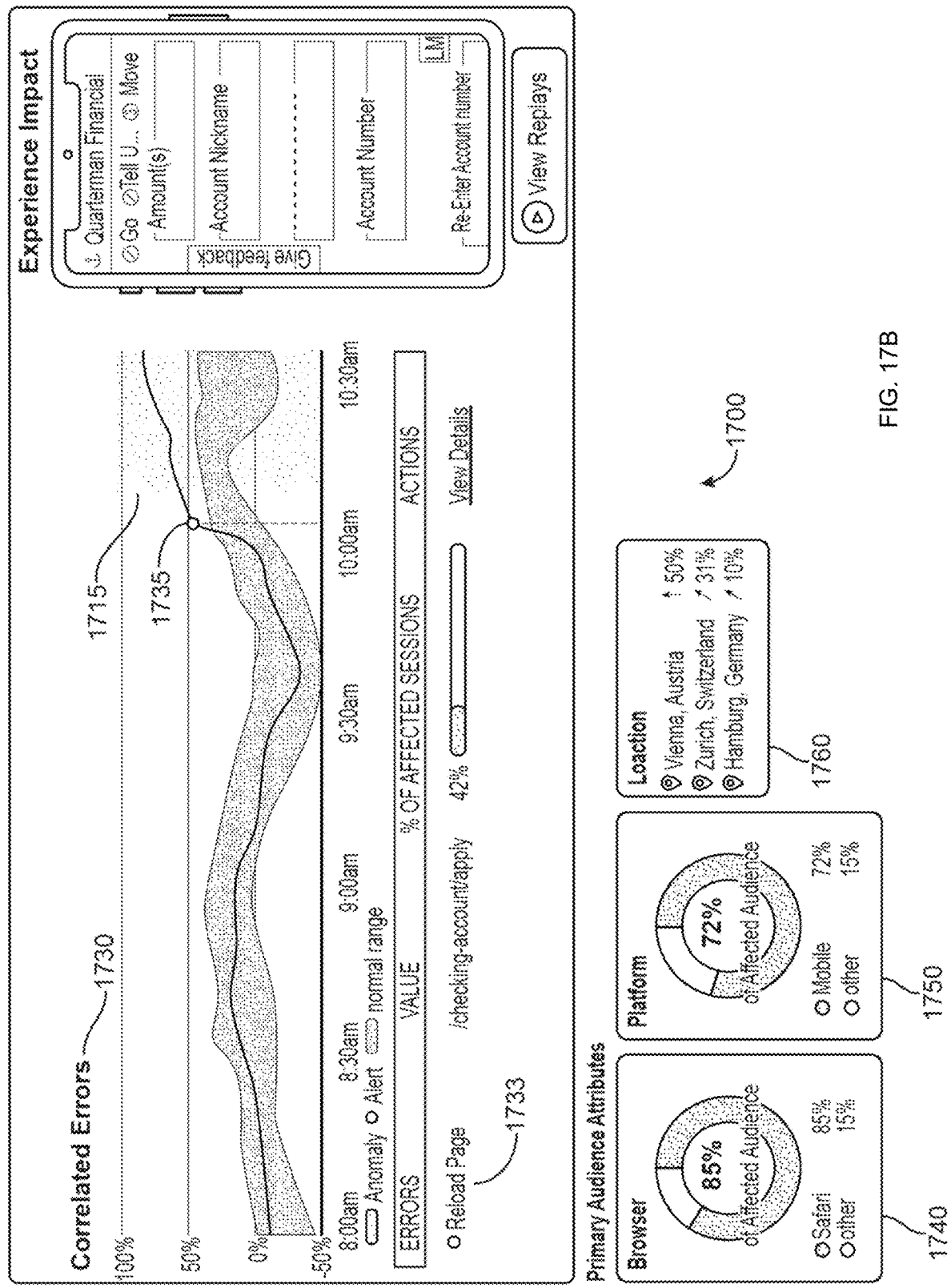
FIG. 17B is a second screenshot of a user interface for anomaly detection according to embodiments of the present disclosure.

FIGS. 17A-17B provide screenshots of a user interface for anomaly detection according to embodiments of the present disclosure. As examples, user interface 1700 can be provided to a user after a specific request to analyze the user interactions with the website for time between 8 AM and 10:30 AM, or in response to a periodic routine that checks for anomalies in 30-minute time-windows. Any of the windows in user interface 1700 can include alerts provided in methods described herein, e.g., methods 1000, 1500, and 1600.

Window 1720 shows anomalous performance for "Conversion: Checking Account Funnel." This example performance metric is the rate at which new visitors to a website sign up for a new checking account, e.g., measured as the number of sessions that reached a target page divided by total sessions that entered the new checking account section of the website. The line 1712 corresponds to the performance metric over time, e.g., in 5 minute increments, but smoothed, e.g., as a moving average. An evaluation range 1714 is also shown. A time-window 1715 is shown as being anomalous, where the line 1712 of the performance metric exceeds the evaluation range 1714.

Window 1730 shows a type of web sessions event that was determined to be anomalous, e.g., using method 900. Window 1720 shows the number of all sessions 1722 and the affected sessions 1724, which correspond to sessions in which the anomalous event occurred, as identified in window 1730. Windows 1740-1760 show attribute values that correlate with the anomalous event shown in window 1730. Window 1740 shows the web browser Safari being correlated. Window 1750 shows the device type of 'mobile' being correlated. Window 1760 shows three regions being correlated, specifically three European cities.

In this example shown, method 1500 is used. The anomalous event is reload page 1733, where this error spiked at time 1735. In particular, the reload page event is for the page associated with/checking-account/apply. Thus, the affected sessions 1724 are sessions where a reload of the/checking-account/apply page occurred. The performance metric in window 1710 is determined for the segment corresponding to the attribute values identified in windows 1740-1760.

XI. Exemplary Computer System

Figure 18:
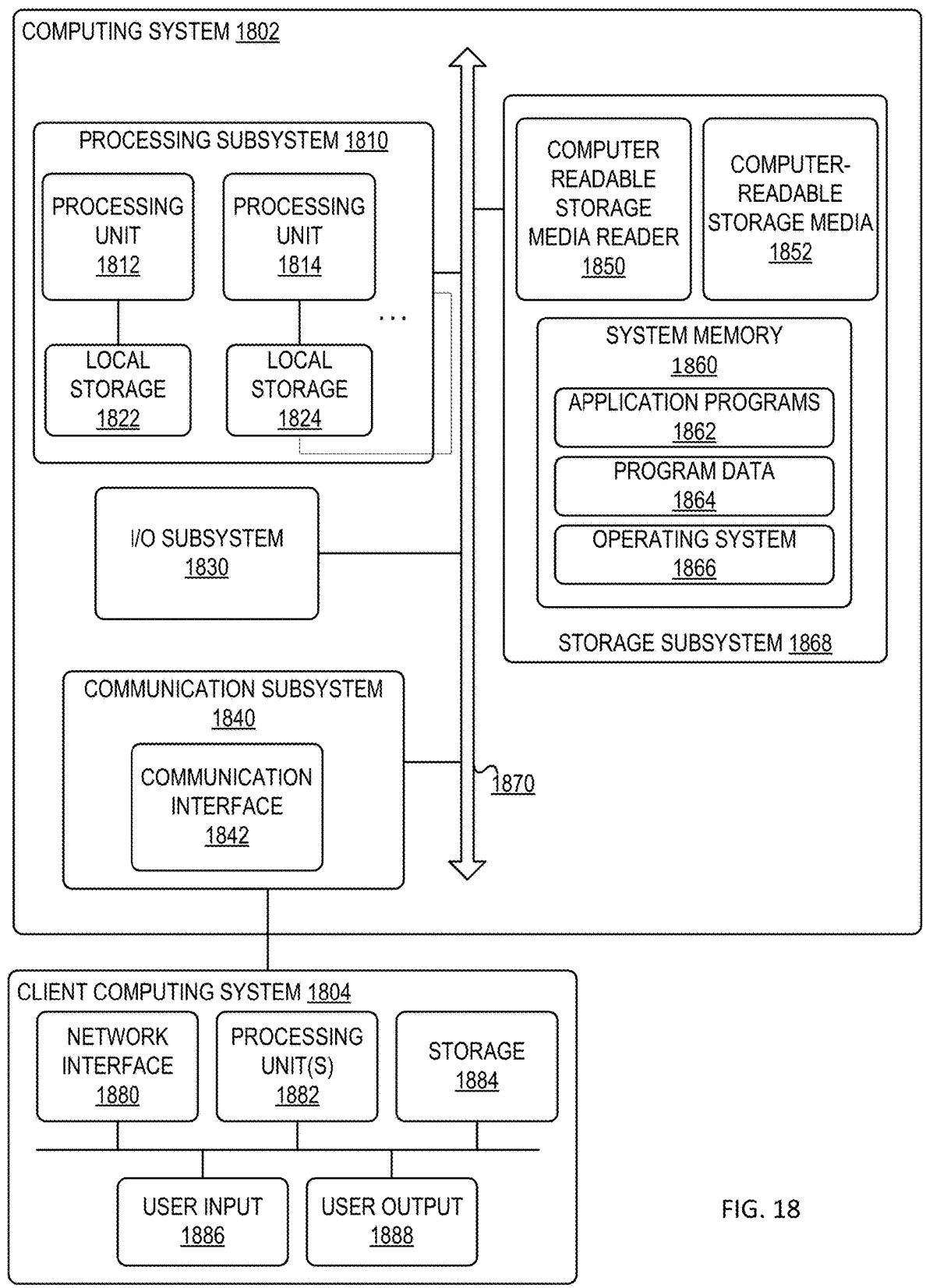
FIG. 18 illustrates an example of a computing system that may be used with certain embodiments described herein.

Various operations described herein may be implemented on computer systems, which may be of generally conventional design. FIG. 18 shows a simplified block diagram of a representative computing system 1802 and client computing system 1804 usable to implement certain embodiments of the present disclosure. In various embodiments, computing system 1802 or similar systems may implement capture management system, or any other computing system described herein or portions thereof.

Computing system 1802 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Computing system 1802 may include processing subsystem 1810. Processing subsystem 1810 may communicate with a number of peripheral systems via bus subsystem 1870. These peripheral systems may include I/O subsystem 1830, storage subsystem 1868, and communication subsystem 1840.

Bus subsystem 1870 provides a mechanism for letting the various components and subsystems of computing system 1802 communicate with each other as intended. Although bus subsystem 1870 is shown schematically as a single bus, alternative embodiments of the bus subsystem may utilize multiple buses. Bus subsystem 1870 may form a local area network that supports communication in processing subsystem 1810 and other components of server computing system 1820. Bus subsystem 1870 may be implemented using various technologies including server racks, hubs, routers, etc. Bus subsystem 1870 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

I/O subsystem 1830 may include devices and mechanisms for inputting information to computing system 1802 and/or for outputting information from or via computing system 1802. In general, use of the term "input device" is intended to include all possible types of devices and mechanisms for inputting information to computing system 1802. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking") while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computing system 1802 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Processing subsystem 1810 controls the operation of computing system 1802 and may comprise one or more processing units 1812, 1814, etc. A processing unit may include one or more processors, including single core processor or multicore processors, one or more cores of processors, or combinations thereof. In some embodiments, processing subsystem 1810 may include one or more special purpose co-processors such as graphics processors, digital signal processors (DSPs), or the like. In some embodiments, some or all of the processing units of processing subsystem 1810 may be implemented using customized circuits, such as application specific integrated circuits (ASICs), or field programmable gate arrays (FPGAs). In some embodiments, such integrated circuits execute instructions that are stored on the circuit itself. In other embodiments, processing unit(s) may execute instructions stored in local storage, e.g., local storage 1822, 1824. Any type of processors in any combination may be included in processing unit(s) 1812, 1814.

In some embodiments, processing subsystem 1810 may be implemented in a modular design that incorporates any number of modules (e.g., blades in a blade server implementation). Each module may include processing unit(s) and local storage. For example, processing subsystem 1810 may include processing unit 1812 and corresponding local storage 1822, and processing unit 1814 and corresponding local storage 1824.

Local storage 1822, 1824 may include volatile storage media (e.g., conventional DRAM, SRAM, SDRAM, or the like) and/or non-volatile storage media (e.g., magnetic or optical disk, flash memory, or the like). Storage media incorporated in local storage 1822, 1824 may be fixed, removable or upgradeable as desired. Local storage 1822, 1824 may be physically or logically divided into various subunits such as a system memory, a ROM, and a permanent storage device. The system memory may be a read-and-write memory device or a volatile read-and-write memory, such as dynamic random access memory. The system memory may store some or all of the instructions and data that processing unit(s) 1812, 1814 need at runtime. The ROM may store static data and instructions that are needed by processing unit(s) 1812, 1814. The permanent storage device may be a non-volatile read-and-write memory device that may store instructions and data even when a module including one or more processing units 1812, 1814 and local storage 1822, 1824 is powered down. The term "storage medium" as used herein includes any medium in which data may be stored indefinitely (subject to overwriting, electrical disturbance, power loss, or the like) and does not include carrier waves and transitory electronic signals propagating wirelessly or over wired connections.

In some embodiments, local storage 1822, 1824 may store one or more software programs to be executed by processing unit(s) 1812, 1814, such as an operating system and/or programs implementing various server functions such as functions of capture management system, or any other server(s) associated with capture management system. "Software" refers generally to sequences of instructions that, when executed by processing unit(s) 1812, 1814 cause computing system 1802 (or portions thereof) to perform various operations, thus defining one or more specific machine implementations that execute and perform the operations of the software programs. The instructions may be stored as firmware residing in read-only memory and/or program code stored in non-volatile storage media that may be read into volatile working memory for execution by processing unit(s) 1812, 1814. In some embodiments the instructions may be stored by storage subsystem 1868 (e.g., computer readable storage media). In various embodiments, the processing units may execute a variety of programs or code instructions and may maintain multiple concurrently executing programs or processes. At any given time, some or all of the program code to be executed may be resident in local storage 1822, 1824 and/or in storage subsystem including potentially on one or more storage devices. Software may be implemented as a single program or a collection of separate programs or program modules that interact as desired. From local storage 1822, 1824 (or non-local storage described below), processing unit(s) 1812, 1814 may retrieve program instructions to execute and data to process in order to execute various operations described above.

Storage subsystem 1868 provides a repository or data store for storing information that is used by computing system 1802. Storage subsystem 1868 provides a tangible non-transitory computer-readable storage medium for storing the basic programming and data constructs that provide the functionality of some embodiments. Software (programs, code modules, instructions) that when executed by processing subsystem 1810 provide the functionality described above may be stored in storage subsystem 1868. The software may be executed by one or more processing units of processing subsystem 1810. Storage subsystem 1868 may also provide a repository for storing data used in accordance with the present disclosure.

Storage subsystem 1868 may include one or more non-transitory memory devices, including volatile and non-volatile memory devices. As shown in FIG. 18, storage subsystem 1868 includes a system memory 1860 and a computer-readable storage media 1852. System memory 1860 may include a number of memories including a volatile main RAM for storage of instructions and data during program execution and a non-volatile ROM or flash memory in which fixed instructions are stored. In some implementations, a basic input/output system (BIOS), containing the basic routines that help to transfer information between elements within computing system 1802, such as during start-up, may typically be stored in the ROM. The RAM typically contains data and/or program modules that are presently being operated and executed by processing subsystem 1810. In some implementations, system memory 1860 may include multiple different types of memory, such as static random access memory (SRAM) or dynamic random access memory (DRAM). Storage subsystem 1868 may be based on magnetic, optical, semiconductor, or other data storage media. Direct attached storage, storage area networks, network-attached storage, and the like may be used. Any data stores or other collections of data described herein as being produced, consumed, or maintained by a service or server may be stored in storage subsystem 1868.

By way of example, and not limitation, as depicted in FIG. 18, system memory 1860 may store application programs 1862, which may include client applications, Web browsers, mid-tier applications, relational database management systems (RDBMS), etc., program data 1864, and one or more operating systems 1866. By way of example, an example operating system may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1852 may store programming and data constructs that provide the functionality of some embodiments. Software (programs, code modules, instructions) that when executed by processing subsystem 1810 a processor provide the functionality described above may be stored in storage subsystem 1868. By way of example, computer-readable storage media 1852 may include non-volatile memory such as a hard disk drive, a magnetic disk drive, an optical disk drive such as a CD ROM, DVD, a Blu-Ray® disk, or other optical media. Computer-readable storage media 1852 may include, but is not limited to, Zip® drives, flash memory cards, universal serial bus (USB) flash drives, secure digital (SD) cards, DVD disks, digital video tape, and the like. Computer-readable storage media 1852 may also include, solid-state drives (SSD) based on non-volatile memory such as flash-memory based SSDs, enterprise flash drives, solid state ROM, and the like, SSDs based on volatile memory such as solid-state RAM, dynamic RAM, static RAM, DRAM-based SSDs, magnetoresistive RAM (MRAM) SSDs, and hybrid SSDs that use a combination of DRAM and flash memory based SSDs. Computer-readable storage media 1852 may provide storage of computer-readable instructions, data structures, program modules, and other data for computing system 1802.

In certain embodiments, storage subsystem 1868 may also include a computer-readable storage media reader 1850 that may further be connected to computer-readable storage media 1852. Together and, optionally, in combination with system memory 1860, computer-readable storage media 1852 may comprehensively represent remote, local, fixed, and/or removable storage devices plus storage media for storing computer-readable information.

In certain embodiments, computing system 1802 may provide support for executing one or more virtual machines. Computing system 1802 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computing system 1802. Accordingly, multiple operating systems may potentially be run concurrently by computing system 1802. Each virtual machine generally runs independently of the other virtual machines.

Communication subsystem 1840 provides an interface to other computer systems and networks. Communication subsystem 1840 serves as an interface for receiving data from and transmitting data to other systems from computing system 1802. For example, communication subsystem 1840 may enable computing system 1802 to establish a communication channel to one or more client computing devices via the Internet for receiving and sending information from and to the client computing devices.

Communication subsystem 1840 may support both wired and/or wireless communication protocols. For example, in certain embodiments, communication subsystem 1840 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments, communication subsystem 1840 may provide wired network connectivity (e.g., Ethernet) in addition to or instead of a wireless interface.

Communication subsystem 1840 may receive and transmit data in various forms. For example, in some embodiments, communication subsystem 1840 may receive input communication in the form of structured and/or unstructured data feeds, event streams, event updates, and the like. For example, communication subsystem 1840 may be configured to receive (or send) data feeds in real-time from users of social media networks and/or other communication services such as Twitter® feeds, Facebook® updates, web feeds such as Rich Site Summary (RSS) feeds, and/or real-time updates from one or more third party information sources.

In certain embodiments, communication subsystem 1840 may be configured to receive data in the form of continuous data streams, which may include event streams of real-time events and/or event updates, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communication subsystem 1840 may also be configured to output the structured and/or unstructured data feeds, event streams, event updates, and the like to one or more databases that may be in communication with one or more streaming data source computers coupled to computing system 1802.

Communication subsystem 1840 may provide a communication interface 1842, e.g., a WAN interface, which may provide data communication capability between the local area network (bus subsystem 1870) and a larger network, such as the Internet. Conventional or other communications technologies may be used, including wired (e.g., Ethernet, IEEE 802.3 standards) and/or wireless technologies (e.g., Wi-Fi, IEEE 802.11 standards).

Computing system 1802 may operate in response to requests received via communication interface 1842. Further, in some embodiments, communication interface 1842 may connect computing systems 1802 to each other, providing scalable systems capable of managing high volumes of activity. Conventional or other techniques for managing server systems and server farms (collections of server systems that cooperate) may be used, including dynamic resource allocation and reallocation.

Computing system 1802 may interact with various user-owned or user-operated devices via a wide-area network such as the Internet. An example of a user-operated device is shown in FIG. 18 as client computing system 1804. Client computing system 1804 may be implemented, for example, as a consumer device such as a smart phone, other mobile phone, tablet computer, wearable computing device (e.g., smart watch, eyeglasses), desktop computer, laptop computer, and so on.

For example, client computing system 1804 may communicate with computing system 1802 via communication interface 1842. Client computing system 1804 may include conventional computer components such as processing unit(s) 1882, storage device 1884, network interface 1880, user input device 1886, and user output device 1888. Client computing system 1804 may be a computing device implemented in a variety of form factors, such as a desktop computer, laptop computer, tablet computer, smart phone, other mobile computing device, wearable computing device, or the like.

Processing unit(s) 1882 and storage device 1884 may be similar to processing unit(s) 1812, 1814 and local storage 1822, 1824 described above. Suitable devices may be selected based on the demands to be placed on client computing system 1804; for example, client computing system 1804 may be implemented as a "thin" client with limited processing capability or as a high-powered computing device. Client computing system 1804 may be provisioned with program code executable by processing unit(s) 1882 to enable various interactions with computing system 1802 of a message management service such as accessing messages, performing actions on messages, and other interactions described above. Some client computing systems 1804 may also interact with a messaging service independently of the message management service.

Network interface 1880 may provide a connection to a wide area network (e.g., the Internet) to which communication interface 1842 of computing system 1802 is also connected. In various embodiments, network interface 1880 may include a wired interface (e.g., Ethernet) and/or a wireless interface implementing various RF data communication standards such as Wi-Fi, Bluetooth, or cellular data network standards (e.g., 3G, 4G, LTE, etc.).

User input device 1886 may include any device (or devices) via which a user may provide signals to client computing system; client computing system may interpret the signals as indicative of particular user requests or information. In various embodiments, user input device 1886 may include any or all of a keyboard, touch pad, touch screen, mouse or other pointing device, scroll wheel, click wheel, dial, button, switch, keypad, microphone, and so on.

User output device 1888 may include any device via which client computing system may provide information to a user. For example, user output device 1888 may include a display to display images generated by or delivered to client computing system 1804. The display may incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments may include a device such as a touchscreen that function as both input and output device. In some embodiments, other user output devices 1888 may be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification may be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 1812, 1814 and 1882 may provide various functionality for computing system 1802 and client computing system, including any of the functionality described herein as being performed by a server or client, or other functionality associated with message management services.

It will be appreciated that computing system 1802 and client computing system 1804 are illustrative and that variations and modifications are possible. Computer systems used in connection with embodiments of the present disclosure may have other capabilities not specifically described here. Further, while computing system 1802 and client computing system 1204 are described with reference to particular blocks, it is to be understood that these blocks are defined for convenience of description and are not intended to imply a particular physical arrangement of component parts. For instance, different blocks may be but need not be located in the same facility, in the same server rack, or on the same motherboard. Further, the blocks need not correspond to physically distinct components. Blocks may be configured to perform various operations, e.g., by programming a processor or providing appropriate control circuitry, and various blocks might or might not be reconfigurable depending on how the initial configuration is obtained. Embodiments of the present disclosure may be realized in a variety of apparatus including electronic devices implemented using any combination of circuitry and software.

While this disclosure has been described with respect to specific embodiments, one skilled in the art will recognize that numerous modifications are possible. For instance, although specific processes are described with reference to FIG. 1, other processes may be implemented. Embodiments of this disclosure may be realized using a variety of computer systems and communication technologies including but not limited to specific examples described herein.

In the detailed description of exemplary embodiments of this disclosure, reference is made to the accompanying drawings which form a part hereof, and in which is shown by way of illustration specific exemplary embodiments in which this disclosure may be practiced. These embodiments are described in sufficient detail to enable those skilled in the art to practice this disclosure, and it is to be understood that other embodiments may be utilized and that logical, mechanical, electrical and other changes may be made without departing from the scope of the present disclosure.

Embodiments of the present disclosure may be realized using any combination of dedicated components and/or programmable processors and/or other programmable devices. The various processes described herein may be implemented on the same processor or different processors in any combination. Where components are described as being configured to perform certain operations, such configuration may be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present disclosure may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

It is apparent for those skilled in the art that, for the particular operation processes of the units described above, reference may be made to the corresponding steps/components in the related method/system embodiment sharing the same concept and the reference is regarded as the disclosure of the related units too. And therefore some of the particular operation processed will not be described repeatedly or in detail for concision of the description.

It should be understood that any of the embodiments of the present disclosure can be implemented in the form of control logic using hardware (e.g., an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present disclosure using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional, functional, and/or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present disclosure may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer apparatus may include a monitor, printer, or other suitable display for providing any of the results mentioned herein to a user.

Any of the methods disclosed herein may be totally or partially performed with a computer system including one or more processors, which can be configured to perform the steps. Thus, embodiments can be directed to computer systems configured to perform the steps of any of the methods disclosed herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The features and advantages described in the detailed description are not all inclusive and, in particular, many additional features and advantages will be apparent to one of ordinary skill in the art in view of the drawings, detailed description, and claims. Moreover, it should be noted that the language used in the detailed description has been principally selected for readability and instructional purposes, and may not have been selected to delineate or circumscribe the inventive subject matter.

Note that in this description, references to "one embodiment," "an embodiment" or "some embodiments" mean that the feature being referred to is included in at least one embodiment of this disclosure. Further, separate references to "one embodiment" or "some embodiments" in this description do not necessarily refer to the same embodiment(s); however, neither are such embodiments mutually exclusive, unless so stated and except as will be readily apparent to those skilled in the art. Thus, this disclosure can include any variety of combinations and/or integrations of the embodiments disclosed herein. However, other embodiments of this disclosure may be directed to specific embodiments relating to each individual aspect, or specific combinations of these individual aspects. Thus, although this disclosure has been described with respect to specific embodiments, it will be appreciated that this disclosure is intended to cover all modifications and equivalents within the scope of the following claims.

Upon reading this detailed description, those of skill in the art will appreciate still additional alternative structural and functional designs for a system and method for compact data storage of network traffic and efficient search through the disclosed principles of the present disclosure. Thus, while particular embodiments and applications of the present disclosure have been illustrated and described, it is to be understood that this disclosure is not limited to the precise construction and components disclosed herein and that various modifications, changes and variations which will be apparent to those skilled in the art may be made in the arrangement, operation and details of the method and apparatus of the present disclosure herein without departing from the spirit and scope of this disclosure as defined in the appended claims.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications, and descriptions mentioned herein are incorporated by reference in their entirety for all purposes. None is admitted to be prior art.

What is claimed is:

1. A computer-implemented method comprising performing, by an alerting system:

determining at least one attribute, a time of evaluation, and an evaluation time period for evaluating a website's performance, the at least one attribute corresponding to a characteristic of sessions of user devices with a website;

determining a set of one or more attribute values relating to requests from user devices for the website for the at least one attribute for evaluating the website's performance;

for each attribute value in the set of one or more attribute values:

determining a set of time-windows based on the evaluation time period and the time of evaluation;

receiving historical web session events including a set of historical performance metrics for each of the set of time-windows from historical web sessions, wherein the historical web session events are for sessions including the attribute value and obtained using one or more capture agents;

for each of the set of time-windows:

determining a performance range based on the set of historical performance metrics for the time-window; and assigning a weight to the performance range of the time-window, based on proximity in time of a corresponding time-window to the time of evaluation;

determining an evaluation range based on the weighted performance ranges, wherein the evaluation range corresponds to the time of evaluation;

receiving web session events including a current performance metric for the time of evaluation from the one or more capture agents, the current performance metric indicating performance of the website at the time of evaluation for the sessions including the attribute value;

determining that the current performance metric at the time of evaluation is outside the evaluation range; and responsive to the determining that the current performance metric at the time of evaluation is outside the evaluation range, providing an alert to a client indicating at least one anomaly in the website's performance.

2. The computer-implemented method of claim 1, wherein the at least one attribute includes a type of device used to access the website or a type of web browser used to access the website.

3. The computer-implemented method of claim 1, wherein determining the set of time-windows based on the evaluation time period comprises:

identifying the set of time-windows for the evaluation time period before and after the time of evaluation.

4. The computer-implemented method of claim 1, wherein determining the performance range based on the set of historical performance metrics for the time-window comprises:

determining a mean and a standard deviation of the set of historical performance metrics for the time-window; and determining an upper bound and a lower bond of the performance range based on the mean and the standard deviation of the set of historical performance metrics.

5. The computer-implemented method of claim 1, wherein determining the evaluation range comprising:

determining an upper bound of the evaluation range based on upper bounds for the set of time-windows and the weights assigned to the set of time-windows; and determining a lower bound of the evaluation range based on lower bounds for the set of time-windows and the weights assigned to the set of time-windows.

6. The computer-implemented method of claim 1, further comprising:

upon determining that the performance metric is outside of the evaluation range:

identifying one or more errors from error logs associated with the website;

determining that the one or more errors occurred within the set of time-windows associated with previous sessions;

determining that the one or more errors were classified as at least one anomaly within the previous sessions; and classifying the one or more errors as the at least one anomaly.

7. The computer-implemented method of claim 1, further comprising:

displaying one or more errors associated with the at least one anomaly and attribute values associated with the one or more errors.

8. The computer-implemented method of claim 1, wherein determining the at least one attribute comprises:

receiving, from a client device, the at least one attribute, wherein the at least one attribute is provided by the client using the client device.

9. The computer-implemented method of claim 1, wherein determining the one or more attribute values of the at least one attribute comprises:

determining one or more anomalous types of web session events at the time of evaluation; and determining one or more anomalous attribute values disproportionately included in web sessions including the one or more anomalous types of web session events.

10. The computer-implemented method of claim 1, wherein the performance metric includes a percentage of the sessions during the time of evaluation that reach a target stage of the website.

11. The computer-implemented method of claim 1, further comprising:

determining that one or more other performance metrics are outside of respective evaluation ranges;

determining that the one or more other performance metrics are correlated with the performance metric; and modifying the alert to identify the one or more other performance metrics.

12. The computer-implemented method of claim 11, wherein the determining that the other performance metrics are correlated with the performance metric includes:

determining a segment for a current session, the segment including one or more attribute values; and identifying that the one or more other performance metrics are correlated for the segment.

13. A computer-implemented method comprising performing, by an alerting system in communication with one or more capture agents associated with user devices:

identifying types of web session events relating to web sessions of the user devices with a set of webpages of a website, wherein the web sessions include a plurality of attribute values corresponding to a plurality of attributes;

for each of the types of web session events:

during a time-window, measuring an amount of web session events of the respective type for sessions of user devices with the website, the measuring using the one or more capture agents;

determining whether the amount is statistically different than a reference amount, thereby determining one or more anomalous types of web session events;

for each of the one or more anomalous types of web session events:

determining a set of anomalous web sessions in which the anomalous type of web session event occurred during the time-window;

for each of the plurality of attribute values of each of the plurality of attributes:

determining whether the attribute value is disproportionately present in the set of anomalous web sessions relative to a reference set of web sessions, thereby determining a segment of one or more anomalous attribute values during the time-window; and providing an alert including the segment of one or more anomalous attribute values for each of the one or more anomalous types of web session events.

14. The computer-implemented method of claim 13, wherein the reference set of web sessions comprises web sessions in which the anomalous type of web session event did not occur during the time-window, and wherein determining whether the attribute value is disproportionately present in the set of anomalous web sessions relative to the reference set of web sessions includes:

determining a feature importance score for including the attribute value as an input to a machine learning model that predicts whether the web session would include the anomalous type of web session event, wherein the machine learning model is trained using the set of anomalous web sessions and the reference set of web sessions; and comparing the feature importance score to a threshold.

15. The computer-implemented method of claim 14, wherein comparing the feature importance score to the threshold includes:

ranking the features importance scores of multiple attribute values; and identifying the one or more anomalous attribute values having a rank greater than the threshold.

16. The computer-implemented method of claim 13, wherein determining whether the attribute value is disproportionately present in the set of anomalous web sessions relative to the reference set of web sessions includes:

determining a proportion of the set of anomalous web sessions having the attribute value; and determining whether the proportion is statistically different than a reference proportion in the reference set of web sessions.

17. The computer-implemented method of claim 16, further comprising:

monitoring, using one or more capture agents, historical web session events for each of the types of web session events with the website, thereby determining historical amounts of web sessions events for the types of web session events and determining historical proportions of historical web sessions having respective attribute values for each of the plurality of attributes, wherein the reference amount is determined from the historical amounts during historical time-windows, and wherein the reference proportion is determined from historical proportions of the historical web sessions having the attribute value.

18. The computer-implemented method of claim 16, further comprising:

determining the reference set of web sessions, during the time-window, in which the anomalous type of web session event did not occur, wherein the reference proportion is of the reference set of web sessions having the attribute value.

19. The computer-implemented method of claim 13, wherein the types of web session events include errors and clicks of the user device on objects of the website.

20. The computer-implemented method of claim 13, wherein the alert is provided to a performance engine, the computer-implemented method further comprising:

monitoring, using the one or more capture agents, historical web session events for each of the types of web session events with the website;

determining, from the historical web session events, a historical performance metric for one or more historical time-windows;

determining a performance metric for the web session events of the segment during the time-window;

determining whether the performance metric is statistically different than the historical performance metric of the one or more historical time-windows, thereby determining one or more anomalous segments; and providing an alert including the one or more anomalous segments.

21. The computer-implemented method of claim 20, wherein the historical performance metric is determined for historical web sessions having the one or more anomalous attribute values of the segment.

22. The computer-implemented method of claim 20, wherein the segment includes multiple anomalous attribute values for a single attribute, and wherein the segment comprises web sessions having any one of the multiple anomalous attribute values.

23. The computer-implemented method of claim 20, wherein the segment includes an anomalous attribute value for multiple attributes, and wherein the segment comprises web sessions having the anomalous attribute value for each of the multiple attributes.

24. The computer-implemented method of claim 20, wherein determining whether the performance metric is statistically different than the historical performance metric of the one or more historical time-windows includes:

determining a multidimensional data point comprising the performance metric, a time of day, and a day of the week, wherein the time-window corresponds to the time of day and the day of the week, wherein the historical performance metrics are part of historical multidimensional data points for a set of time-windows;

determining an average distance between the multidimensional data point and K nearest historical multidimensional data points, K being an integer equal to three or more; and comparing the average distance to a threshold.

25. The computer-implemented method of claim 24, wherein the historical performance metrics are determined using measurements over multiple weeks.

26. The computer-implemented method of claim 24, wherein the average distance is a weighted average using a weight for each of the K nearest historical multidimensional data points, wherein the weight is assigned based on proximity of the time-window to the time-windows of the K nearest historical multidimensional data points.

27. A computer-implemented method comprising performing, by an alerting system in communication with one or more capture agents associated with user devices:

monitoring web session events relating to web sessions of the user devices with a set of webpages of a website, the monitoring using the one or more capture agents, wherein the web sessions include a plurality of attribute values corresponding to a plurality of attributes;

for each of a plurality of time-windows:
  determining, using the web session events during the time-window, whether the website exhibits anomalous behavior during the time-window, wherein a first time-window exhibits the anomalous behavior;
  identifying a first set of web sessions during the first time-window;
  identifying a reference set of web sessions during one or more reference time-windows that do not exhibit anomalous behavior;
  for each of the plurality of attribute values of each of the plurality of attributes:
    determining whether the attribute value is disproportionately present in the first set of web sessions relative to the reference set of web sessions, thereby determining a segment of one or more anomalous attribute values during the first time-window; and
  providing an alert including the segment of one or more anomalous attribute values.

28. The computer-implemented method of claim 27, wherein determining whether the web site exhibits anomalous behavior during the time-window includes:
  determining a performance metric using information of the web session events during the time-window; and
  comparing the performance metric to a reference value, thereby determining whether the time-window has an anomalous performance metric, wherein the reference value is determined using historical performance metrics.

29. The computer-implemented method of claim 28, wherein the performance metric is of a first type, the computer-implemented method further comprising:
  repeating the determining of whether the time-window has an anomalous performance metric for one or more other types of performance metrics.

30. The computer-implemented method of claim 27, wherein determining whether the web site exhibits anomalous behavior during the time-window includes:
  identifying a plurality of input features using information from the web session events during the time-window; and
  determining, using a machine learning model, whether the website exhibits anomalous behavior during the time-window, wherein the machine learning model is trained using input features determined from time-windows whose status of anomalous behavior is known.

31. The computer-implemented method of claim 27, wherein the one or more reference time-windows precede the first time-window.

32. The computer-implemented method of claim 27, wherein determining whether the attribute value is disproportionately present in the first set of web sessions relative to the reference set of web sessions includes:
  determining a feature importance score for including the attribute value as an input to a machine learning model that predicts whether the web session is within a time-window that exhibits anomalous behavior, wherein the machine learning model is trained using the first set of web sessions and the reference set of web sessions; and
  comparing the feature importance score to a threshold.

33. The computer-implemented method of claim 32, wherein comparing the feature importance score to the threshold includes:
  ranking the features importance scores of multiple attribute values; and
  identifying the one or more anomalous attribute values having a rank greater than the threshold.

34. The computer-implemented method of claim 27, wherein determining whether the attribute value is disproportionately present in the first set of web sessions relative to the reference set of web sessions includes:
  determining a proportion of the first set of web sessions having the attribute value; and
  determining whether the proportion is statistically different than a reference proportion in the reference set of web sessions.

\* \* \* \* \*

UNITED STATES PATENT AND TRADEMARK OFFICE
CERTIFICATE OF CORRECTION

| | | |
|---|---|---|
| PATENT NO. | : 11,789,805 B2 | Page 1 of 1 |
| APPLICATION NO. | : 17/591482 | |
| DATED | : October 17, 2023 | |
| INVENTOR(S) | : Mario Luciano Ciabarra, Jr. et al. | |

It is certified that error appears in the above-identified patent and that said Letters Patent is hereby corrected as shown below:

In the Claims

In Column 61, Line 26, in Claim 28: please delete "web site" and insert -- website --

In Column 61, Line 42, in Claim 30: please delete "web site" and insert -- website --

Signed and Sealed this
Twenty-sixth Day of December, 2023

*Katherine Kelly Vidal*

Katherine Kelly Vidal
*Director of the United States Patent and Trademark Office*